(12) United States Patent
Higuchi et al.

(10) Patent No.: US 8,471,855 B2
(45) Date of Patent: Jun. 25, 2013

(54) GRAPHICS-RENDERING APPARATUS

(75) Inventors: Yasukazu Higuchi, Kanagawa (JP); Isao Mihara, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1613 days.

(21) Appl. No.: 11/689,825

(22) Filed: Mar. 22, 2007

(65) Prior Publication Data

US 2007/0236498 A1 Oct. 11, 2007

(30) Foreign Application Priority Data

Mar. 28, 2006 (JP) ................................. 2006-088705

(51) Int. Cl.
  *G06T 11/203* (2006.01)
  *G06T 11/20* (2006.01)
  *G09G 5/20* (2006.01)
  *G06T 11/40* (2006.01)

(52) U.S. Cl.
  CPC ............... *G06T 11/203* (2013.01); *G09G 5/20* (2013.01); *G06T 11/206* (2013.01); *G06T 11/40* (2013.01)
  USPC ........... 345/443; 345/581; 345/582; 345/587; 345/629; 345/440; 345/441; 345/442

(58) Field of Classification Search
  CPC ....... G06T 11/203; G06T 11/206; G06T 11/40; G09G 5/20
  USPC .................. 345/581, 629, 441, 443, 582–587
  See application file for complete search history.

(56) References Cited

U.S. PATENT DOCUMENTS

| 4,675,702 A * | 6/1987 | Gerber ........................... 347/233 |
| 5,014,223 A * | 5/1991 | Tanimori ........................ 338/99 |
| 5,043,711 A * | 8/1991 | Harrington .................... 345/440 |
| 5,319,346 A * | 6/1994 | Harrington .................... 340/633 |
| 5,353,394 A * | 10/1994 | Kubota ......................... 345/441 |
| 5,485,559 A * | 1/1996 | Sakaibara et al. ............. 345/505 |
| 5,673,379 A * | 9/1997 | Diehl ............................ 345/441 |
| 5,710,578 A * | 1/1998 | Beauregard et al. .......... 345/441 |
| 6,084,596 A * | 7/2000 | Politis ........................... 345/629 |
| 6,111,587 A * | 8/2000 | Covey et al. .................. 345/629 |

(Continued)

FOREIGN PATENT DOCUMENTS

| JP | 11-165434 | 6/1999 |
| JP | 2002-133428 | 5/2002 |
| JP | 2002-144644 | 5/2002 |

OTHER PUBLICATIONS

U.S. Appl. No. 11/689,825, filed Mar. 22, 2007, Mihara et al.

(Continued)

*Primary Examiner* — Jin-Cheng Wang
(74) *Attorney, Agent, or Firm* — Oblon, Spivak, McClelland, Maier & Neustadt, L.L.P.

(57) ABSTRACT

Graphics-rendering operation is performed by a procedure including: inputting a vector data group representing the shape of a graphic object to a vector data group management unit; inputting, to a rendering attribute data management unit, rendering attribute data representing information pertains to internal attributes of the graphic object; inputting resource information indicating a usage status into a resource information management unit; reading the managed vector data group from the vector data group management unit; computing a feature indicating the geometrical feature of the input graphic object by means of the feature computing unit; reading the computed graphic feature level and the resource information managed by the resource information management unit; effecting switching to generation of optimum rendering data; reading the vector data group managed by the vector data group management unit and the rendering attribute data managed by the rendering attribute data management unit; generating rendering data; reading the generated rendering data and the rendering attribute data managed by the rendering attribute data management unit; and performing rendering operation.

5 Claims, 30 Drawing Sheets

U.S. PATENT DOCUMENTS

| | | | | |
|---|---|---|---|---|
| 6,172,682 | B1* | 1/2001 | Claiborne et al. | 345/441 |
| 6,215,501 | B1* | 4/2001 | Takita | 345/581 |
| 6,466,229 | B1* | 10/2002 | Nagao | 345/621 |
| 7,110,003 | B2* | 9/2006 | Doan | 345/611 |
| 2002/0039100 | A1* | 4/2002 | Morphet | 345/553 |
| 2002/0145616 | A1* | 10/2002 | Doan | 345/629 |

OTHER PUBLICATIONS

Renate Kempf, et al., "Open GLProcessing Pipeline", Chapter 2: Overview of Commands and Routines, Open GL Reference Manual Second Edition, 1997, pp. 8-16.

Mark de Berg, et al., "Polygon Triangulation, Guarding an Art Galery", Computational Geometry, 2000, pp. 44-61.

Jackie Neider, et al., "Drawing Filled, Concave Polygons Using the Stencil Buffer", Chapter 13: Now That You Know, Open GL programming Guide, 1993, pp. 398-399.

Ola Andersson, et al., "Scalable Vector Graphics (SVG) 1.1 Specification", W3C Recommendation Jan. 14, 2003, http://www.w3.org/TR/SVG/, Jan. 14, 2003, pp. 1-719.

* cited by examiner

| EXAMPLE SELF-INTERSECTION |
|---|
| $C_0$: INTERSECTION BETWEEN $P_1$-$P_0$ AND $P_3$-$P_2$ |
| $C_1$: INTERSECTION BETWEEN $P_1$-$P_0$ AND $P_4$-$P_3$ |
| $C_2$: INTERSECTION BETWEEN $P_2$-$P_1$ AND $P_4$-$P_3$ |
| $C_3$: INTERSECTION BETWEEN $P_2$-$P_1$ AND $P_5$-$P_4$ |
| $C_4$: INTERSECTION BETWEEN $P_3$-$P_2$ AND $P_5$-$P_4$ |

EXAMPLE GEOMETRICAL DATA
PERTAINING TO GRAPHIC OBJECT

| POINT 0 COORDINATES $P_0$ |
| POINT 1 COORDINATES $P_1$ |
| POINT 2 COORDINATES $P_2$ |
| POINT 3 COORDINATES $P_3$ |
| POINT 4 COORDINATES $P_4$ |
| POINT 5 COORDINATES $P_5$ |

| POINT 6 COORDINATES $P_6$ |
| POINT 7 COORDINATES $P_7$ |
| POINT 8 COORDINATES $P_8$ |
| POINT 9 COORDINATES $P_9$ |

FIG. 21

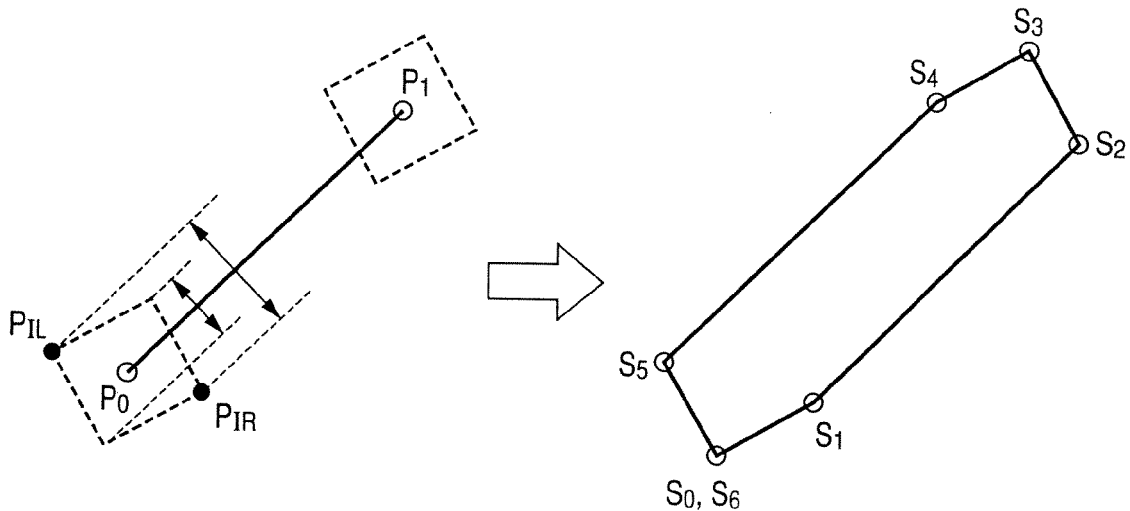

FIG. 22

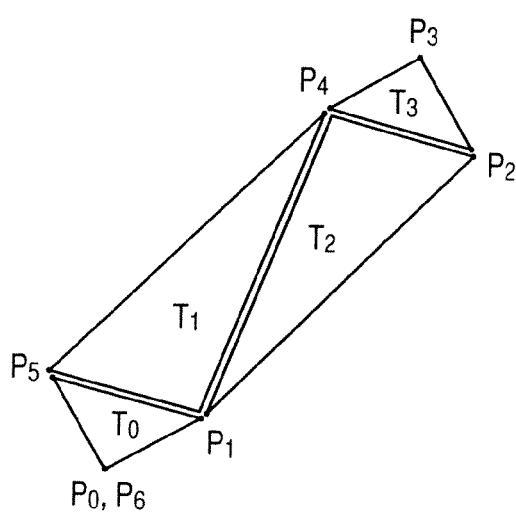

EXAMPLE DATA PERTAINING TO OUTLINE

| POINT 0 COORDINATES $P_0$ |
| POINT 1 COORDINATES $P_1$ |
| POINT 2 COORDINATES $P_2$ |
| POINT 3 COORDINATES $P_3$ |
| POINT 4 COORDINATES $P_4$ |
| POINT 5 COORDINATES $P_5$ |

EXAMPLE TRIANGLE DATA

| TRIANGLE $T_0$ $P_0 \rightarrow P_1 \rightarrow P_5$ |
| TRIANGLE $T_1$ $P_1 \rightarrow P_4 \rightarrow P_5$ |
| TRIANGLE $T_2$ $P_1 \rightarrow P_2 \rightarrow P_4$ |
| TRIANGLE $T_3$ $P_2 \rightarrow P_3 \rightarrow P_4$ |

GRAPHICS-RENDERING APPARATUS

RELATED APPLICATION

The present disclosure relates to the subject matter contained in Japanese Patent Application No. 2006-088705 filed on Mar. 28, 2006, which is incorporated herein by reference in its entirety.

FIELD

The present invention relates to graphics-rendering processing performed in electronic devices, such as a computer, a digital AV device, and a communications device.

BACKGROUND

Various methods for rendering an arbitrary polygon have been developed. The methods include (1) a point-based method, (2) a raster-line-based method, (3) a triangle-based method, and (4) a stencil-buffer-based method.

The method (1) is a method for determining rendering with regard to respective points (pixels) included in a rendering area and performing rendering operation on a per-point (pixel) basis. In order to speed up rendering operation, various contrivances, such as deletion of useless rendering areas or simplifying a determination of a drawing at each of the points, have been conceived. Moreover, in order to achieve a speedup in rendering, the function is often embodied in the form of hardware. One device into which the method is embodied as hardware is called a rasterizer (see, e.g., the background-art document 1 listed below). This method is simple and hence is characterized by very stable operation, but has a drawback of a necessity for making a determination of rendering for each point, thereby entailing very high processing cost. For this reason, the function is typically embodied as custom-designed hardware.

The method (2) corresponds to an improvement on the method (1). The method (2) is analogous to the method (1) in that a drawing is determined on a per-dot basis or within a range corresponding to each dot. However, when rendering is performed, rendering portions in the respective points are collected, and the thus-collected rendering portions are replaced with line drawings of respective scan lines of a screen on which rendering is desired to be effected. Thus, in relation to determination of a drawing, the method (2) entails high processing cost, as does the method (1). However, cost of rendering operation is curtailed, and hence the method (2) is expected to become faster than the method (1). Determining a drawing entails processing performed by a processing system having a high-speed CPU or realization of processing in the form of custom-designed hardware. A general-purpose graphics LSI (GPU) can be used for rendering operation. The reason for this is that the graphics LSI has the function of rendering lines and triangles at high speed. For this reason, the method (2) can be said to have enhanced versatility as compared with the method (1).

The method (3) is for dividing a polygon desired to be drawn into a group of triangles and rendering the polygon from triangles (see, e.g., the background-art document 2 listed below). This intends to achieve a speedup on the premise of the use of a general-purpose graphics LSI or a high-speed triangle rendering apparatus (because the graphics LSI has the function of rendering lines and triangles at high speed). Therefore, the method (3) is superior to the methods (1) and (2) in terms of versatility. However, triangulation requires complicated processing, and hence stability of complicated processing may pose a problem. When a polygon desired to be drawn has a very complicated shape, there also arises a problem of triangulation processing involving a very large cost. Since the method is based on the premise that a group of triangles are rendered by use of a graphics LSI or the like, the LSI cannot be used when it has insufficient resources. The reason for this is that the polygon must be divided into a group of triangles; and that the thus-divided triangles must be fed to the graphics LSI, which in turn entails a comparative increase in the volume of usage of memory.

The method (4) is completely based on usage of a general-purpose graphics LSI, and polygon rendering is implemented by use of a function called a stencil buffer provided in the graphics LSI (see, e.g., the background-art document 3 listed below). This method enables more stable and faster polygon rendering than that provided by any one of the methods (1) through (3). However, the method entails full usage of the features of the graphics LSI, and hence there arises a problem of a necessity for a large amount of resource of the graphics LSI.

As mentioned above, in relation to the methods (1) through (4), a tradeoff exists between a processing speed and required resources. Therefore, in a case where resources, such as a graphics LSI, are utilized by a plurality of tasks, the respective methods raise problems. In relation to the methods (1) and (2), required resources are small in amount, and hence processing can be performed stably regardless of variations in resources. However, difficulty is encountered in effecting high-speed processing, because of a large volume of processing. In relation to the methods (3) and (4), when sufficient resources are available, high-speed processing is feasible. However, when the resources are made deficient by other tasks, there arises a problem of a drop in processing performance or a problem of a failure to execute processing for reasons of a deficiency in resources.

As mentioned above, the related art methods have drawbacks in terms of processing speed and stable operation induced by variations in resources as a result of execution of a plurality of tasks.

Background-Art Document 1:
Renate Kempf and Chris Frazier, "The Open GL Processing Pipeline," Chapter 2: Overview of Commands and Routines, Open GL Reference Manual Second Edition, ISBN 0-201-46140-4, pp. 8 to 16, 1997.

Background-Art Document 2:
Mark de Berg, Mare van Kreveld, Mark Overmars, and Otfried Schwartzkopf "Computational Geometry," ISBN 4-7649-0277-X, pp. 44 to 61, Kindai Kagakusha Co., Ltd., 2000.

Background-Art Document 3:
Jackie Neider, Tom Davis, Mason Woo, "Drawing filled, Concave Polygons Using the Stencil Buffer," Chapter 13: Now That You Know, OpenGL programming Guide, ISBN 0-201-63274-8, pp. 398-399, 1993.

SUMMARY OF THE INVENTION

One of objects of the present invention is to provide a graphics-rendering apparatus and a graphics-rendering method which enable high-speed and stable operation suitable for a situation where the resources of the apparatus vary.

According to one aspect of the invention, there is provided a graphics-rendering apparatus including: a vector data group management unit that manages a vector data group representing a shape of a graphic object; a rendering attribute data group management unit that manages rendering attribute data representing fill attribute information pertains to the graphic object; a resource information management unit that manages resource information indicating a status of use; a feature computing unit that reads the vector data group managed by the vector data group management unit, and computes a feature indicating a geometrical feature of an input graphic object; a rendering operation switching unit that reads the feature computed by the feature computing unit and the resource information managed by the resource information management unit, and switches to generation of optimal rendering data; a plurality of rendering data generation unit that are controlled by the rendering operation switching unit, and read a vector data group managed by the vector data group management unit and the rendering attribute data managed by the rendering attribute data management unit to generate different sets of rendering data; and a plurality of rendering units that read the rendering data generated by the rendering data generation unit and the rendering attribute data managed by the rendering attribute data management unit, and perform different rendering operations.

BRIEF DESCRIPTION OF THE DRAWINGS

In the accompanying drawings:

FIG. 21 is a view showing an example outline of a graphic object to be rendered according to the second embodiment of the present invention;

FIG. 22 is a view showing example triangulation of the outline according to the second embodiment of the present invention;

DETAILED DESCRIPTION OF THE EMBODIMENT(S)

Embodiments of the present invention will be described hereinbelow by reference to the drawings.

Figure 1:
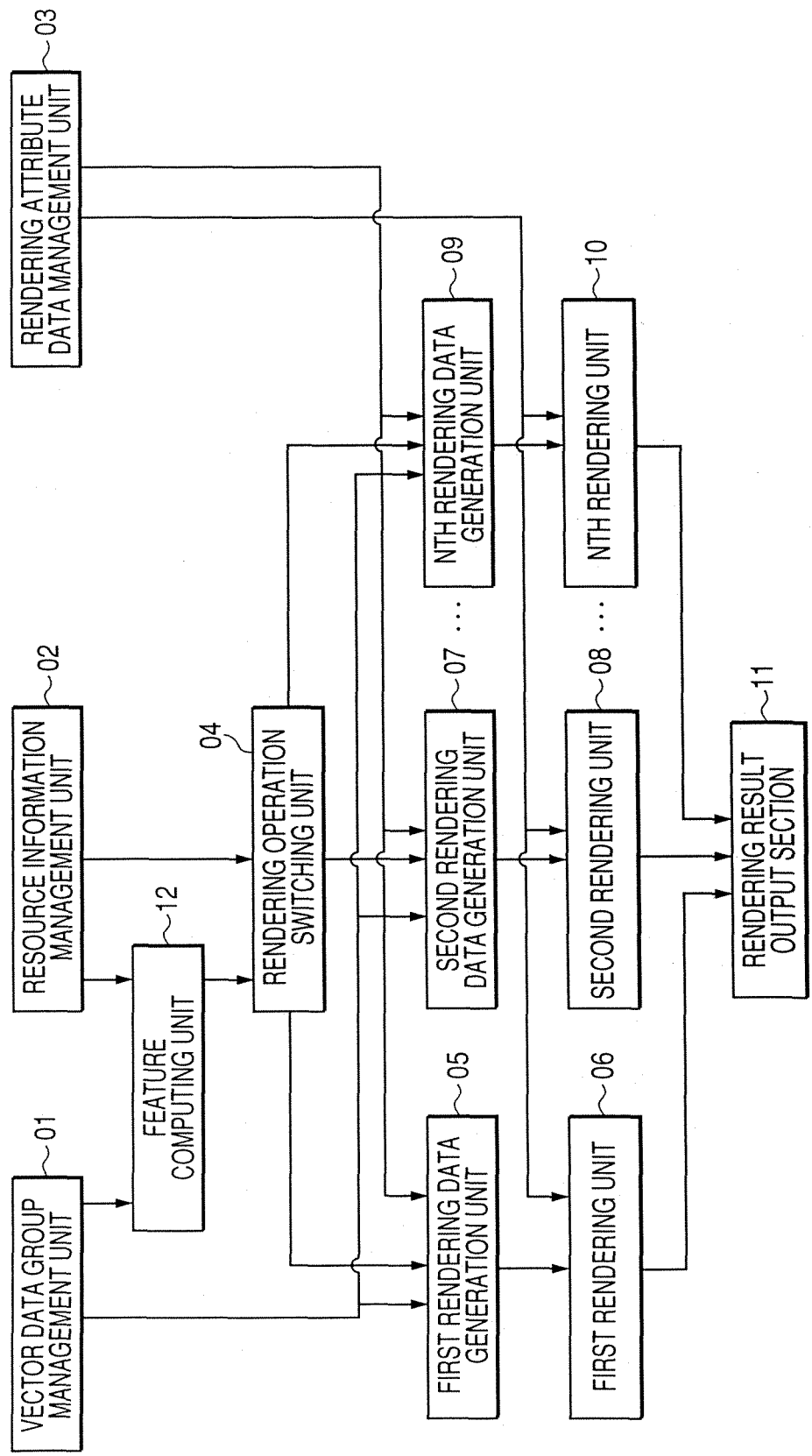
FIG. 1 is a view for schematically showing an example configuration of a graphics-rendering apparatus of the present invention.

FIG. 1 is a block diagram of a graphics-rendering apparatus according to an embodiment of the present invention. The graphics-rendering apparatus includes: a vector data group management unit 01 for managing a vector data group representing the shape of a graphic object; a rendering attribute data group management unit 03 for managing rendering attribute data representing fill attribute information pertains to the graphic object; a resource information management unit 02 for managing resource information indicating the status of use; a feature computing unit 12 which reads the vector data group managed by the vector data group management unit 01 and which computes a feature (of the graphic object) showing the geometrical feature of an input graphic object; a rendering operation switching unit 04 which reads the feature computed by the feature computing unit 12 and the resource information managed by the resource information management unit 02 and which switches to generation of optimal rendering data; a plurality of rendering data generation units (a first rendering data generation unit 05, a second rendering data generation unit 07, and an Nth rendering data generation unit 09) whose operations are controlled by the rendering operation switching unit 04, and which read a vector data group managed by the vector data group management unit 01 and the rendering attribute data managed by the rendering attribute data management unit 03 and generate different sets of rendering data; and a plurality of rendering units (a first rendering unit 06, a second rendering unit 08, and an Nth rendering unit 10) which read the rendering data generated by the rendering data generation units 05, 07, and 09 and the rendering attribute data managed by the rendering attribute data management unit 01, and perform different rendering operations.

Figure 39:
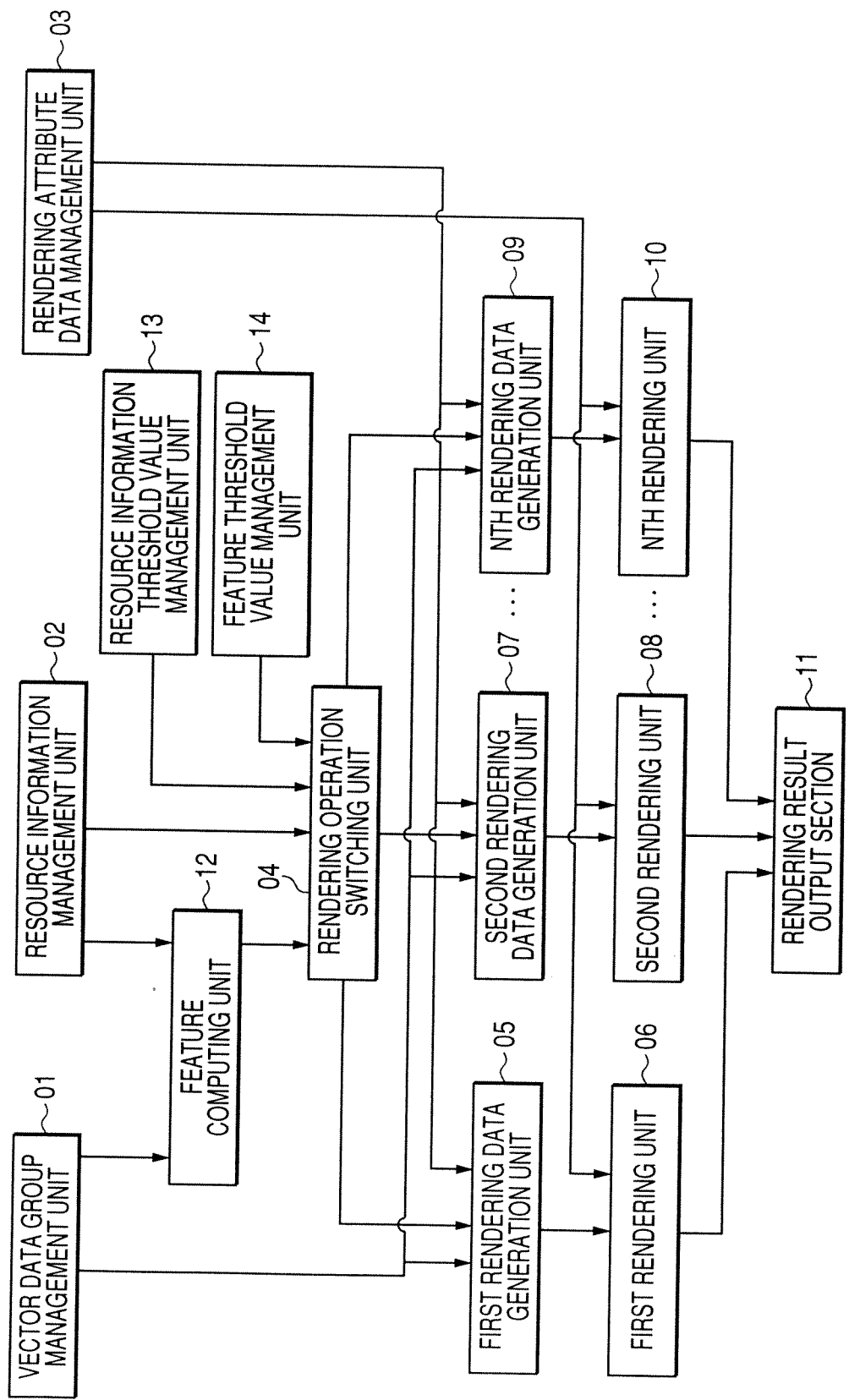
FIG. 39 is a view for schematically showing an example configuration of a graphics-rendering apparatus of the present invention.

FIG. 39 shows a modified configuration of the configuration shown in FIG. 1. In the configuration shown in FIG. 39, the graphics-rendering apparatus is further provided with a resource information threshold management unit 13 for managing a threshold value to be compared with resource information, and a graphics feature threshold level management unit 14 for managing a threshold value to be compared with a feature. In this configuration, the rendering operation switching unit 04 is configured to switch the rendering data generation unit by means of comparing the feature computed by the feature computing unit 12 with the graphics feature threshold level managed by the graphics feature threshold level management unit 14; and comparing the resource information threshold level managed by the resource information threshold value management unit 13 with the resource information managed by the resource information management unit 02.

First Embodiment

A first embodiment of the present invention will now be described.

The first embodiment shows an example graphics-rendering apparatus which takes, as an input, a vector data group showing the outline of a polygon; and which selects high-speed polygon rendering operation according to the status of resources in the apparatus achieved during rendering operation to thus perform rendering operation.

Overall Configuration

Figure 2:
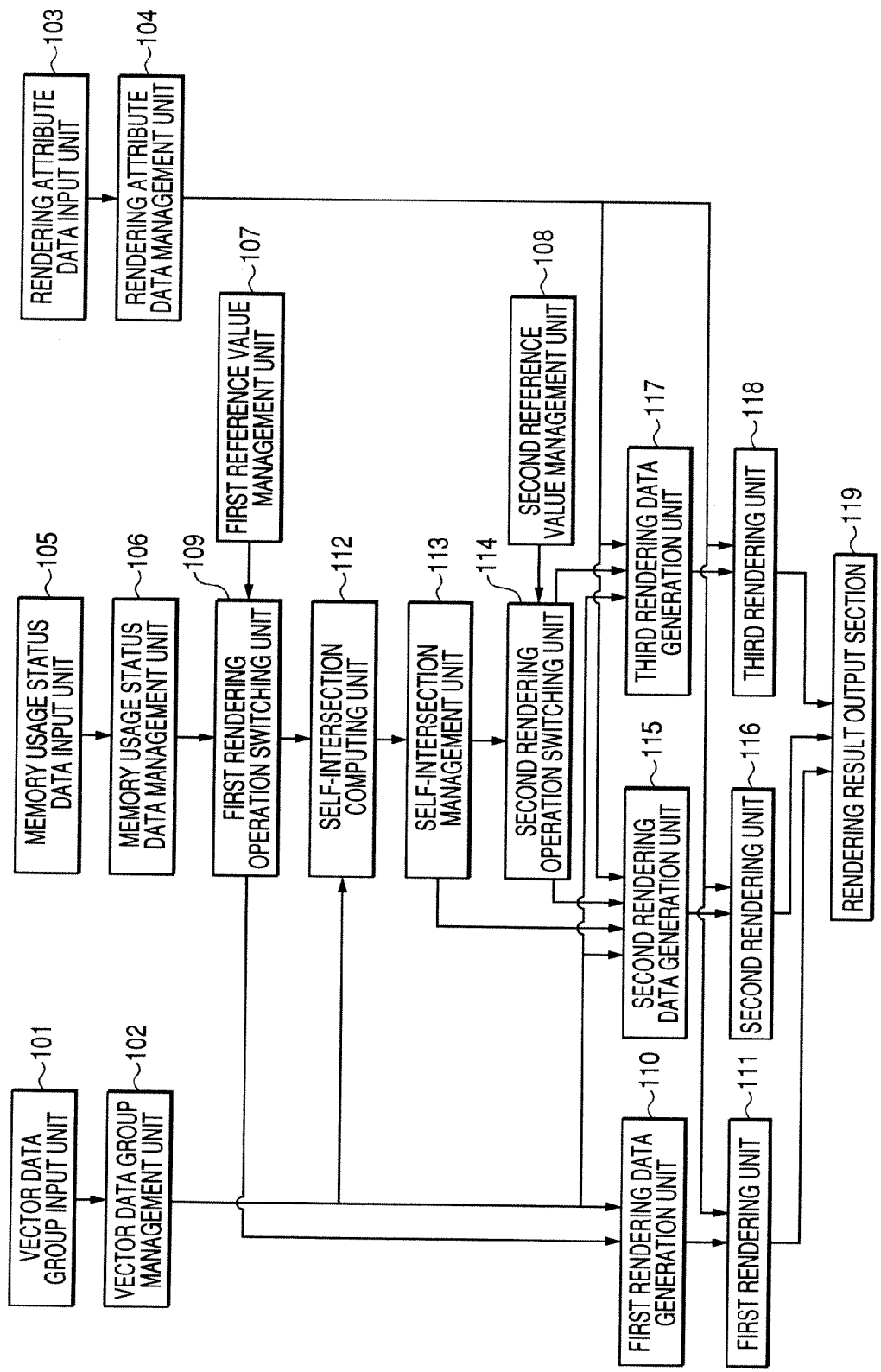
FIG. 2 is a view for schematically showing an example configuration of a graphics-rendering apparatus according to a first embodiment of the present invention.

FIG. 2 is a block diagram of a graphics-rendering apparatus according to the first embodiment.

The graphics-rendering apparatus of the first embodiment includes: a vector data group input unit 101 for inputting a vector data group representing the outline of a polygon; a vector data group management unit 102 for managing a vector data group which represents the outline of the polygon and has been input through the vector data group input unit 101; a rendering attribute data input unit 103 for inputting rendering attribute data representing attributes of a fill area of a polygon; a rendering attribute data management unit 104 for managing the rendering attribute data input through the rendering attribute data input unit 103; a memory usage status data input unit 105 for acquiring the usage status of memory; a memory usage status data management unit 106 for managing the memory usage status data input through the memory usage status data input unit 105; a first reference value management unit 107 for managing a memory usage status reference value referred to when a determination is made as to whether to switch rendering operation; a second reference value management unit 108 for managing a self-intersection reference value pertaining to self-intersections with the outline of a graphic object to be referred to when a determination is made to switch rendering operation; a first rendering operation switching unit 109 which reads the memory usage status reference value managed by the first reference value management unit 107 and the memory usage status data managed by the memory usage status data management unit 106, subjects the thus-read value and data to comparison and determination, and controls operation of a first rendering data generation unit 110 and that of a self-intersection computing unit 112, which will be described later, the first rendering data generation unit 110, whose operation is controlled by the first rendering operation switching unit 109, and which reads a vector data group managed by the vector data group management unit 102, and generates rendering data used for effecting rendering operation utilizing a stencil buffer; a first rendering unit 111 which reads the rendering data generated by the first rendering data generation unit 110 and the rendering attribute data managed by the rendering attribute data management unit 104, to thus update the stencil buffer and perform rendering operation utilizing the stencil buffer, the self-intersection computing unit 112, whose operation is controlled by the first rendering operation switching unit 109, and which reads the vector data group managed by the vector data group management unit 102, thereby computing self-intersections with the outline of a graphic object; a self-intersection management unit 113 for retaining information pertains to self-intersections within the outline of the graphic object computed by the self-intersection computing unit 112; a second rendering operation switching unit 114 which reads the number of self-intersections within the outline of the graphic object managed by the self-intersection management unit 113 and the self-intersection reference value managed by the second reference value management unit 108, and subjects the thus-read number and value to comparison and determination to thereby control operation of a second rendering data generation unit 115 and that of a third rendering data generation unit 117, which will be described later, the second rendering data generation unit 115, whose operation is controlled by the second rendering operation switching unit 114, and which reads the vector data group managed by the vector data group management unit 102 and the rendering attribute data managed by the rendering attribute data management unit 104, determines the fill area of the polygon, and generates a triangle data group by means of processing for dividing the fill area into an aggregate of triangles; a second rendering unit 116 which reads the triangle data group managed by the second rendering data generation unit 115 and the rendering attribute data managed by the rendering attribute data management unit 104, to thus perform rendering operation, the third rendering data generation unit 117, whose operation is controlled by the second rendering operation switching unit 114, and which reads the vector data group managed by the vector data group management unit 102 and the rendering attribute data managed by the rendering attribute data management unit 104, and determines the fill area of the polygon, to thus generate a line segment data group by means of processing for dividing the fill area into an aggregate of line segments; a third rendering unit 118 which reads the line segment data group generated by the third rendering data generation unit 117 and the rendering attribute data managed by the rendering attribute data management unit 104, to thus perform rendering operation; and a rendering result output section 119 for submitting a rendering result output from any one of the first rendering unit 111, the second rendering unit 116, and the third rendering unit 118.

In FIG. 2, all of the management units are represented as different blocks. However, these blocks may also be collected into single memory or divided into a plurality of different memory devices.

Figure 3:
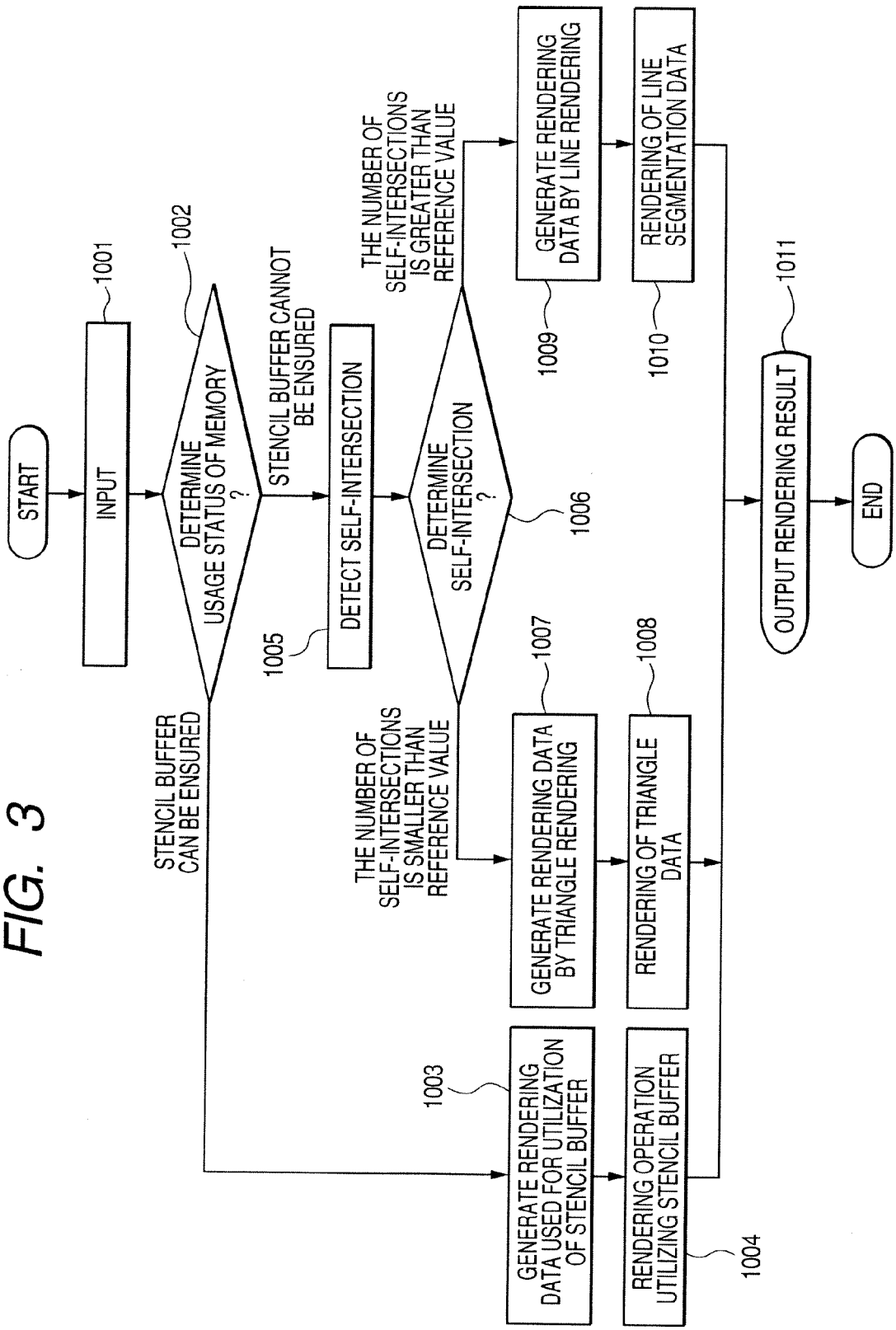
FIG. 3 is a view showing a processing flow employed in the first embodiment of the present invention.

Next, operation of the graphics-rendering apparatus of the present embodiment will be described by reference to a flowchart shown in FIG. 3, and operations of the respective blocks will be described by reference to FIG. 2.

Description of Graphics Rendering

Graphics rendering of the first embodiment will now be described. Graphics rendering performed in the present embodiment is implemented by means of determining whether an area enclosed with a vector data group constituting an outline of a polygon is inside or outside according to an arbitrary rule, and filling in a fill area according to the result of determination, thereby rendering a polygon.

Figure 4:
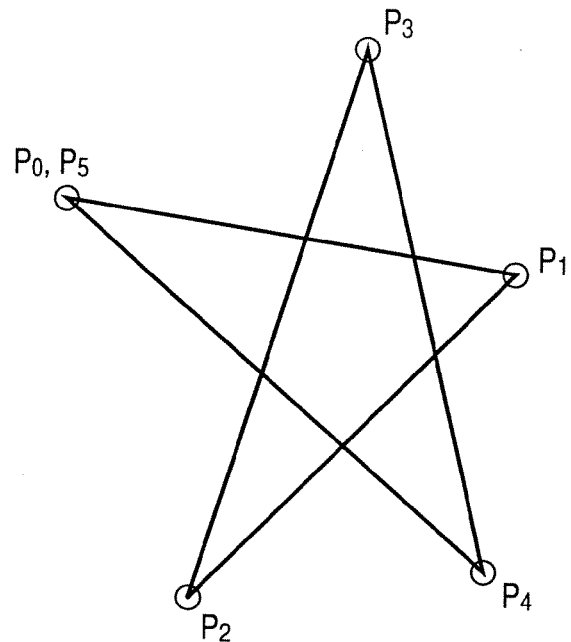
FIG. 4 is a view for describing a vector data group.
Figure 5:
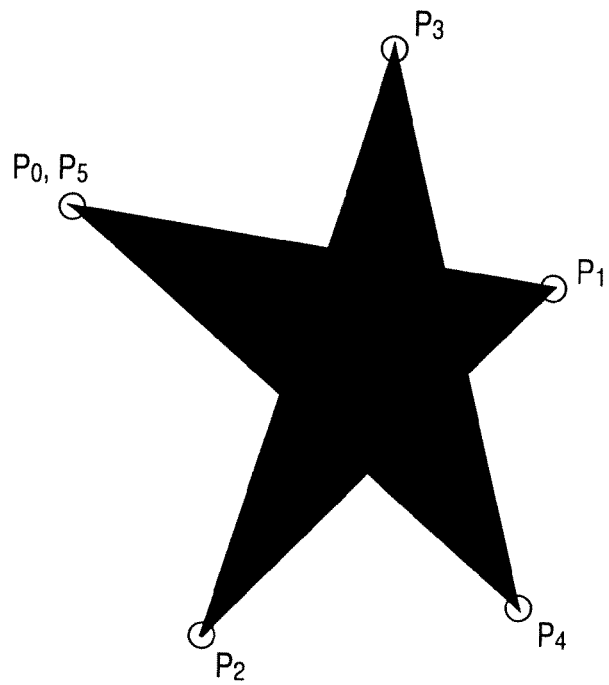
FIG. 5 is a view showing an example determination of the fill area of a graphic object by utilization of a non-zero winding number rule.
Figure 6:
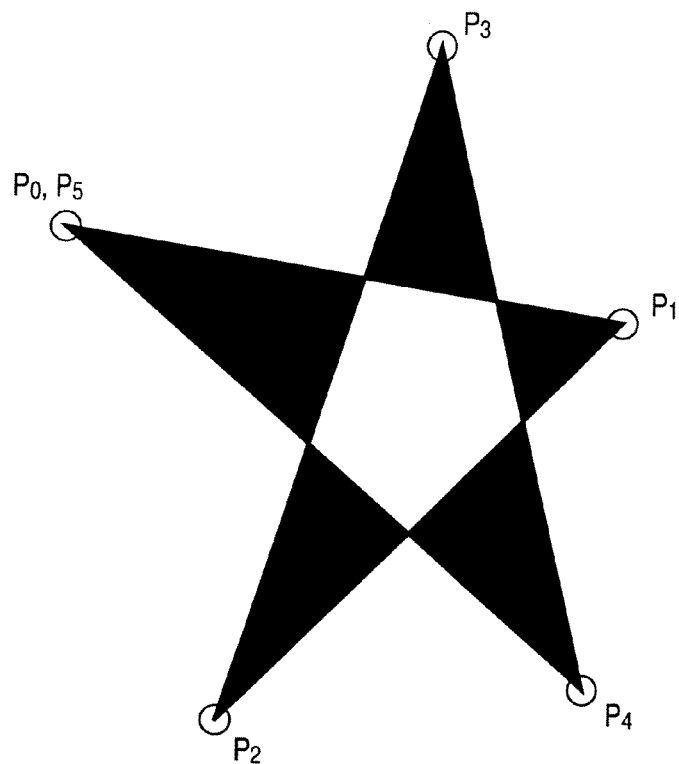
FIG. 6 is a view showing an example determination of the fill area of the graphic object by utilization of an even-odd rule.

Specifically, provided that there have been input a vector data group forming the "outline of a polygon (obtained through a single stroke writing)" such as "point 0" to "point 5" as shown in FIG. 4 and rendering attribute data including a fill rule and a color and opacity of the fill area, graphic objects such as those shown in FIGS. 5 and 6 are rendered. A difference between FIGS. 5 and 6 lies in a difference in the rules used for determining a fill area. FIG. 5 uses an example rule called a non-zero winding number rule. FIG. 6 is an example where a fill area is determined according to an even-odd rule to thus render a polygon.

These rules for determining a fill area are intended for: flies a ray in an arbitrary direction from an arbitrary point in an area enclosed with an outline of a polygon; incrementing or decrementing a counter according to the direction of an intersection every time the ray and the outline of the graphic object intersect; and determining whether the area is inside or outside according to the thus-obtained count value. According to the non-zero winding number rule, the area is determined to be inside unless the count value is zero. According to the even-odd rule, the area is determined to be inside when the count value is an odd number.

Details of the rules described above are described in a document "Scalable Vector Graphics (SVG) 1.1 Specification", W3C Recommendation 14 Jan. 2003. The document is available at a web site: www.w3.org/TR/SVG In rendering operation, a polygon is finally output as raster data consisting of pixels with color and opacity thereof being set.

General Processing Flow in the First Embodiment

A processing flow along which graphics-rendering of the first embodiment is performed will now be described by reference to the flowchart shown in FIG. 3.

When the graphics-rendering apparatus initiates graphics rendering operation, a vector data group, rendering attribute data, and memory usage status data are input (step 1001).

Next, a determination is made as to whether or not rendering operation utilizing a stencil buffer is feasible, on the basis of the memory usage status data and the result of a determination as to whether or not a stencil buffer is utilized (step 1002).

When the determination made in step 1002 shows that utilization of a stencil buffer is feasible, rendering data used for utilizing the stencil buffer are generated (step 1003). The stencil buffer is updated by use of the rendering data, and rendering operation is performed by utilization of the stencil buffer, to thus effect rendering operation (step 1004).

When the determination made in step 1002 shows that utilization of a stencil buffer is not feasible, the number of self-intersections with the outline of a graphic object is computed from the geometrical feature of the graphic object in order to select graphics processing that can be executed at high speed (step 1005). Next, the thus-computed number of self-intersections is compared with a threshold value, thereby determining which one of rendering utilizing triangulation and rendering utilizing line segmentation is to be used (step 1006).

When the determination made in step 1006 shows that rendering utilizing triangulation is faster, rendering data formed by dividing an input graphic object into triangles are generated (step 1007), and the graphic object is rendered by means of triangle rendering (step 1008).

When the determination made in step 1006 shows that rendering utilizing line segmentation is faster, rendering data formed by dividing an input graphic object into line segments are generated (step 1009), and a graphic object is rendered by means of line rendering operation (step 1010).

As above, rendering is performed in any of the steps, and a rendering result is output (step 1011). The respective steps will now be described in more detail below.

Descriptions of the Vector Data Group

First, there will be described a vector data group forming the outline of a graphic object which is one of inputs of graphics rendering.

A vector data group (hereinafter also referred to as a "vector data group") forming the outline of a polygon handled in the present embodiment is made up of N sets of point data P1 to PN having two-dimensional or three-dimensional coordinate values. The nth vector of the outline can be defined as $Vn=Pn-Pn+1$ from the point data, where $n=0, \ldots, N-1$. When $P0=PN-1$ is not achieved, the polygon is not closed. However, in this case, processing is performed on the assumption of a virtual point where $PN=P1$ is achieved.

The polygon formed from a vector data group can assume an arbitrary shape made up of general polygons, and may assume a concave shape (concave polygon) or a self-intersecting shape as well as a convex shape (convex polygon).

Vector Data Group Input Unit 101

Vector Data Group Management Unit 102

Input of a vector data group forming an outline of a polygon, which is one of the inputs for graphics rendering as mentioned previously, is performed by the vector data group input unit 101, and the input data are stored in the vector data group management unit 102.

Input of vector data is performed as reading of data previously stored in an auxiliary storage device, an FD, CD-ROM, DVD-ROM, or the like, or as interactive reading of an input performed by means of a human interface device such as a mouse, a keyboard, a keypad, a pen tablet, or a touch panel.

Descriptions of Rendering Attribute

A rendering attribute, which is one of inputs of graphics rendering, will now be described.

A rendering attribute used in the present embodiment includes information pertains to attributes employed during rendering of a graphic object, such as designation of a fill rure, the color and opacity of the fill area, and the like.

An arbitrary value used for determining the rule of determining a fill area of a polygon is set as a designated value of the fill rure. Color information used for filling in the fill area of the graphic object is described as a fill area color, and a value representing the transparency of the fill area of the graphic object is described as opacity. When a value showing that the fill area of the graphic object is semitransparent is input for opacity, graphic objects and a background behind the graphic object of interest are composed according to the proportion of transparency indicated by opacity.

Rendering Attribute Data Input Unit 103
Rendering Attribute Data Management Unit 104

Processing for inputting rendering attribute data, which is one of inputs for graphics rendering such as those mentioned previously, is performed by the rendering attribute data input unit 103, and the input data are stored in the rendering attribute data management unit 104.

Input of rendering attribute data is performed as reading of data previously stored in an auxiliary storage device, an FD, CD-ROM, DVD-ROM, or the like or as interactive reading of an input performed by means of a human interface device such as a mouse, a keyboard, a keypad, a pen tablet, or a touch panel.

Descriptions of a Determination Used for Switching Rendering Operation

Data used as a rendering switching determination value in the present embodiment will now be described.

In the present embodiment, memory usage status data and the number of self-intersections with the outline of a graphic object are used as the rendering switching determination value.

These sets of data are determined according to the characteristic of rendering operation to be switched by the data. Rendering utilizing a stencil buffer of the present embodiment enables high-speed processing. However, a memory area used for ensuring the stencil buffer is required. For this reason, a determination is made as to whether or not rendering utilizing a stencil buffer is feasible, according to the usage status of memory achieved during execution of rendering operation, whereby rendering operation can be selected according to the status of resources.

Figure 7:
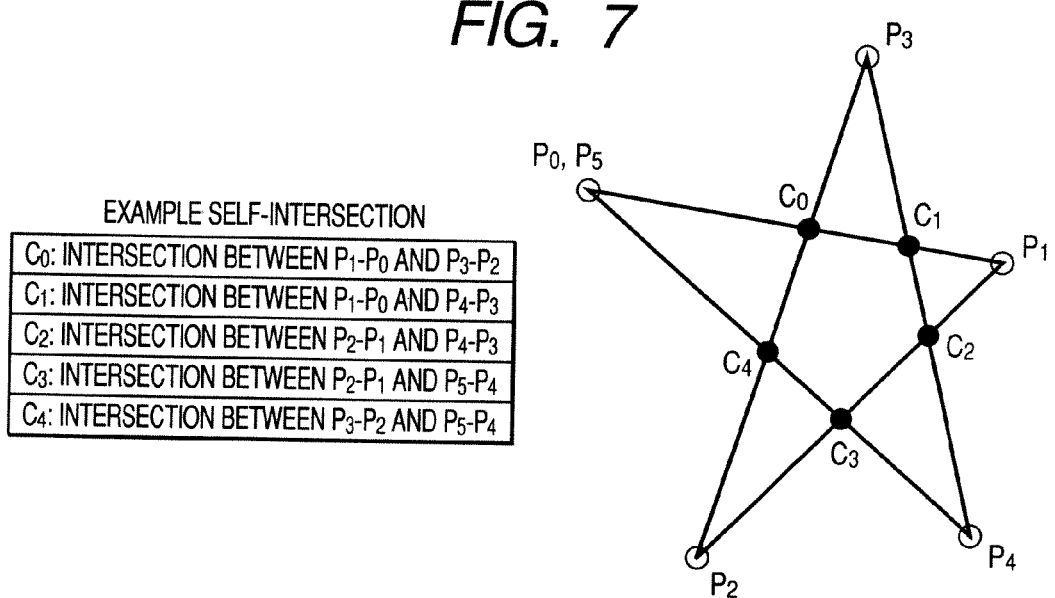
FIG. 7 is a view showing a point where groups of sets of vector data intersect with each other.

In the present embodiment, processing cost incurred by rendering involving triangulation of a polygon becomes higher than processing cost incurred by rendering involving line segmentation, or vice versa, according to the complexity of an input group of vector data. For this reason, the number of points of intersection arising in the input group of vector data (the number of self-intersections), such as that shown in FIG. 7, is used as a value showing the complexity of the group of vector data, which greatly affects processing cost, thereby enabling selection of a rendering operation according to input data.

Memory Usage Status Data Input Unit 105
Memory Usage Status Data Management Unit 106

Processing for inputting memory usage status data—which is one of the above-described rendering operation switching determination values—is performed by the memory usage status data input unit 105, and the input data are stored in the memory usage status management unit 106.

Here, the term "memory usage status" signifies the amount of a storage area—where data utilized in processing operation of each of the blocks constituting the graphics-rendering apparatus of the present embodiment are stored (temporarily or permanently)—used during rendering. Specifically, the memory usage status is a value determined from the maximum amount of memory, which corresponds to the amount of memory available when memory is not used at all, and the amount of memory actually used during rendering.

The memory usage status of the first embodiment is not limited to a case where the respective blocks constituting the graphics-rendering apparatus use a common memory area or a case where the respective blocks use individual memory areas.

When a common memory area is used, a memory usage status can be acquired by means of a method for taking as an input memory usage status data pertaining to a common memory area. Alternatively, when individual memory areas are used, a memory usage status can be acquired by means of another method for reading the memory usage statuses of all of the memory areas to thus compute a required memory usage status or limiting a block for which a memory usage status is required to thus read a memory usage status of that block.

Figure 8:
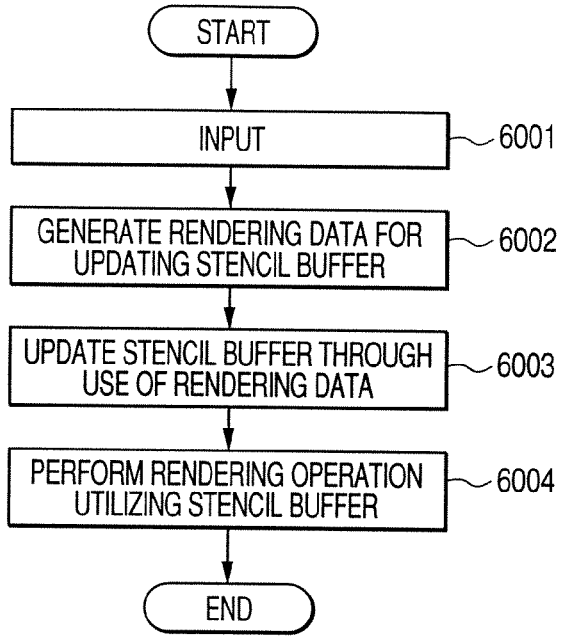
FIG. 8 is a view showing the flow of rendering operation utilizing a stencil buffer.

About Rendering Operation Involving a Determination about the Fill Area of a Graphic Object by Utilization of a Stencil Buffer The flow of rendering operation involving a determination about the fill area of a graphic object by utilization of a stencil buffer is shown in FIG. 8, and will now be described.

Figure 9:
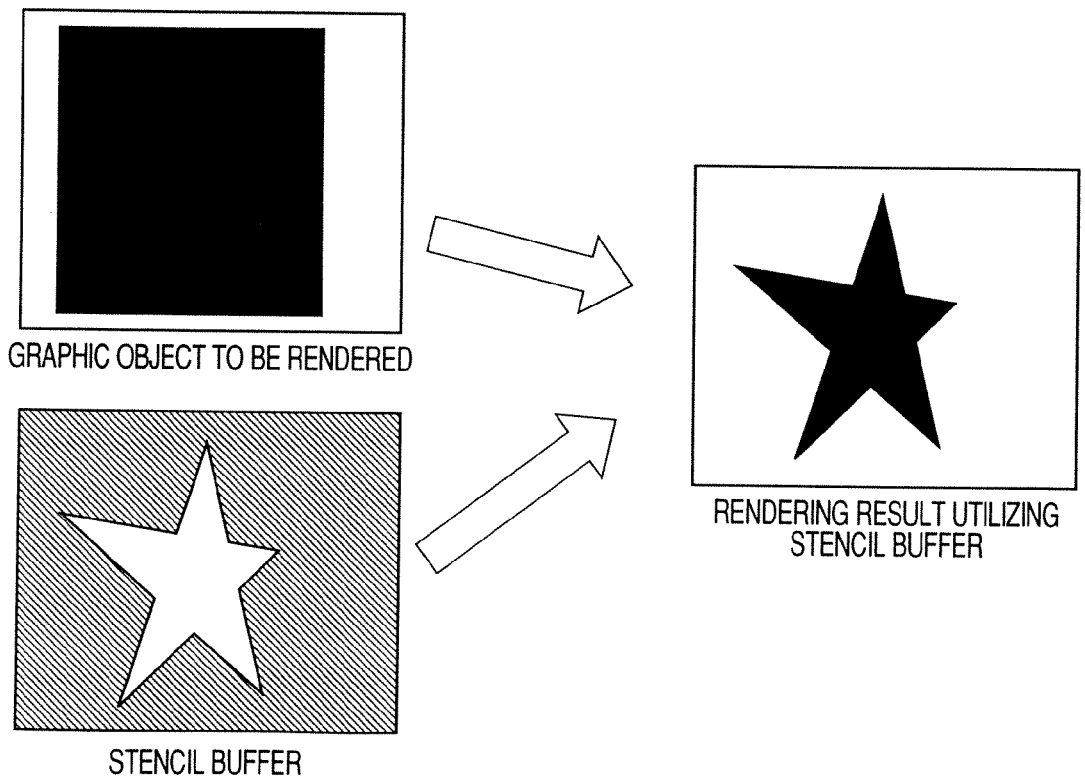
FIG. 9 is a view showing example rendering utilizing the stencil buffer.

A stencil buffer is a buffer, as shown in FIG. 9, for retaining a value used for determining whether rendering is enabled/disabled on a per-pixel basis during rendering operation, and also refers to a rendering method utilizing the buffer.

In order to effect rendering after determination of the fill area of a graphic object by utilization of a stencil buffer, a vector data group showing the outer circumference of a graphic object is read as an input (step 6001). Next, rendering data for use in updating the stencil buffer are generated from the thus-read vector data group according to a specific rule (step 6002). The counter of the stencil buffer is incremented or decremented by means of rendering the thus-generated rendering data in the stencil buffer (step 6003). As a result, a value which enables determination of the fill area of a graphic object is set in the stencil buffer. During graphics-rendering operation, this value is evaluated according to the fill rure, thereby controlling writing of pixels. The fill area can be rendered, by means of rendering the minimum rectangle enclosing a group of sets of input vector data (hereinafter also referred to as an "input vector data group") by utilization of the stencil buffer (step 6004). As a result, a graphic object complying with the fill rure can be rendered.

Graphics rendering utilizing a stencil buffer entails high rendering cost. However, in relation to the determination of rendering, a graphic object used for updating the stencil buffer is merely generated according to a standard rule, which incurs low cost. Therefore, when a graphics LSI compatible with rendering operation utilizing a stencil buffer is available, graphics-rendering operation can be processed at high speed. However, this method requires a memory area used for ensuring a stencil buffer. Therefore, when the buffer cannot be ensured because of a deficiency in resources, this method cannot be utilized.

Graphics-rendering operation utilizing a stencil buffer is described in detail in Non-Patent Document 3. Hence, please refer to that document.

First Rendering Operation Switching Unit 109
First Reference Value Management Unit 107

Next, the first rendering operation switching unit 109 will be described. As mentioned above, rendering operation utilizing a stencil buffer enables high-speed rendering operation. However, when the stencil buffer cannot be ensured, the rendering operation cannot be utilized. Therefore, the first rendering operation switching unit determines the usage status of memory in the graphics-rendering apparatus (step 1002). When the stencil buffer can be ensured, there are generated rendering data used for performing rendering operation utilizing a stencil buffer (step 1003). When the stencil buffer cannot be ensured, there is executed processing pertaining to the next step, where there is performed processing for determining high-speed rendering operation from the characteristic of an input graphic object (step 1005).

The usage status of memory is determined by means of comparing memory usage status data M pertaining to the graphics-rendering apparatus acquired when the graphics-rendering operation managed by the memory usage status data management unit 106 is performed with a reference value Mref showing the minimum usage status of memory required to ensure the stencil buffer managed by the first reference value management unit 107. When M satisfies Mref, the first rendering data generation unit 110 is caused to operate. When M is different from Mref, the self-intersection computing unit 112 is caused to perform operation.

The memory usage status reference value managed by the first reference value management unit 107 is determined by an output of the graphics-rendering apparatus and the configuration thereof. Whether or not the stencil buffer can be ensured depends on the resolution of an output rendering and the maximum volume of available memory. In relation to the relationship between whether or not the stencil buffer can be ensured and the resolution of an output rendering, the size of a stencil buffer is generally identical with the resolution of an output rendering. Hence, the greater the resolution of an output rendering, the more difficult the stencil buffer is to ensure. Moreover, in relation to the maximum volume of available memory, when the stencil buffer size is greater than the maximum volume of memory, the majority of memory is utilized by the stencil buffer. A potential risk of another task making memory unavailable becomes higher. When memory has entered such a state, the processing performance of the overall rendering apparatus is greatly decreased in the present embodiment where the memory is shared among the plurality of blocks.

A reference value pertaining to the usage status of memory is determined by means of an output of the graphics-rendering apparatus and the configuration thereof.

In order to efficiently avoid occurrence of these problems, there is also a method for dynamically changing the reference value along with the status of a task.

First Rendering Data Generation Unit 110

The first rendering data generation unit 110 will now be described. The first rendering data generation unit is caused to operate when the first rendering operation switching unit 109 has determined that the stencil buffer can be ensured. The vector data group managed by the vector data group management unit 102 is read, and rendering data used for updating the stencil buffer and rendering data used for rendering a graphic object by utilization of the stencil buffer are generated (step 1003).

Rendering data generated in this embodiment include triangle data which are generated by use of the vector data group and used for updating the stencil buffer in the above-described "rendering operation for making a determination of a fill area of a graphic object by utilization of a stencil buffer," and rectangle data used for rendering the fill area of a graphic object by utilization of the stencil buffer.

The method for generating rendering data is described in detail in the related-art document 3, which is listed above.

First Rendering Unit 111

The rendering data generated by the first rendering data generation unit are input to the first rendering unit 111, where rendering operation is performed. The first rendering unit 111 will be described. The first rendering unit 111 reads the rendering attribute data managed by the rendering attribute data management unit 104 and the rendering data generated by the first rendering data generation unit 110. First, the stencil buffer is updated. Next, rendering operation is performed by utilization of the thus-updated stencil buffer in accordance with the fill rure indicated by the rendering attribute data (step 1004).

Specifically, as mentioned in connection with the "rendering operation for making a determination of a fill area of a graphic object by utilization of a stencil buffer," the stencil buffer is updated on the basis of the rendering data generated by the first rendering data generation unit by means of rendering of the triangle data used for updating the stencil buffer. Next, rectangle data used for rendering the fill area of the graphic object are rendered by utilization of the updated stencil buffer, whereupon rendering of a graphic object is completed.

In relation to actual rendering of a triangle and a rectangle, hardware specifically designed for rendering a triangle or a rectangle may be used, or a general-purpose graphics processing LSI may be used; or rendering may be performed by use of another means.

Self-Intersection Computing Unit 112
Self-Intersection Management Unit 113

The self-intersection computing unit 112 will now be described. The self-intersection computing unit is performed to compute self-intersections with the outline of a graphic object when the first rendering operation switching unit 109 has determined that the stencil buffer cannot be ensured (step 1005).

Computing self-intersections with the outline of a graphic object is performed by means of: reading the vector data group which constitute the outline of a polygon and are managed by the vector data group management unit 102; determining intersections between vectors; and computing coordinates of intersections, a phase relationship between the intersections, and the total number of intersections.

The thus-computed self-intersection data are not limited to determination of rendering operation, but can also be utilized for triangle rendering operation. The self-intersection data are stored in the self-intersection management unit 113 so that the coordinates of intersections, the phase relationship between the intersections, and the total number of intersections can be read separately.

Second Rendering Operation Switching Unit 114
Second Reference Value Management Unit 108

The second rendering operation switching unit 114 will now be described. The second rendering operation switching unit compares the number of self-intersections managed by the self-intersection management unit 113 with the reference value which is managed by the second reference value management unit 108 and which shows the number of self-intersections at which processing cost incurred by triangle rendering becomes higher than processing cost incurred by line rendering, or vice versa. When triangle rendering is determined to be faster, processing for generating rendering data through triangulation is performed. In contrast, when line rendering is determined to be faster, processing for generating rendering data through line segmentation is performed (step 1006).

The number of self-intersections is determined by means of comparing the number of self-intersections $N_{is}$ managed by the self-intersection management unit 113 with a reference value $N_{isref}$ showing the number of self-intersections which is managed by the second reference value management unit 108 and at which graphics processing performance is switched. When a relationship of $N_{is} < N_{isref}$ is fulfilled, the second rendering data generation unit 115 is performed. In other cases, the third rendering data generation unit 117 is performed.

The reference value which pertains to the number of self-intersections and is to be managed by the second reference value management unit 108 may be empirically determined by means of triangle rendering performed by the graphics-rendering apparatus that actually performs processing, and measurement of processing cost incurred by line rendering with reference to the number of self-intersections. Alternatively, the reference value may also be determined theoretically by means of respective rendering algorithms.

About Determination of a Rendering by Means of Triangle Rendering and Division of a Line Segment (Scan Line)

Processing cost incurred by the determination of a rendering by means of triangulation indicated by the related-art method (3) and processing cost incurred by the determination of a rendering by means of the line segmentation indicated by the related-art method (2) will now be described. The determination of a rendering utilizing triangulation corresponds to processing for determining a fill area in each of the areas of a polygon enclosed with an outline and dividing the fill area into triangles which are easily processed by the graphics LSI when the area is determined to be a fill area. In this processing operation, the smaller the number of self-intersections with the outline of the polygon, the greater the number of fill area determination operations and the number of areas to be subjected to fill area determination processing and triangulation associated therewith. Hence, processing cost increases.

In contrast, in graphics processing utilizing line segmentation, a polygon is divided for each scan line acquired during an output, and a determination is made as to whether or not the divided areas are fill areas. Processing cost incurred by the determination of a fill area during this processing operation is heavily dependent on the number of scan lines. In each scan line, fill area determination processing is a one-dimensional problem, and hence the influence of complexity of a polygon is small.

As mentioned above, when the number of self-intersections with the outline of a polygon is small, processing cost incurred when a rendering is determined by means of triangulation is low. When the number of self-intersections with the outline of a polygon is large, processing cost incurred when a rendering is determined by means of line segmentation is low. Accordingly, the number of self-intersections with the outline of a polygon is subjected to comparison, to thus select the determination of a rendering which incurs low cost. As a result, a graphic object is adaptively subjected to high-speed rendering.

Second Rendering Data Generation Unit 115

Next, the second rendering data generation unit 115 will be described. The second rendering data generation unit is caused to operate when the second rendering operation switching unit 114 has determined triangulation graphics processing of an input polygon to be fast. The second rendering data generation unit reads the vector data group constituting the outline of a polygon managed by the vector data group management unit 102, the rendering attribute data managed by the rendering attribute data management unit 104, and the graphics self-intersection data managed by the self-intersection management unit 113; determines an area which becomes the fill area of the polygon; and generates data as an aggregation of triangles (1007).

The details of triangulation of a polygon is described in detail in the related-art document 2, which is listed above.

The method described in this document is a mere embodiment, and the present invention is not limited to this method.

Second Rendering Unit 116

The rendering data generated by the second rendering data generation unit 115 are input to the second rendering unit 116, where the data are subjected to rendering. The second rendering unit 116 will now be described.

The second rendering unit reads the rendering attribute data managed by the rendering attribute data management unit 104 and a group of triangle data generated by the second rendering data generation unit 115, and performs rendering (step 1008).

Specifically, attributes pertaining to the fill area of a graphic object, such as a color, opacity, and the like, designated by the rendering attribute data, are set on the triangle data, to thereby perform rendering.

Hardware specifically designed for rendering a triangle or a general-purpose graphics processing LSI may also be used for actually rendering triangles. Alternatively, rendering of triangles may also be performed in the manner of software by use of another means.

Third Rendering Data Generation Unit 117

The third rendering data generation unit 117 will now be described. The third rendering data generation unit is operated when the second rendering operation switching unit 114 determines line segmentation graphics processing of an input polygon to be fast. The third rendering data generation unit reads the vector data group constituting the outline of the polygon managed by the vector data group management unit 102 and the rendering attribute data managed by the rendering attribute data management unit 104; divides an area including the polygon into line segments in the direction of a scan line; and further determines whether a line segment belongs to the fill area or the outer area of the graphic object on a per-line-segment basis, to thus divide the graphic object and generate line segment data pertaining to the fill area of the graphic object (step 1009).

Rendering for dividing a polygon into line segments includes a method such as per-scan-line graphics rendering and the like. The term "per-scan-line graphics rendering" means that rendering is taken as processing performed on a per-scan-line basis; namely, processing for rendering an opaque area in the graphic object by means of a plurality of lines on a per-scan-line basis. For instance, a polygonal graphic object is available. When rendering of this graphic object is conceived, the polygonal graphic object can be rendered while being divided for line rendering operation on a per-scan-line basis. Lines are rendered with pixel-level accuracy.

Rendering of a polygonal graphic object is replaced with rendering of a plurality of lines. Rendering a line requires only a start point and an end point of a line to be rendered. Specifically, when graphics rendering performed on a per-scan-line basis is conceived, the only requirement can be said to be computing a start point and an end point of a line to be rendered.

Third Rendering Unit 118

Rendering data generated by the third rendering data generation unit are input to the third rendering unit 118, where rendering is performed. The third rendering unit 118 will now be described.

The third rendering unit reads the rendering attribute data managed by the rendering attribute data management unit 104 and a group of sets of line segment data generated by the third rendering data generation unit 117, and performs rendering (step 1010).

Specifically, attributes pertaining to the fill area of a graphic object, such as a color, opacity, and the like, designated by the rendering attribute data, are set on the line segment data, to thereby perform rendering.

Hardware specifically designed for rendering line segments or a general-purpose graphics processing LSI may also be used for actually rendering line segments. Alternatively, rendering of line segments may also be performed in the manner of software by use of another means.

Rendering Result Output Section 119

The rendering result output section 119 will now be described. The rendering result output section outputs a rendering result obtained by any one of the first rendering unit 111, the second rendering unit 116, and the third rendering unit 118 (step 1011).

The rendering result obtained by the rendering unit corresponds to logical pixel data. Hence, the rendering result output section produces an output by means of converting a rendering result according to the form of a destination where an output is to be delivered.

A rendering result may be output to a display device such as an CRT, an LCD, or the like; a printing device such as a printer; a recording medium such as a main storage device, an auxiliary storage device, a CD, a DVD, or the like; or another device or means.

The above-described method is a mere embodiment, and the present invention is not limited to the method.

Advantages of the First Embodiment

In the first embodiment, the fastest rendering operation can be performed according to the operating status of the graphics-rendering apparatus. When the apparatus is busy, a decrease in graphics-rendering performance is minimized, and high-speed rendering can be performed when the apparatus is in an idle state.

This is particularly effective for a case where hardware resources are limited as in the case of a compact PC, a portable telephone, AV equipment having an interactive graphics-rendering feature, and the like, and where tasks for which a plurality of different types of processing operations are performed are run on a single piece of hardware.

First Modification of the First Embodiment

Figure 10:
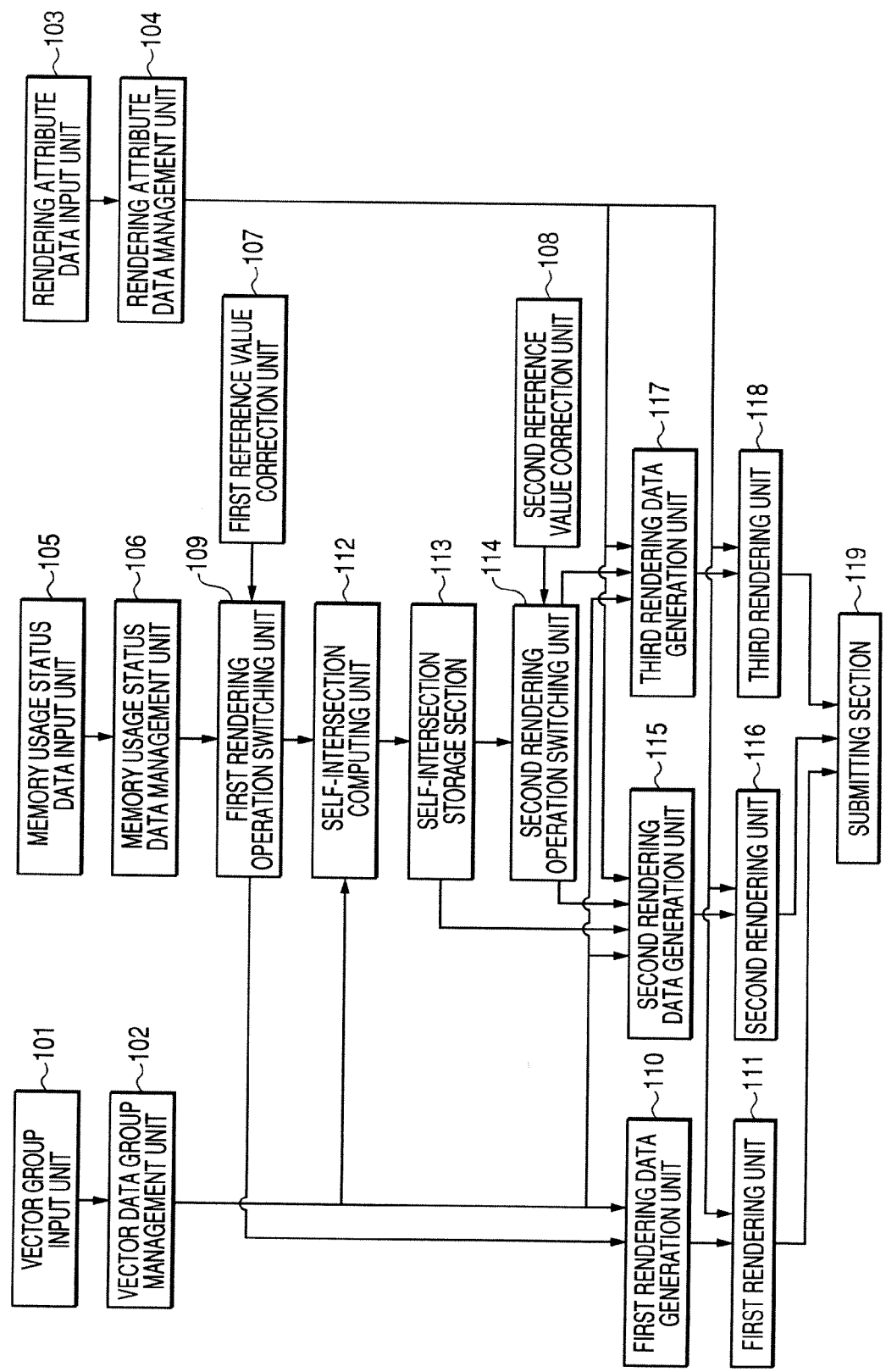
FIG. 10 is a view for schematically showing an example configuration of a graphics-rendering apparatus according to a first modification of the first embodiment of the present invention.

FIG. 10 is an overall block diagram of a graphics-rendering apparatus according to a first modification of the first embodiment of the present invention.

In connection with the first embodiment, the graphics-rendering apparatus of the first embodiment is configured to have a first reference value correction unit in place of the first reference value management unit and a second reference value correction unit in lieu of the second reference value management unit.

First Reference Value Correction Unit

The first reference value correction unit will be described. The first reference value correction unit computes a reference value to be compared with the memory usage status data from a value relevant to the determination of memory usage status data, such as the resolution of an output rendering.

Specifically, as described for the first reference value management unit 107, the size of a required stencil buffer greatly changes according to the resolution of an output rendering. Therefore, the minimum required memory usage status is computed in accordance with the resolution of an output rendering and the accuracy of the stencil buffer.

Thereby, even when the usage of memory of the apparatus varies in a plurality of modes or when the resolution of an output rendering is dynamically changed, the reference value can be dynamically changed according to a rendering status.

Second Reference Numeral Correction Unit

The second reference numeral correction unit will now be described. The second reference value correction unit computes a reference value to be compared with the number of self-intersections from a value relevant to the determination of the number of self-intersections, such as the processing status of the rendering data generation unit.

Specifically, as described for the second reference numeral management unit 108, the reference value pertaining to the number of self-intersections changes according to the cost of each of rendering operations. For this reason, the reference value pertaining to the number of self-intersections is computed from processing cost achieved in the current status of rendering operation.

The reference value can be dynamically changed according to the processing status of the apparatus.

The first reference value correction unit and the second reference value correction unit dynamically correct a reference value according to the operating status of the apparatus. By means of correcting operation, switching of rendering operation can be controlled in a more detailed manner, whereby efficiency of processing is enhanced.

Example dynamic correction of a reference value has been described above. However, the present invention is not limited to this example. Any method which enables dynamic correction of a reference value can be used.

In connection with subsequent processing of the first modification of the first embodiment in the present invention, the description in the first embodiment stating that the reference value input unit reads a reference value is replaced, as required, with a description stating that the reference value input unit reads the reference value corrected by the reference value correction unit. Operations other than the operation described above are the same as the operations in the first embodiment.

Advantage of the First Modification

When compared with the first embodiment, the first modification enables high-speed rendering when the apparatus is in an idle state by means of switching rendering operation according to the operating status of the apparatus, to thus minimize a decrease in the performance of rendering operation even when the apparatus is busy.

This is particularly effective for a case where hardware resources are limited as in the case of a compact PC, a portable telephone, AV equipment having an interactive graphics-rendering feature, and the like, and where tasks for which a plurality of different types of processing operations are performed are run on a single piece of hardware.

Second Modification of the First Embodiment

Figure 11:
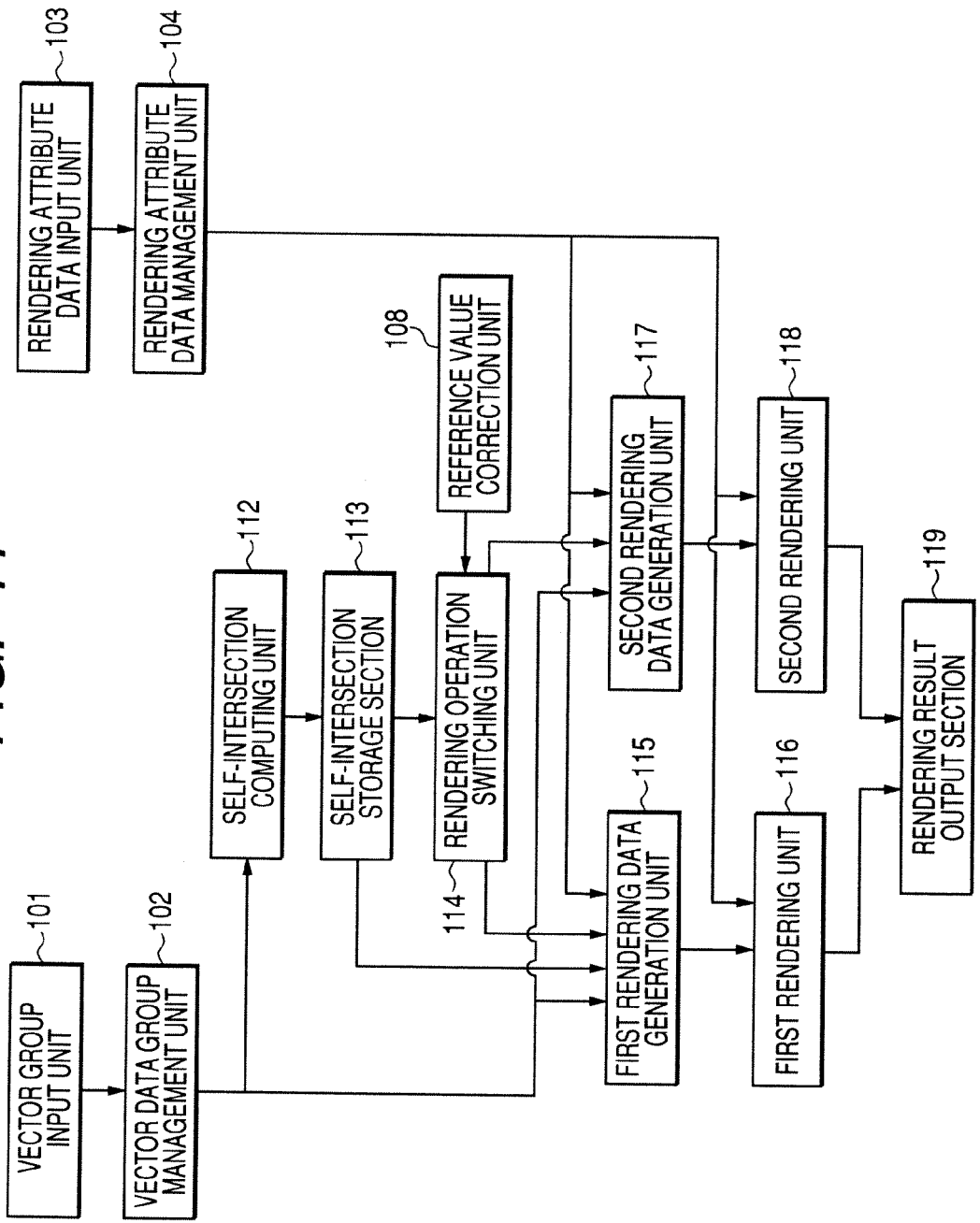
FIG. 11 is a view for schematically showing an example configuration of a graphics-rendering apparatus according to a first modification of the first embodiment of the present invention.

FIG. 11 shows a graphics-rendering apparatus according to a second modification of the first embodiment.

The graphics-rendering apparatus of the second modification is identical with the graphics-rendering apparatus of the first embodiment, except that the first reference value management unit 107, the memory usage status data input unit 105, the memory usage status data management unit 106, the first rendering operation switching unit 109, the first rendering data generation unit 110, and the first rendering unit 111 are omitted from the graphics-rendering apparatus of the first embodiment.

Accordingly, the second reference value management unit of the first embodiment corresponds to a reference value management unit of the second modification; the second rendering operation switching unit of the first embodiment corresponds to a rendering operation switching unit of the second modification; the second rendering data generation unit of the first embodiment corresponds to a first rendering data generation unit of the second modification; the second rendering unit of the first embodiment corresponds to a first rendering unit of the second modification; the third rendering data generation unit of the first embodiment corresponds to a second rendering data generation unit of the second modification; and the third rendering unit of the first embodiment corresponds to a second rendering unit of the second modification.

The second modification is described in connection with the first embodiment. After input of the vector data group and the rendering attribute data, the self-intersection computing unit 112 is caused to operate in place of the first rendering operation switching unit 109, and processing is continued. Specifically, in the processing flow of the first embodiment shown in FIG. 3, processing is caused to proceed to step 1005 from step 1001 by means of skipping step 1002. The graphics-rendering apparatus of the second modification operates in the same manner as does its counterpart of the first embodiment, except for the operations mentioned above.

Advantage of the Second Modification

In the second modification where the stencil buffer cannot be utilized, high-speed rendering can be performed according to an input graphic object. As compared with the first embodiment, the second modification is more effective in the case of limited hardware resources.

Third Modification of the First Embodiment

Figure 12:
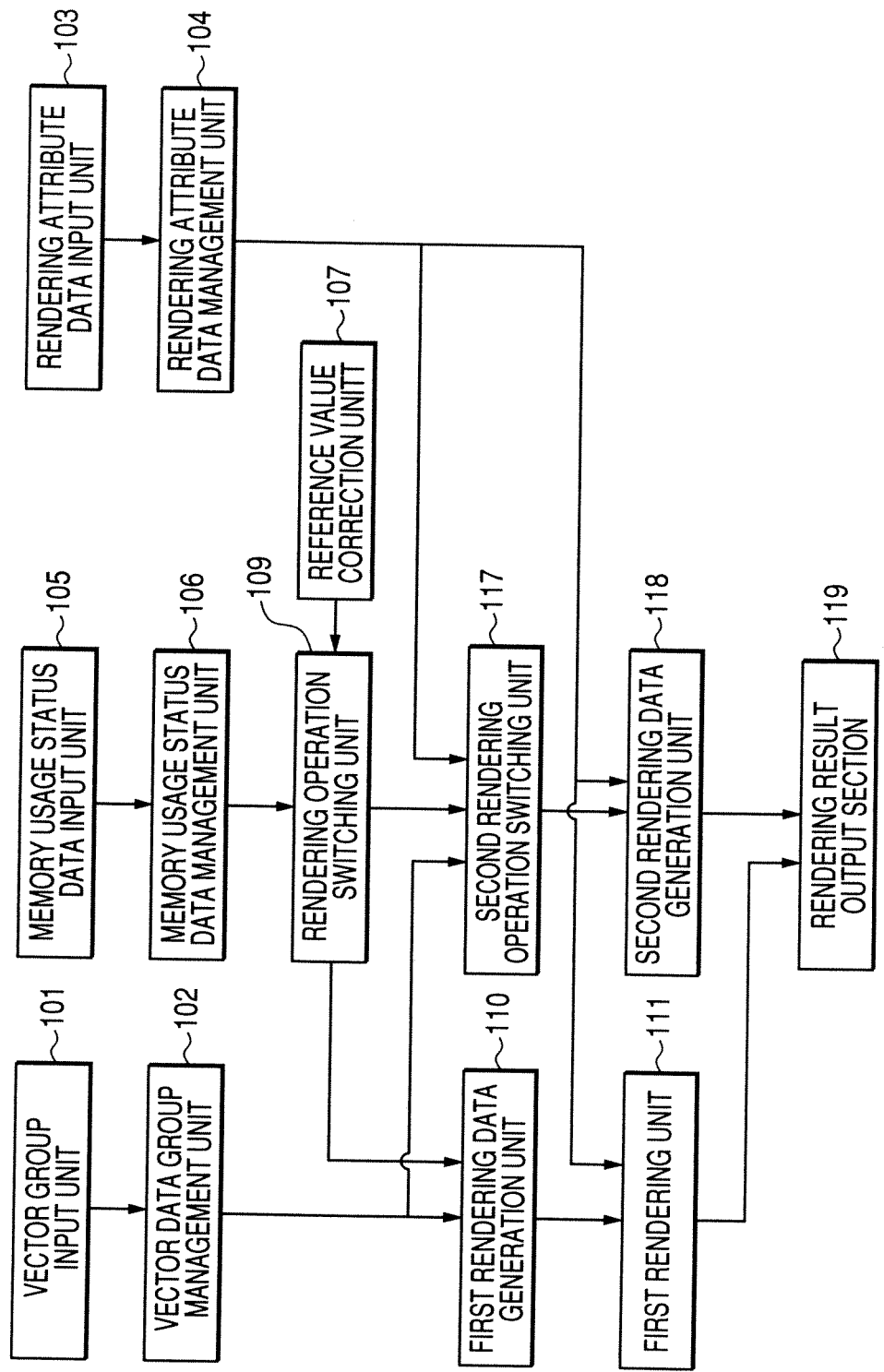
FIG. 12 is a view for schematically showing an example configuration of a graphics-rendering apparatus according to a second modification of the first embodiment of the present invention.

FIG. 12 shows a graphics-rendering apparatus according to a third modification of the first embodiment.

The graphics-rendering apparatus of the third modification is identical with the graphics-rendering apparatus of the first embodiment, except that the second reference value management unit 108, the self-intersection computing unit 112, the self-intersection management unit 113, the second rendering operation switching unit 114, the second rendering data generation unit 115, and the second rendering unit 116 are omitted from the graphics-rendering apparatus of the first embodiment.

Accordingly, the first reference value management unit of the first embodiment corresponds to a reference value management unit of the third modification; the first rendering operation switching unit of the first embodiment corresponds to a rendering operation switching unit of the third modification; the third rendering data generation unit of the first embodiment corresponds to a second rendering data generation unit of the third modification; and the third rendering unit of the first embodiment corresponds to a second rendering unit of the third modification.

The third modification will be described in connection with the first embodiment. When the first rendering operation switching unit 109 has determined that the stencil buffer cannot be ensured, the third rendering data generation unit 117 is caused to operate, and processing proceeds. Specifically, in the processing flow of the first embodiment shown in FIG. 3, when the determination in step 1002 shows that ensuring a stencil buffer is impossible, processing is caused to proceed to step 1009. The graphics-rendering apparatus of the third modification operates in the same manner as does its counterpart of the first embodiment, except for the operations mentioned above.

Advantage of the Third Modification

In an embodiment where rendering is performed by use of hardware which renders triangles at lower speed than rendering line segments or an embodiment where the number of self-intersections of an input vector data group is previously determined to be larger than that achieved when triangle rendering is performed at high speed, rendering can be performed at high speed according to the operating status of the apparatus.

The present modification is effective for a case where processing is performed by means of hardware which is more limited than that of the first embodiment and a case where the number of self-intersections in the input vector data group is large.

Fourth Modification of the First Embodiment

Figure 13:
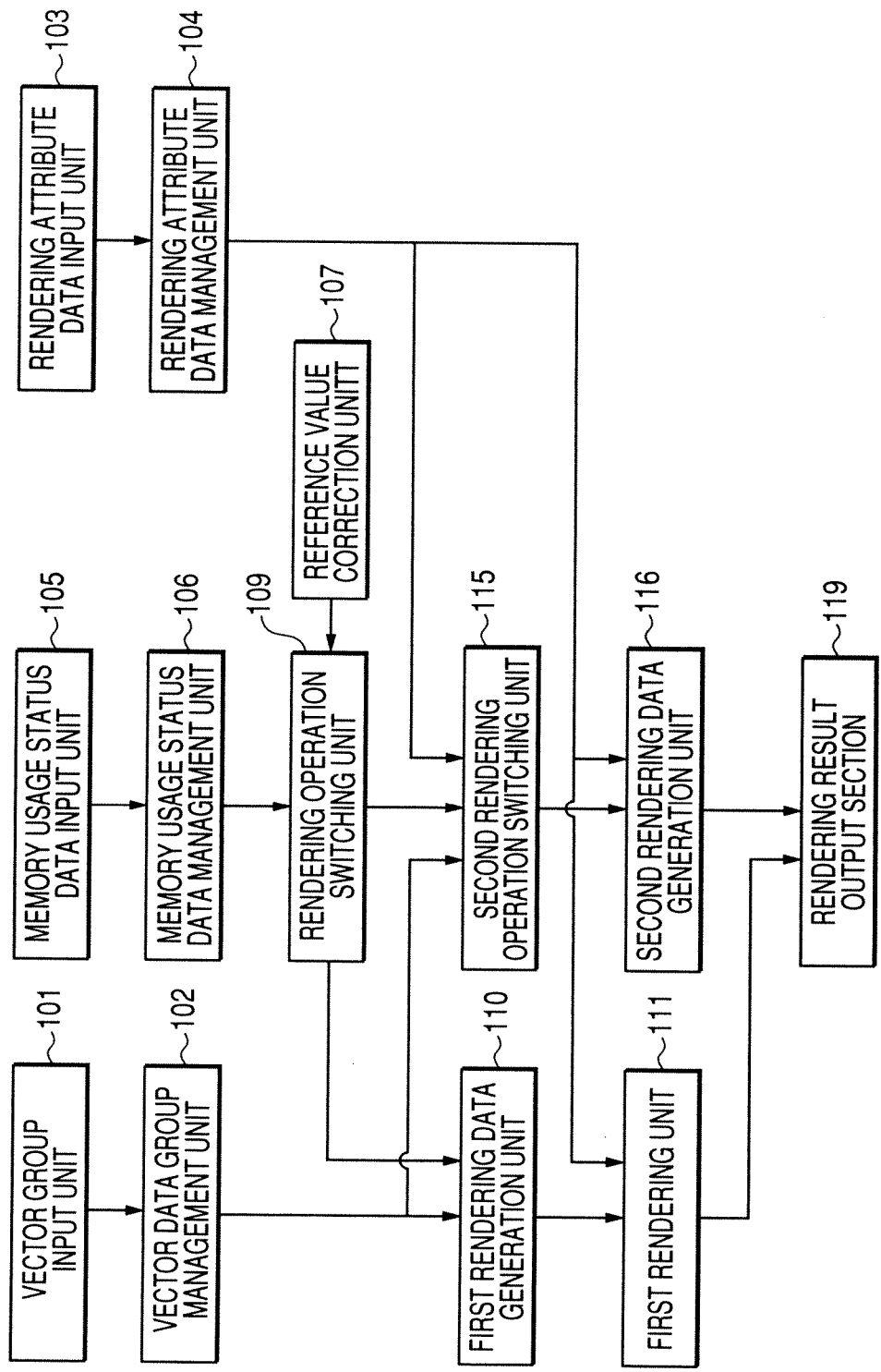
FIG. 13 is a view for schematically showing an example configuration of a graphics-rendering apparatus according to a third modification of the first embodiment of the present invention.

FIG. 13 shows a graphics-rendering apparatus according to a fourth modification of the first embodiment.

The graphics-rendering apparatus of the fourth modification is identical with the graphics-rendering apparatus of the first embodiment, except that the second reference value management unit 108, the self-intersection computing unit 112, the self-intersection management unit 113, the second rendering operation switching unit 114, the third rendering data generation unit 117, and the third rendering unit 118 are omitted from the graphics-rendering apparatus of the first embodiment.

Accordingly, the first reference value management unit of the first embodiment corresponds to a reference value management unit of the fourth modification; and the first rendering operation switching unit of the first embodiment corresponds to a rendering operation switching unit of the fourth modification.

The fourth modification is described in connection with the first embodiment. When the first rendering operation switching unit 109 has determined that the stencil buffer cannot be ensured, the second rendering data generation unit 115 is caused to operate, and processing proceeds. Specifically, in the processing flow of the first embodiment shown in FIG. 3, the determination made in step 1002 shows that ensuring a stencil buffer is impossible, processing is caused to proceed to step 1007. The graphics-rendering apparatus of the fourth modification operates in the same manner as does its counterpart of the first embodiment, except for the operations mentioned above.

Advantage of the Fourth Modification

In an embodiment where rendering is performed by use of hardware which renders line segments at lower speed than rendering triangles, rendering can be performed at high speed according to the operating status of the apparatus.

The present modification is effective for a case where processing is performed by means of hardware which is more limited than that of the first embodiment.

Second Embodiment

The second embodiment shows an example graphics-rendering apparatus which takes, as inputs, vector data pertaining to a sweep line and vector data pertaining to a shape swept along a sweep line and which selects high-speed rendering of a graphic object to be swept against the backdrop of the apparatus during rendering operation, thereby performing rendering operation.

Figure 14:
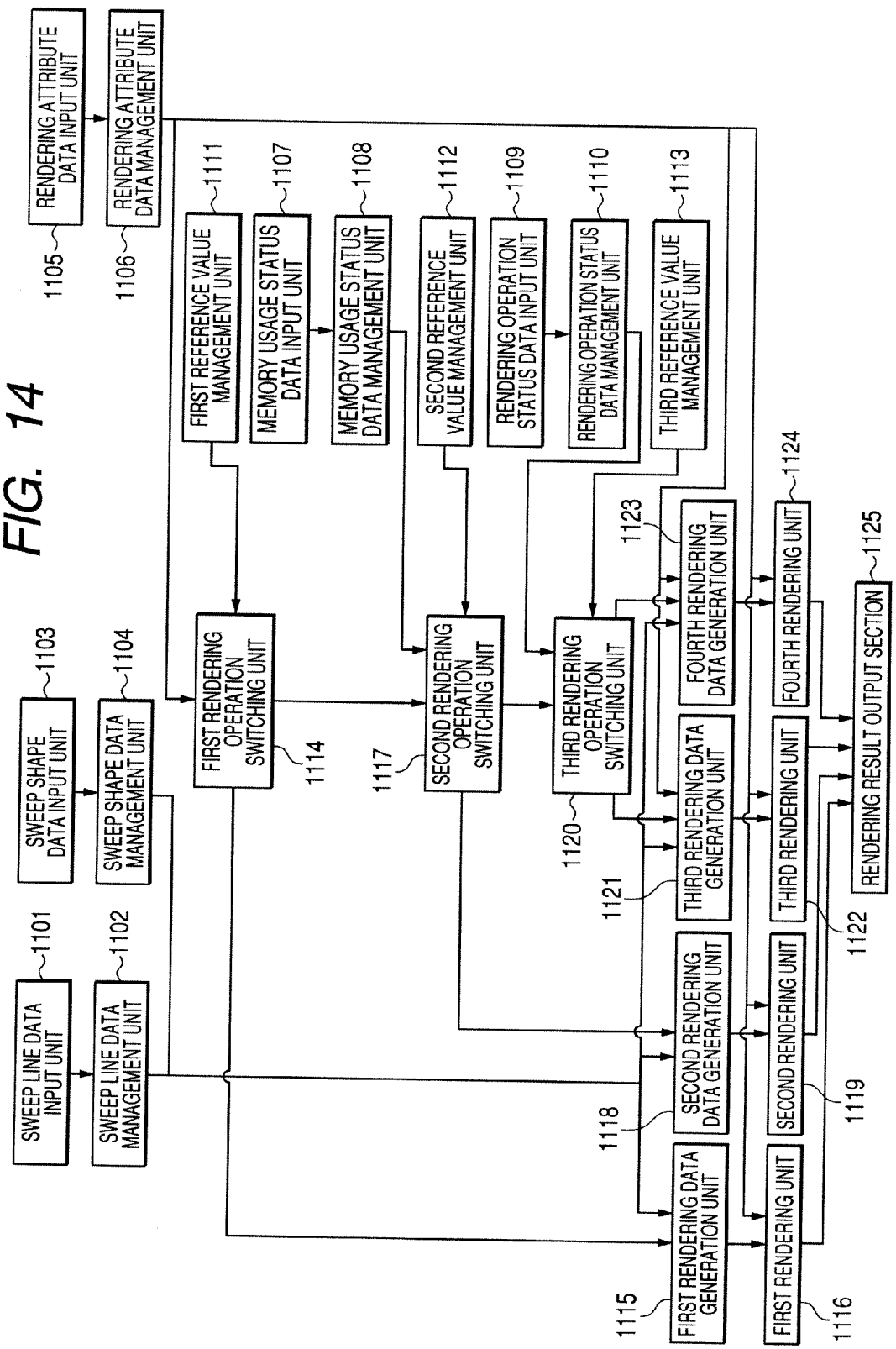
FIG. 14 is a view for schematically showing an example configuration of a graphics-rendering apparatus according to a second embodiment of the present invention.

FIG. 14 shows a graphics-rendering apparatus according to the second embodiment of the present invention. The graphics-rendering apparatus of the second embodiment includes: a sweep line data input unit 1101 for inputting a vector data group showing a sweep line; a sweep line data management unit 1102 for storing the sweep line data input through the sweep line data input unit 1101; a sweep shape data input unit 1103 for inputting a vector data group showing a shape to be swept; a sweep shape data management unit 1104 for managing the sweep shape data input through the sweep shape data input unit 1103; a rendering attribute data input unit 1105 for inputting rendering attribute data showing the attribute of a fill area of a graphic object; a rendering attribute data management unit 1106 for managing the rendering attribute data input through the rendering attribute data input unit 1105; a memory usage status data input unit 1107 for acquiring the usage status of memory; a memory usage status data management unit 1108 for managing the memory usage status data input through the memory usage status data input unit 1107; a rendering operation status data input unit 1109 for acquiring rendering operation status data; a rendering operation status data management unit 1110 for managing the rendering operation status data input through the rendering operation status data input unit 1109; a first reference value management unit 1111 for managing an opacity reference value referred to when a determination is made as to whether to switch rendering operation; a second reference value management unit 1112 for managing a memory usage status reference value to be referred to when a determination is made to switch rendering operation; a third reference value management unit 1113 for managing a reference value of rendering operation status data to be referred to when a determination is made to switch rendering operation; a first rendering operation switching unit 1114 which reads the rendering attribute data managed by the rendering attribute data management unit 1106 and the opacity reference value managed by the first reference value management unit 1111, subjects the thus-read data and value to comparison and determination, and controls operation of a first rendering data generation unit 1115 and that of a second rendering operation switching unit 1117, which will be described later, the first rendering data generation unit 1115, whose operation is controlled by the first rendering operation switching unit 1114, and which reads the sweep line data managed by the sweep line data management unit 1102 and sweep shape data managed by the sweep shape data management unit 1104, and generates rendering data by means of processing for disregarding an overlap between graphic objects; a first rendering unit 1116 which reads the rendering data generated by the first rendering data generation unit 1115 and the rendering attribute data managed by the rendering attribute data management unit 1106, to thus perform rendering operation, the second rendering operation switching unit 1117, whose operation is controlled by the first rendering operation switching unit 1114, and which reads the memory usage status data managed by the memory usage status data management unit 1108 and the memory usage status reference value managed by the second reference value management unit 1112, subjects the thus-read data and value to comparison and determination, and controls operation of a second rendering data generation unit 1118 and that of a third rendering operation switching unit 1120, which will be described later; the second rendering data generation unit 1118, whose operation is controlled by the second rendering operation switching unit 1117, and which reads the sweep line data managed by the sweep line data management unit 1102 and sweep shape data managed by the sweep shape data management unit 1104, and generates rendering data used for effecting rendering operation utilizing a depth test; a second rendering unit 1119 which reads the rendering data generated by the second rendering data generation unit 1118 and the rendering attribute data managed by the rendering attribute data management unit 1106, to thus perform rendering operation utilizing a depth test, the third rendering operation switching unit 1120, whose operation is controlled by the second rendering operation switching unit 1117, and which reads the rendering operation status data managed by the rendering operation status data management unit 1110 and the rendering operation status reference value managed by the third reference value management unit 1113, subjects the thus-read data and value to comparison and determination, and controls operation of a third rendering data generation unit 1121 and that of a fourth rendering data generation unit 1123, which will be described later, the third rendering data generation unit 1121, whose operation is controlled by the third rendering operation switching unit 1120, and which reads the sweep line data managed by the sweep line data management unit 1102 and the sweep shape data managed by the sweep shape data management unit 1104, and generates rendering data used for effecting rendering utilizing an alpha value; a third rendering unit 1122 which reads the rendering data generated by the third rendering data generation unit 1121 and the rendering attribute data managed by the rendering attribute data management unit 1106, and performs rendering operation utilizing an alpha value, the fourth rendering data generation unit 1123, whose operation is controlled by the third rendering operation switching unit 1120, and which reads the sweep line data managed by the sweep line data management unit 1102 and sweep shape data managed by the sweep shape data management unit 1104, calculates an outline of a graphic object, and generates rendering data by means of polygon rendering operation; a fourth rendering unit 1124 which reads the rendering data managed by the fourth rendering data generation unit 1123 and the rendering attribute data managed by the rendering attribute data management unit 1106, to thus perform rendering operation; and a rendering result output section 1125 for submitting a rendering result output from anyone of the first rendering unit 1116, the second rendering unit 1119, the third rendering unit 1022, and the fourth rendering unit 1124.

In FIG. 14, all of the management units are represented as different blocks. However, these blocks may also be collected into single memory or divided into a plurality of different memory devices.

Similarly, the rendering units are represented as different blocks. However, these blocks may also be collected into a single rendering processor having a plurality of functions or divided into a plurality of different rendering processors.

Figure 15:
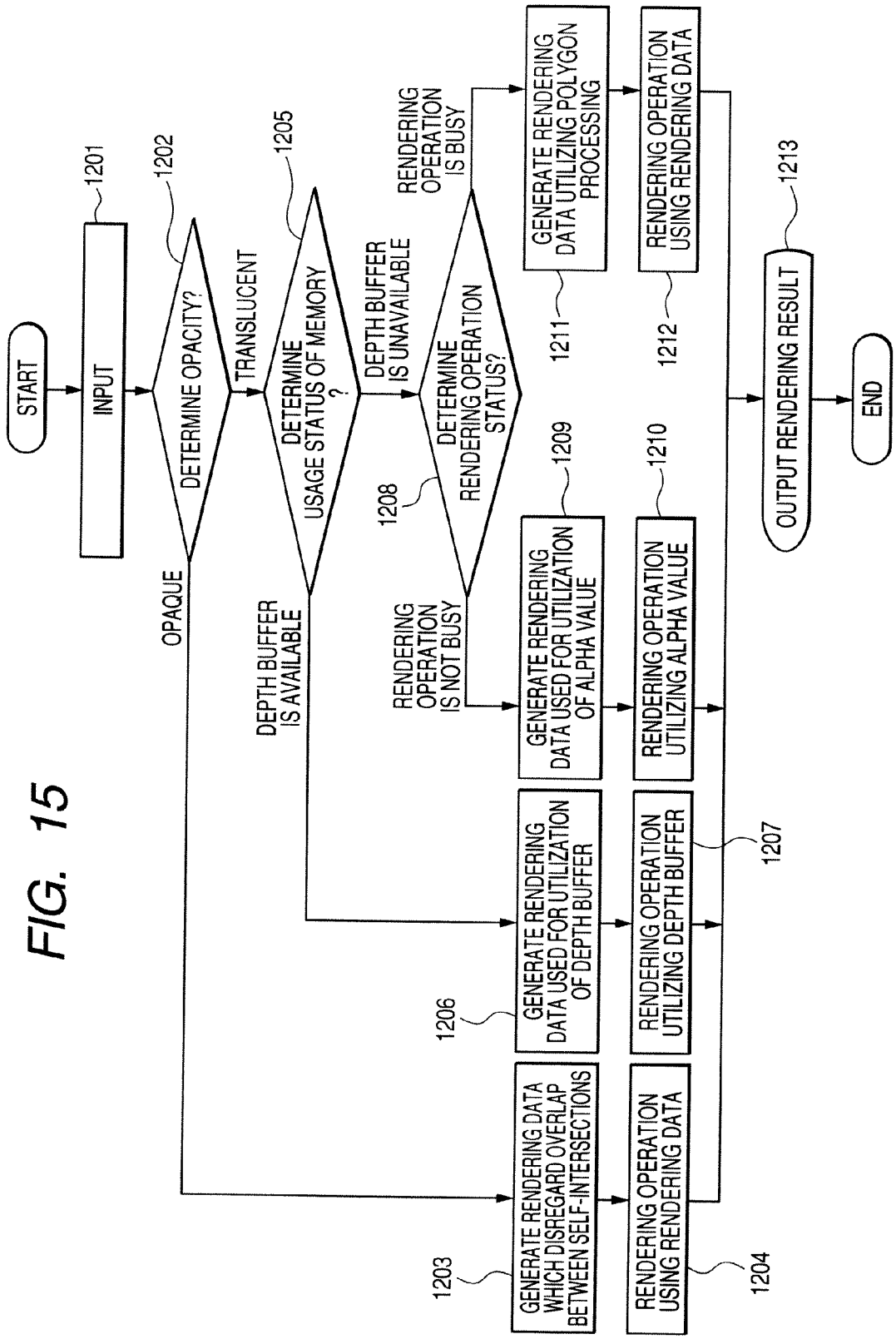
FIG. 15 is a view showing a processing flow employed in the second embodiment of the present invention.

Next, operation of the graphics-rendering apparatus of the second embodiment will be described by reference to a flow-chart shown in FIG. 15, and operations of the respective blocks will be described by reference to FIG. 14.

Description of Graphics Rendering

First, graphics rendering of the present embodiment will now be described. Graphics rendering performed in the present embodiment is for rendering a graphic object, which can be formed by means of sweeping sweep shape data, from the vector data group forming a sweep line and data pertaining to a shape to be swept along the sweep line. At that time, the fill area of the graphic object is filled in according to a specific rule.

Figure 16:
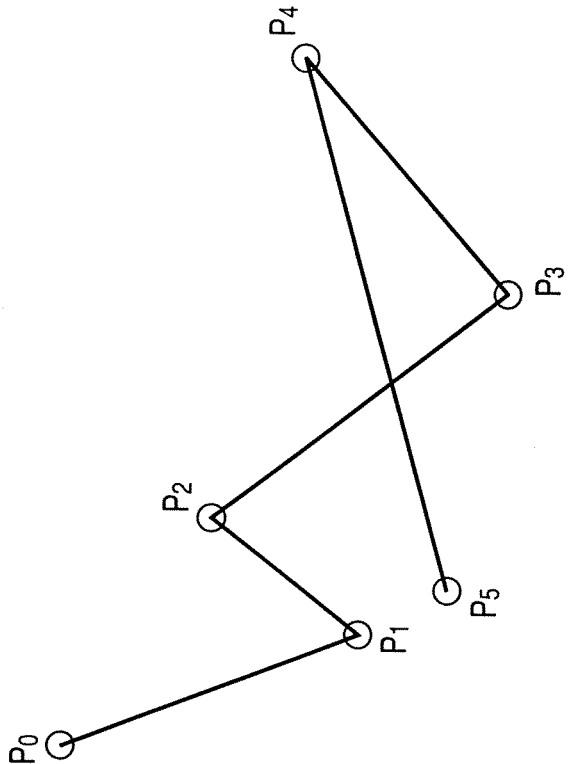
FIG. 16 is a view showing example sweep line data.
Figure 17:
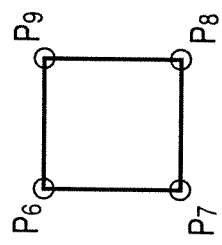
FIG. 17 is a view showing example sweep shape data.
Figure 18:
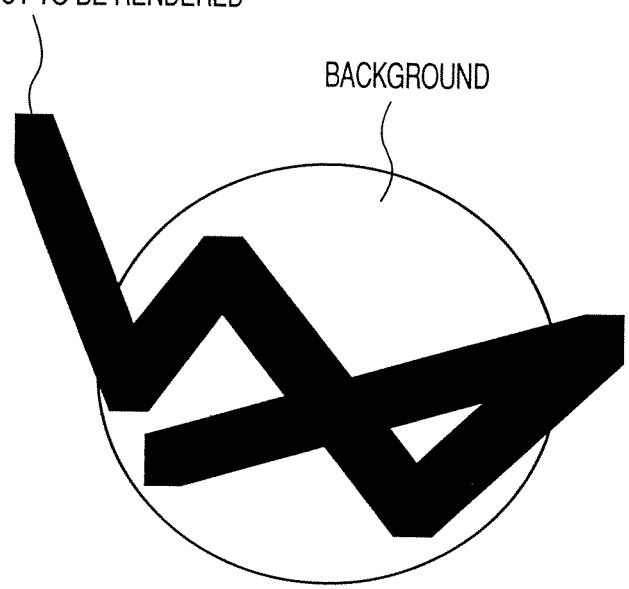
FIG. 18 is a view showing example rendering of an opaque graphic object in the second embodiment of the present invention.
Figure 19:
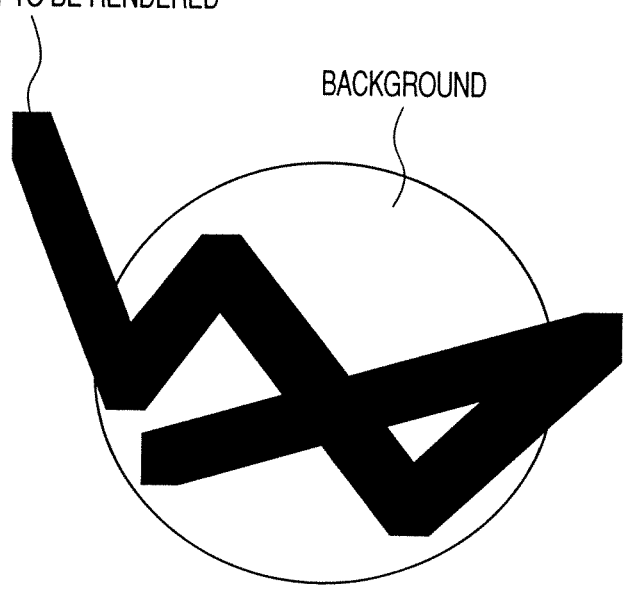
FIG. 19 is a view showing example rendering of a translucent graphic object in the second embodiment of the present invention.

Specifically, provided that there have been input a vector data group forming a "sweep line (obtained through a single stroke writing)" such as "point 0" to "point 5" as shown in FIG. 16, a vector data group forming a "sweep shape" such as "point 7" to "point 9" shown in FIG. 17, and rendering attribute data including a fill rule and a color and opacity of the fill area, graphic objects such as those shown in FIGS. 18 and 19 are rendered. In FIGS. 18 and 19, a sweep shape is obtained by means of rendering a locus, which can be formed by means of effecting a sweep along a sweep line, as a graphic object. Accordingly, the fill area of a graphic object is defined as a fill area of a sweep shape when the sweep shape is placed at an arbitrary point on the sweep line. With regard to an area where a self-intersection exists in a sweep line, rendering is performed in a single color without filling in the intersection in an overlapping manner even when the fill area is opaque as shown in FIG. 19.

Therefore, when the fill area is opaque and a self-intersection exists, detecting the intersection and performing processing which avoids the filling to be performed for a multiple times (multiple filling). However, when the fill area is opaque, avoiding multiple filling does not need to be performed, regardless of existence/absence of the self-intersection.

Therefore, in relation to graphics rendering mentioned above, the present embodiment describes a graphics-rendering apparatus which selects graphics processing for enabling high-speed rendering of the area filled in an overlapped manner, against the backdrop of the operating status of the graphics-rendering apparatus during execution of rendering operation.

In rendering operation, a graphic object shown in FIGS. 18 and 19 is finally output as raster data consisting of pixels with color and opacity thereof being set.

General Processing Flow in the Second Embodiment

A processing flow along which graphics-rendering of the present embodiment is performed will now be described by reference to the flowchart shown in FIG. 15.

When the graphics-rendering apparatus initiates graphics rendering operation, sweep line data, sweep shape data, rendering attribute data, memory usage status data, and rendering operation status data are input (step 1201).

Next, a determination is made as to whether or not rendering of an overlap in a graphic object to be rendered is necessary, on the basis of opacity of the rendering attribute data (step 1202).

When the determination made in step 1202 shows that processing of the overlap in the graphic object to be rendered is not necessary, rendering data formed from triangles which disregard an overlap in the graphic object to be rendered are generated (step 1203). Graphics-rendering operation is performed by means of triangle rendering (step 1204).

When the determination made in step 1202 shows that processing of the overlap in the graphic object to be rendered is necessary, a determination is made whether or not the overlap in the graphic object to be rendered can be processed by utilization of a depth buffer, by means of comparing the memory usage status with a threshold value (step 1205).

When the determination made in step 1205 shows that the depth buffer is available, rendering data used for updating the depth buffer and effecting rendering operation utilizing the depth buffer are generated (step 1206), and updating of the depth buffer and rendering utilizing the depth buffer are performed (step 1207).

When the determination made in step 1205 shows that the depth buffer is unavailable, the processing load of the rendering unit is compared with the threshold value, and a determination is made as to whether or not the overlap in the graphic object to be rendered can be processed at high speed by utilization of an alpha value (step 1208).

When the determination made in step 1208 shows that the overlap in the graphic object to be rendered can be processed at high speed by utilization of the alpha value, rendering data used for updating the alpha value and performing rendering operation utilizing the alpha value are generated (step 1209).

The alpha value is updated, and rendering utilizing the alpha value is performed (step 1210).

When the determination made in step 1208 shows that the overlap in the graphic object to be rendered cannot be processed at high speed by utilization of the alpha value, the outline of the graphic object to be rendered is computed, and rendering data formed by dividing the graphic object into triangles or line segments are generated (step 1211), and rendering operation is performed by means of triangle rendering or line rendering (step 1212).

As above, rendering is performed in any of the steps, and a rendering result is output (step 1213). The respective steps will now be described in more detail below.

Descriptions of a Sweep Line

A vector data group forming a sweep line which is one of inputs for graphics rendering will now be described.

The vector data group forming a sweep line described in connection with the present embodiment is identical in structure with the vector data group described in connection with the first embodiment.

Specifically, the vector data group consists of N sets of point data $P_1$ to $P_N$, each of which has two-dimensional or three-dimensional coordinates. In contrast with the first embodiment, since the sweep line represents not a polygon but a continual line segment, the sweep line is handled without modification even when $P_0=P_{N-1}$ is not achieved.

Descriptions of a Sweep Line Data Input Unit 1101

Sweep Line Data Management Unit 1102

Input of a vector data group forming a sweep line, which is one of the inputs for graphics rendering as mentioned previously, is performed by the sweep line data input unit 1101, and the input data are stored in the sweep line data management unit 1102.

Input of sweep line data is performed as reading of data previously stored in an auxiliary storage device, an FD, CD-ROM, DVD-ROM, or the like, or as interactive reading of an input performed by means of a human interface device such as a mouse, a keyboard, a keypad, a pen tablet, or a touch panel.

Descriptions of a Sweep Shape

A vector data group forming a sweep shape, which is one of inputs for graphics rendering, or a group of sets of point data corresponding to the vector data group will now be described.

The vector data group forming a sweep shape described in the present embodiment is analogous in structure with the vector data group described in connection with the first embodiment.

Specifically, the vector data group consists of N sets of point data $P_1$ to $P_N$, each of which has two-dimensional or three-dimensional coordinates. In contrast, when $P_0=P_{N-1}$ is not achieved, a polygon is not closed, and hence processing is performed on the assumption of a virtual point where $P_N=P_1$ is achieved.

Descriptions of a Sweep Shape Data Input Unit 1103

Sweep Shape Data Management Unit 1104

Input of a vector data group forming a sweep shape, which is one of the inputs for graphics rendering as mentioned previously, is performed by the sweep shape data input unit 1103, and the input data are stored in the sweep shape data management unit 1104.

Input of sweep shape data is performed as reading of data previously stored in an auxiliary storage device, an FD, CD-ROM, DVD-ROM, or the like, or as interactive reading of an input performed by means of a human interface device such as a mouse, a keyboard, a keypad, a pen tablet, or a touch panel.

Descriptions of Rendering Attribute

A rendering attribute, which is one of inputs of graphics rendering, will now be described.

A rendering attribute used in the present embodiment corresponds to the rendering attribute described in connection with the first embodiment, except that the fill rure is removed. Namely, the rendering attribute includes information pertains to attributes employed during rendering of a graphic object, such as the color and opacity of the fill area, and the like.

Rendering Attribute Data Input Unit 1105

Rendering Attribute Data Management Unit 1106

Input of rendering attribute data, which is one of the inputs for graphics rendering as mentioned previously, is performed by the rendering attribute data input unit 1105, and the input data are stored in the rendering attribute data management unit 1106.

Input of rendering attribute data is performed as reading of data previously stored in an auxiliary storage device, an FD, CD-ROM, DVD-ROM, or the like, or as interactive reading of an input performed by means of a human interface device such as a mouse, a keyboard, a keypad, a pen tablet, or a touch panel.

Descriptions of a Determination Used for Switching Rendering Operation

Data used as a rendering switching determination value in the present embodiment will now be described.

In the present embodiment, opacity, memory usage status data, and rendering operation status data are used as the rendering switching determination value.

These sets of data are determined according to the characteristic of rendering operation to be switched by the data. In relation to graphics rendering of the present embodiment, when the rendering attribute is translucent, detecting self-intersections in a graphic object to be rendered and appropriate processing of an overlap in the graphic object to be rendered must be performed. However, this leads to an increase in processing cost. Therefore, high-speed rendering operation can be selected according to the input data by means of determining, from opacity, whether or not an overlap exists in the graphic object to be rendered.

Rendering utilizing a depth test of the present embodiment enables high-speed processing of an overlap in a graphic object to be rendered. The depth test is processing for imparting three-dimensional positional information, including a depth position, to vector data forming a graphic object and comparing information pertains to the depth of a background with the depth information pertains to the graphic object to be rendered during rendering operation, thereby controlling whether or not rendering is performed. The depth test is a common feature of the general-purpose graphics LSI. The test enables high-speed processing of an overlap in a graphic object to be rendered, but utilization of the depth test requires a memory area used for ensuring a buffer (a depth buffer) which stores depth information. Accordingly, a determination is made as to whether to enable rendering operation utilizing a depth test according to the usage status of memory during execution of rendering operation. Rendering operation can be selected according to the status of resources.

Rendering utilizing an alpha value of the present embodiment enables high-speed processing of an overlap in a graphic object to be rendered. The alpha value is a value for storing on a per-pixel basis information other than information pertains to colors, and is usually taken as a proportion when a graphic object to be rendered and a background are composed together. (Opacity employed in the present embodiment is also set on an alpha value under normal circumstances). Therefore, as a result of use of an alpha value in lieu of a stencil buffer, an overlap in a graphic object to be rendered can also be processed properly. However, in contrast with the stencil buffer, the alpha value is also used, at the same instant, as a merging proportion of a background image. Therefore, setting of an alpha value in consideration of merging operation is required. The stencil buffer corresponds to a function intended for controlling whether or not writing operation is enabled on a per-pixel unit. For this reason, when the stencil buffer is implemented as hardware, processing is efficiently performed (a wasteful merging operation is hardly performed) when writing of pixels is disabled. According to the method using an alpha value, an advantage equivalent to that achieved when writing of pixels is disabled is acquired by means of merging operation, and hence processing load imposed on the rendering section is higher than that imposed in the case of the stencil buffer. Accordingly, when the processing load imposed on the rendering section is already high during rendering operation, the processing speeds drops. Therefore, according to the processing status of the rendering section achieved during execution of rendering operation, a determination is made as to whether or not to enable rendering utilizing an alpha value, whereby a rendering operation can be selected according to the status of resources.

Memory Usage Status Data Input Unit 1107

Memory Usage Status Data Management Unit 1108

Processing for inputting memory usage status data—which is one of the above-described rendering operation method determination values—is performed by the memory usage status data input unit 1107, and the input data are stored in the memory usage status management unit 1108.

Here, the term "memory usage status" signifies the amount of a storage area—where data utilized in processing operation of each of the blocks constituting the graphics-rendering apparatus of the present embodiment are stored (temporarily or permanently)—used during rendering. Specifically, the memory usage status is a value determined from the maximum amount of memory, which corresponds to the amount of memory available when memory is not used at all, and the amount of memory actually used during rendering.

The memory usage status of the present embodiment is not limited to a case where the respective blocks constituting the graphics-rendering apparatus use a common memory area or a case where the respective blocks use individual memory areas.

When a common memory area is used, a memory usage status can be acquired by means of a method for taking as an input memory usage status data pertaining to a common memory area. Alternatively, when individual memory areas are used, a memory usage status can be acquired by means of another method for reading the memory usage statuses of all of the memory areas to thus compute a required memory usage status, or limiting a block for which a memory usage status is required to thus read a memory usage status of that block.

Rendering Operation Status Data Input Unit 1109

Rendering Operation Status Data Management Unit 1110

Processing for inputting rendering operation status data—which is one of the above-described rendering operation method determination values—is performed by the rendering operation status data input unit 1109. The rendering operation status data correspond to a value showing the task status of an apparatus which performs rendering operation such as a graphics LSI.

In the present embodiment, data showing the status of rendering operation provided by the first rendering unit 1116, the second rendering unit 1119, the third rendering unit 1122, and the fourth rendering unit 1124 are taken as an input.

First Rendering Operation Switching Unit 1114
First Reference Value Management Unit 1111

The first rendering operation switching unit 1114 will now be described. The first rendering operation switching unit determines whether or not the fill area attribute of the graphic object to be rendered exhibits translucency. When the attribute exhibits opacity, rendering operation which enables high-speed processing and disregards an overlap in a self-intersection of a sweep line is performed. When the attribute exhibits translucency, there is performed processing pertaining to the next step of determining graphics processing for processing the overlap in the self-intersection of the sweep line at high speed (step 1202).

Determination of opacity is performed by means of comparing a value $A_s$ showing opacity included in rendering attribute data managed by the rendering attribute data management unit 1106 with a value $A_{ref}$ showing opacity showing opacity managed by the first reference value management unit 1111; and causing the first rendering data generation unit 1115, which will be described later, to operate when $A_s$ is equal to $A_{ref}$. When $A_s$ differs from $A_{ref}$, the second rendering operation switching unit 1117 is caused to operate.

First Rendering Data Generation Unit 1115

The first rendering data generation unit 1115 will now be described. When the fill area of the graphic object is opaque, the first rendering data generation unit is caused to operate by the first rendering operation switching unit 1114, and generates rendering data which disregard an overlap in a self-intersection of a sweep line (step 1203).

Specifically, data which can be processed by the rendering section, such as line data or triangle data, are generated from a graphic object which is obtained by means of sweeping a sweep shape for each set of vector data forming a sweep line, without involvement of detection of a self-intersection or dividing operation.

Figure 20:
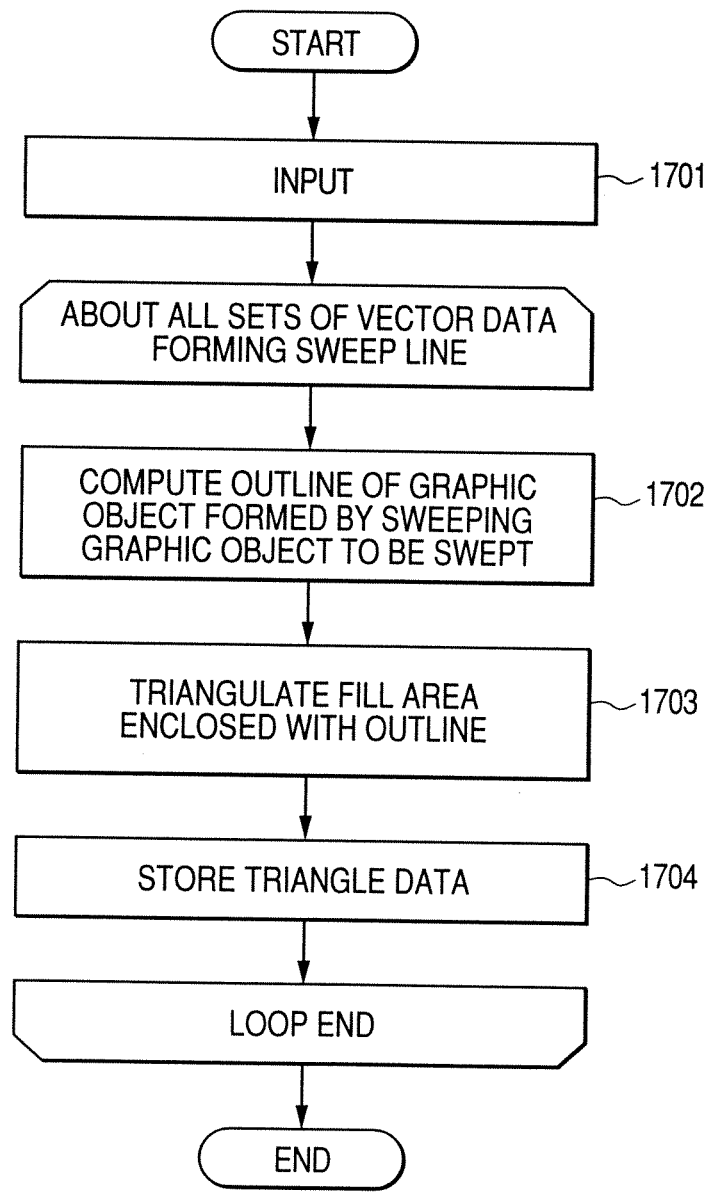
FIG. 20 is a view showing the processing flow of example graphics-rendering which disregards an overlap of a self-intersection with a sweep line.

By reference to FIG. 20, a processing flow of generation of a triangle data group will be described as an example of generation of rendering data which discard self-intersections.

First, the sweep line data input through the sweep line data input unit 1101 and the sweep shape data input through the sweep shape data input unit 1103 are read as inputs (step 1701).

The outline of a graphic object formed by sweeping a graphic object to be swept is computed for each set of vector data forming the read sweep line data (step 1702). There is performed processing for dividing the graphic object into sets of triangle data while the outline data are deemed as a polygon (step 1703). A group of the thus-generated sets of triangle data is stored (step 1704), thereby generating triangle data with regard to the entire sweep line.

As shown in FIG. 21, in the computation of an outline performed in step 1702, a shape to be swept is arranged at each of the start and end points of a sweep line vector. Points of the shape to be swept, the points being most separated from each other in a direction perpendicular to the sweep line vector, are determined at each of the right and left ends of the sweep line vector. The thus-determined points are connected to the start and end points, whereby an outline is computed. The most distant points of the shape to be swept are acquired as a point—at which the inner product of a normal vector of the sweep line vector and a vector connecting the start point of the sweep line vector with a point of the shape to be swept becomes maximum—and as a point at which the inner product becomes minimum. Provided that a function max_index $(a_i)$ which returns an index "i" of the maximum value among $a_0, a_1, \ldots, a_{N-1}$ is defined and that a function min_index$(a_i)$ which returns an index "i" of the minimum value is defined, the indices of points constituting the shape of vertices fulfilling the above conditions can be described as follows.

$$I_L = \text{max\_index}(<P>_i \cdot <n>) \quad (1)$$

$$I_R = \text{min\_index}(<P>_i \cdot <n>) \quad (2)$$

In the equations (1) and (2) listed above, $i=0, 1, \ldots, N-1$ (N denotes the number of vertices of a shape to be swept); $I_L$ denotes an index for points constituting the most distant sweep shape on the left side of the sweep line vector; and $I^R$ denotes an index for points constituting the most distant sweep shape on the right of the sweep line vector. Moreover, symbol <> denotes a vector; <n> denotes a unit normal vector oriented leftward with respect to an extending direction of the sweep line vector; $<P>_i$ denotes a position vector of a point constituting the shape to be swept when the shape to be swept is positioned at the start point of the sweep line and the start point of the sweep line is taken as the point of origin; and $<P>_i \cdot <n>$ denotes the inner product of $<P>_i$ and $<n>$.

In step 1703, the thus-computed outline is subjected to triangulation of polygon data, thereby generating a group of sets of triangle data. A case where the shape to be swept is limited to a rectangle will now be described as the simplest example of generation of triangle data. As shown in FIG. 22, when the outline is formed from points $P_0$ to $P_5$, the graphic object can be divided into four triangles: namely, $T_0$: $P_0 \to P_1 \to P_5$, $T_1$: $P_1 \to P_4 \to P_5$, $T_2$: $P_1 \to P_2 \to P_4$, and $T_3$: $P_2 \to P_3 \to P_4$.

Various methods are available for generation of the triangle data group in steps 1702, 1703. The present embodiment is not limited to the processing method described herein, and another, arbitrary method can also be used.

First Rendering Unit 1116

The rendering data generated by the first rendering data generation unit 1115 are input to the first rendering unit 1116, where rendering operation is performed. The first rendering unit 1116 will now be described.

The first rendering unit reads the triangle data group generated by the first rendering data generation unit 1115 and the rendering attribute data managed by the rendering attribute data management unit 1106, and performs rendering operation (step 1204).

Specifically, attributes pertaining to the fill area of a graphic object, such as a color and opacity designated by rendering attribute data, are set on the triangle data, and rendering is performed.

In relation to actual rendering of triangles, hardware specifically designed for rendering triangles may be used, or a general-purpose graphics processing LSI may be used; or rendering may be performed in the manner of software by use of another means.

Second Rendering Operation Switching Unit 1117
Second Reference Value Management Unit 1112

Next, the second rendering operation switching unit 1117 will be described. When the fill area of a graphic object is translucent, the first rendering operation switching unit 1114 causes the second rendering operation switching unit to operate, and the usage status of memory in the graphics processor is determined. When a depth buffer can be ensured, there is executed rendering operation which enables high-speed processing of an overlap in a graphic object to be rendered and utilizes a depth test. When the depth buffer cannot be ensured, there is performed processing pertaining to the next step of determining graphics processing for processing an overlap of a self-intersection of a sweep line without use of the depth test (step 1205).

The usage status of memory is determined by means of comparing the usage status M of memory in a graphics processor achieved when rendering of a graphic object input through the memory usage status data input unit 1107 is performed with a reference value $M_{ref}$ showing the usage status of minimum memory required to ensure a depth buffer managed by the second reference value management unit 1112. When M satisfies $M_{ref}$, the second rendering data generation unit 1118, which will be described later, is caused to operate. When M differs from $M_{ref}$, the third rendering operation switching unit 1120 to be described later is caused to operate.

The memory usage status reference value managed by the second reference value management unit 1112 is a value determined by an output from the graphics-rendering apparatus and the configuration thereof. Whether or not the depth buffer can be ensured depends on the resolution of an output rendering and the maximum volume of available memory. In relation to the relationship between whether or not the stencil buffer can be ensured and the resolution of an output rendering, the size of a depth buffer is generally identical with the resolution of an output rendering. Hence, the greater the resolution of an output rendering, the more difficult the depth buffer is to ensure. Moreover, in relation to the maximum volume of available memory, when the depth buffer size is greater than the maximum volume of available memory, the majority of memory is utilized by the depth buffer. A potential risk of another task making memory unavailable becomes higher. When memory has entered such a state, the processing performance of the overall rendering apparatus is greatly decreased in the present embodiment where the memory is shared among the plurality of blocks.

A reference value pertaining to the usage status of memory is determined by means of an output of the graphics-rendering apparatus and the configuration thereof.

In order to efficiently avoid occurrence of these problems, there is also a method for dynamically changing the reference value along with the status of a task.

Second Rendering Data Generation Unit 1118

The second rendering data generation unit 1118 will now be described. The second rendering data generation unit is caused to operate when the second rendering operation switching unit 1117 has determined that the depth buffer can be ensured. There are generated rendering data used for performing rendering operation which enables high-speed processing of an overlap in the graphic object to be rendered and which utilizes a depth test (step 1206).

Generation of a vector data group used in rendering operation utilizing a depth test is performed in the same manner as generation of the vector data group performed by the first rendering data generation unit 1115 up to the step of generating the triangle data group. The same depth value is added to the thus-generated triangle data group. No specific limitations are imposed on a depth value to be added, so long as the depth value falls in a range where the depth value can be used in a depth test.

There is yielded an advantage of obviation of a necessity for clearing data in the depth buffer for each rendering operation, so long as a value determined by incrementing the depth value is employed in each graphics rendering operation.

Second Rendering Unit 1119

The rendering data generated by the second rendering data generation unit 1118 are input to the second rendering unit 1119, where rendering is performed. The second rendering unit 1119 will now be described.

The second rendering unit reads the triangle data group with the depth value generated by the second rendering data generation unit 1118 and the rendering attribute data managed by the rendering attribute data management unit 1106, and performs rendering operation utilizing a depth test (step 1207).

A depth test method will now be described. When the depth value of a graphic object is incremented in each graphics rendering operation, the depth test is passed when $D_s > D_d$ provided that the depth value of a pixel under test is $D_s$ and the value of a position in a depth buffer corresponding to the pixel under test is $D_d$. The value of the depth buffer is updated by Ds. As a result of the depth test being carried out as mentioned above, a single depth value is acquired in connection with re-fill-in of a self-intersection of the sweep line, and hence the depth test is not passed. Thus, the graphic object can be processed properly.

Third Rendering Operation Switching Unit 1120
Third Reference Value Management Unit 1113

The third rendering operation switching unit 1120 will now be described. When the second rendering operation switching unit 1117 has determined that the depth buffer for a depth test cannot be ensured, the third rendering operation switching unit is caused to operate. The third rendering operation switching unit determines rendering operation status data. When processing load imposed on the rendering unit is not high (the rendering unit is not busy), there is performed rendering operation utilizing a data area (an alpha value) which enables high-speed processing of an overlap in a self-intersection of a sweep line and into which the value of opacity is written. When the rendering unit is busy, rendering operation is performed while the outline of the graphic object to be rendered is taken as a polygon (step 1208).

Rendering operation status data are determined by means of comparing the rendering operation status data R achieved when the graphics-rendering operation managed by the rendering operation status data management unit 1110 is performed with the reference value $R_{ref}$ pertaining to the reference operation status data showing whether or not the rendering unit is busy. When R does not fulfill $R_{ref}$, the third rendering data generation unit 1121, which will be described later, is performed. When R fulfills $R_{ref}$, the fourth rendering data generation unit 1123, which will be described later, is performed.

No limitation is imposed on the reference value of the rendering status data showing that the rendering unit is busy, because the format of the rendering operation status data is changed by a method for embodying the graphics-rendering apparatus.

By way of an example, when the rendering operation status data are obtained as the number of tasks waiting in a task queue, the reference value is set as the maximum number of tasks, whereby the rendering section is determined to be busy.

Third Rendering Data Generation Unit 1121

Next, the third rendering data generation unit 1121 will be described. When the third rendering operation switching unit 1120 has determined that the rendering unit is not busy, the third rendering data generation unit is caused to operate, and generates rendering data used for performing rendering operation which enables high-speed processing of an overlap of a self-intersection with the sweep line and utilizes an alpha value (step 1209).

Figure 23:
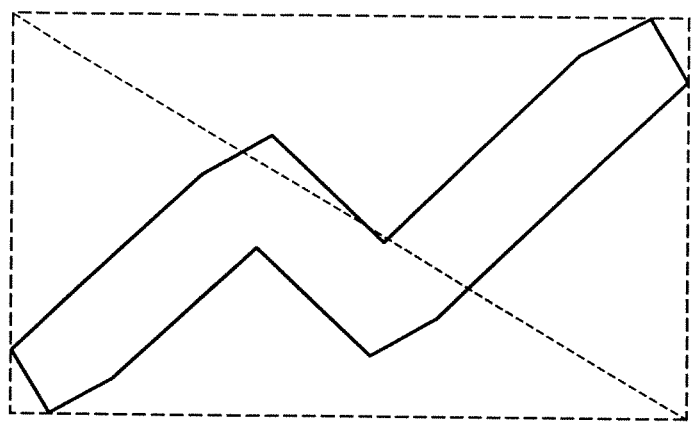
FIG. 23 is a view showing example minimum rectangle data parallel to the coordinate axes enclosing a group of sets of triangle data.

In order to perform rendering operation utilizing an alpha value, rendering data which disregard an overlap in the self-intersection of a sweep line are generated as rendering data, as in the case of generation of rendering data performed by the first rendering data generation unit 1115. A minimum rectangle, such as that shown in FIG. 23, parallel to the coordinate axes surrounding a group of sets of generated rendering data is generated as rendering data. When a rectangle cannot be rendered directly, the rectangle may be divided by a diagonal line, to thus be generated as two sets of triangle data.

Third Rendering Unit 1122

The rendering data generated by the third rendering data generation unit 1121 are input to the third rendering unit 1123, where rendering operation is performed. The third rendering unit 1122 will now be described.

The third rendering unit reads the rendering data generated by the third rendering data generation unit 1121 and the rendering attribute data managed by the rendering attribute data management unit 1106, and performs rendering operation utilizing an alpha value (step 1210).

Figure 24:
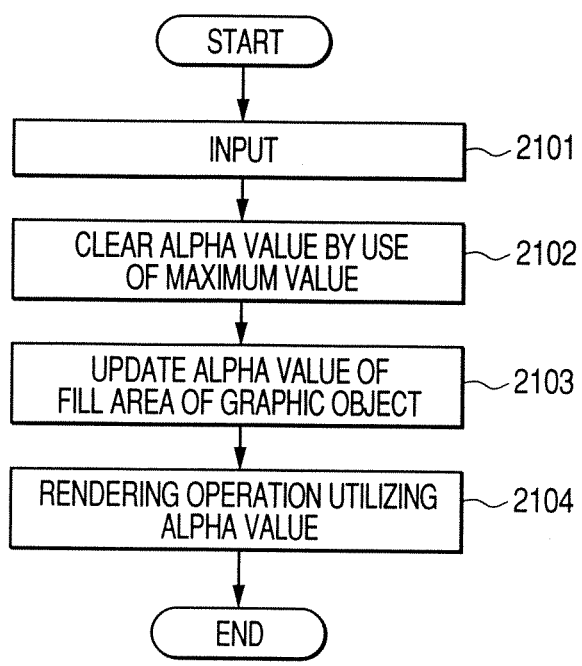
FIG. 24 is a view showing the flow of rendering operation utilizing an alpha value.
Figure 25:
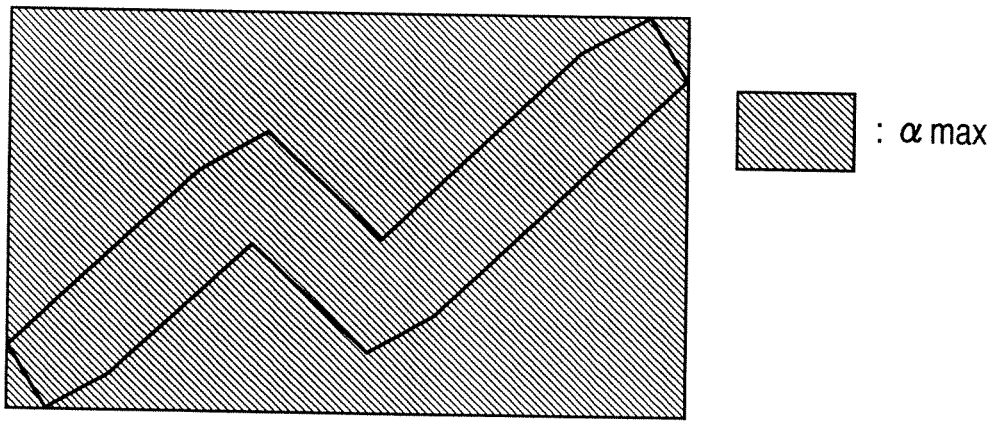
FIG. 25 is a view showing the first step of rendering operation utilizing an alpha value.

A processing flow employed by the third rendering unit is shown in FIG. 24 and described. First, the third rendering unit reads the rendering data generated by the third rendering data generation unit 1121 and the rendering attribute data managed by the rendering attribute data management unit 1106 (step 2101). Next, rendering operation is performed through use of rendering data $T_{rect}$—which have been generated by the third rendering data generation unit and pertain to the minimum rectangle parallel to the coordinate axes surrounding the graphic object—while taking an alpha value as a maximum value $\alpha_{max}$ showing opacity as shown in FIG. 25, thereby overwriting and updating only an alpha value $\alpha_{dst}$ in the background with the $\alpha_{max}$ (a color value is not changed). Thus, the alpha value in the area including a graphic object is cleared (step 2102).

Figure 26:
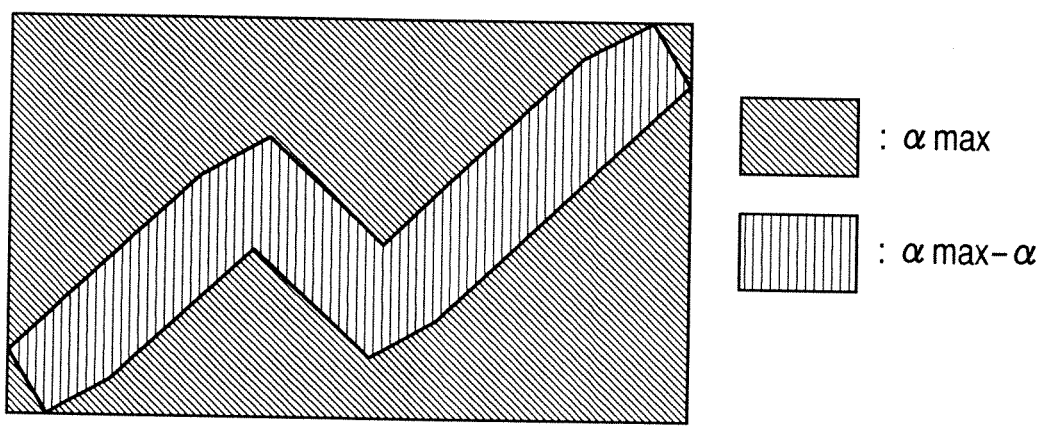
FIG. 26 is a view showing the second step of rendering operation utilizing an alpha value.

As shown in FIG. 26, the rendering data disregarding an overlap in the self-intersection of a sweep line are rendered while the alpha value is taken as $(\alpha_{max}-\alpha)$, to thus update and overwrite only the alpha value (step 2103), where $\alpha$ denotes an alpha value (opacity) of a graphic object obtained from the rendering attribute data.

Finally, rendering is performed by using an arbitrary alpha value as $T_{rect}$, and a color value is computed by the following equation (step 2104).

$$C_{new}=(\alpha_{max}-\alpha_{dst})\times C+\alpha_{dst}\times C_{dst} \qquad (3)$$

Reference symbol $C_{new}$ denotes a computed color value; C denotes a color value of a graphic object obtained from rendering attribute data; and $C_{dst}$ denotes a color value stored in raster data.

When rendering operation is performed by use of Equation 3, the color of a background is used for the color value outside of the fill area of the graphic object as follows:

$$\alpha_{dst}=\alpha_{max}$$

$$\therefore C_{new}=(\alpha_{max}-\alpha_{dst})\times C+\alpha_{max}\times C_{dst}=\alpha_{max}\times C_{dst}=C_{dst}$$

The reason why $\alpha_{max}\times C_{dst}=C_{dst}$ is achieved is because $\alpha_{max}$ is a value showing opacity.

In the fill area of the graphic object, the following equations are obtained, and merging of the graphic object to the background is performed properly.

$$\alpha_{dst}=\alpha_{max}-\alpha$$

$$\therefore C_{new}=(\alpha_{max}-(\alpha_{dst}-\alpha))\times C+(\alpha_{max}-\alpha)\times C_{dst}=\alpha\times C+(\alpha_{max}-\alpha)\times C_{dst}$$

This processing corresponds to merging operation using a general alpha value, and the fill area can be rendered properly. Merging operation using an alpha value is described in detail in the related-art document 3, which is listed above.

Fourth Rendering Data Generation Unit 1123

The fourth rendering data generation unit 1123 will now be described. When the third rendering operation switching unit 1120 has determined that the rendering unit is busy, the third rendering data generation unit handles as a polygon the outline of a graphic object to be rendered. Detection and division of an overlap in the graphic object to be rendered are performed by means of rendering operation analogous to that of the first modification of the first embodiment. As a result, rendering data which enable proper processing of an overlap in a graphic object to be rendered (not having an overlap among sets of data) are generated (step 1211).

Figure 27:
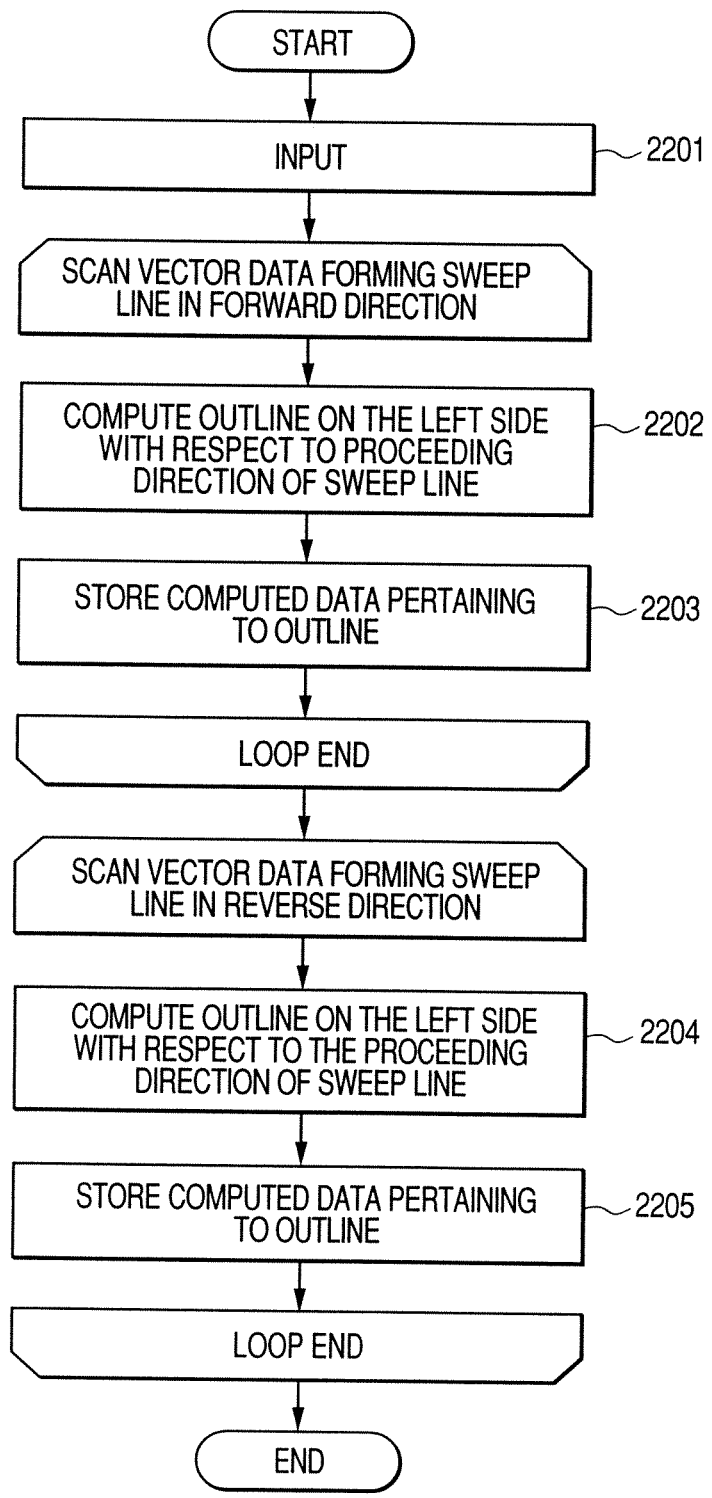
FIG. 27 is a view showing a processing flow of computation of the outline of a graphic object to be rendered.

A process flow pertaining to an example method for computing the outline of a graphic object is shown in FIG. 27 and will be described.

First, the sweep line data managed by the sweep line data management unit 1102 and the sweep shape data managed by the sweep shape data management unit 1104 are read as inputs (step 2201).

Next, information pertains to points constituting a sweep line are extracted from the read sweep line data sequentially from the start point to the end point. In relation to a graphic object which can be formed by means of sweeping a graphic object to be swept on the basis of vector data $(P_n-P_{n-1})$ defined by two continual points, an outline located on the left side with reference to the direction of vector data is computed (step 2202), and the thus-computed outline is stored (step 2203). The method described in connection with the first rendering data generation unit 1115 is applied as the method for computing an outline located on the left side with reference to the direction of vector data. In contrast with the case of the first rendering data generation unit 1115, the sweep line is a continual line segment, and hence there is a case where the outlines intersect with each other in the interior of a corner. Accordingly, after the outline has been computed, a determination is made as to whether or not an intersection exists between the thus-computed outline and the outline determined by a preceding set of vector data. When an intersection exists, an outer peripheral point computed through computation of the outline from the preceding set of vector data is replaced with a computed point of intersection, thereby addressing a case where the intersection exists in the outlines.

After computation has been performed up to the end point, point information is again extracted from the sweep line data in reverse from the end point to the start point, and the left-side outline is computed in the same manner as in the case of the above method (steps 2204, 2205).

Figure 28:
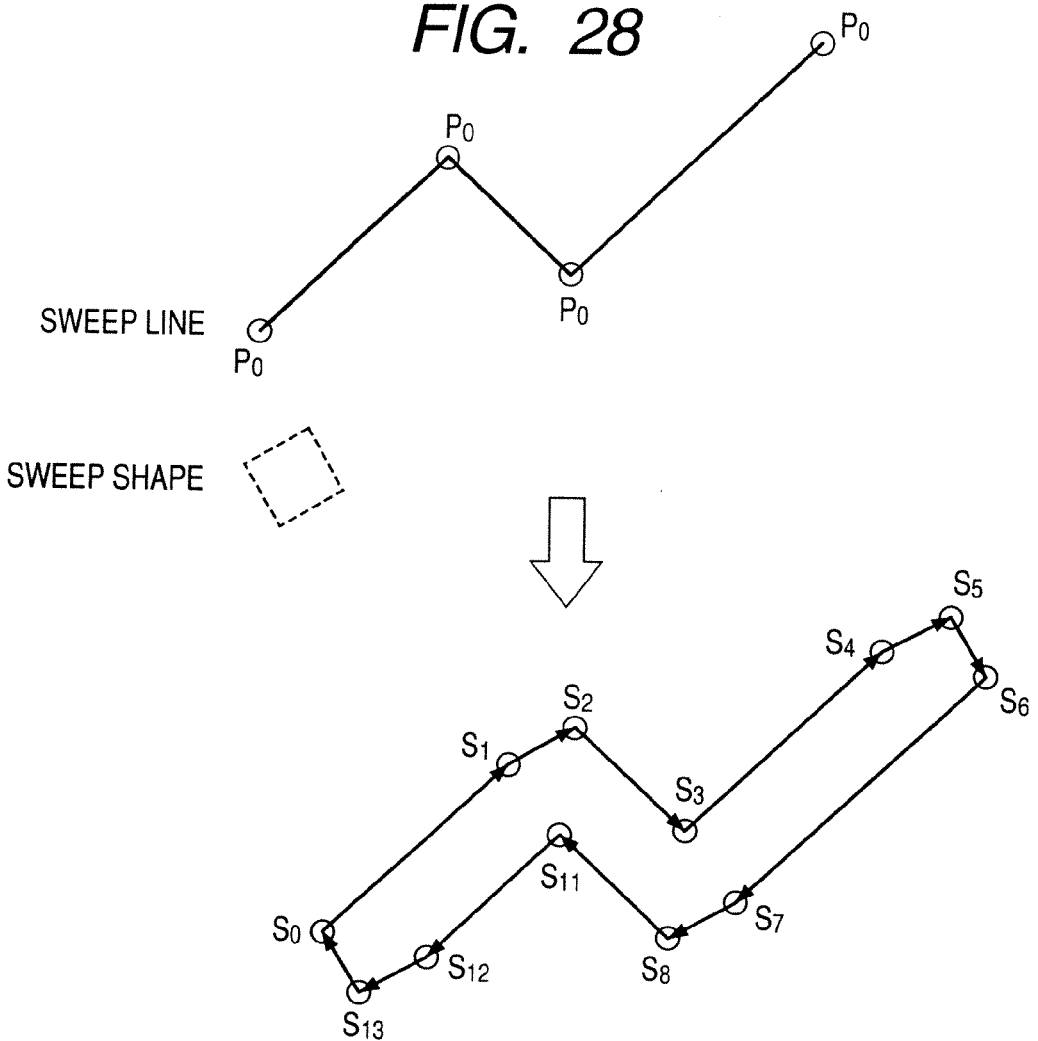
FIG. 28 is a view showing an example outline of the graphic object to be rendered.

Through processing, the outline of the graphic object can be acquired as a group of sets of clockwise vector data as shown in FIG. 28.

The vector data group pertaining to the outline is considered to be a polygon. The fill area of the polygon is generated as a vector data group—which can be rasterized by the rendering unit—by means of processing analogous to that described in connection with the first modification of the first embodiment of the present invention.

Figure 29:
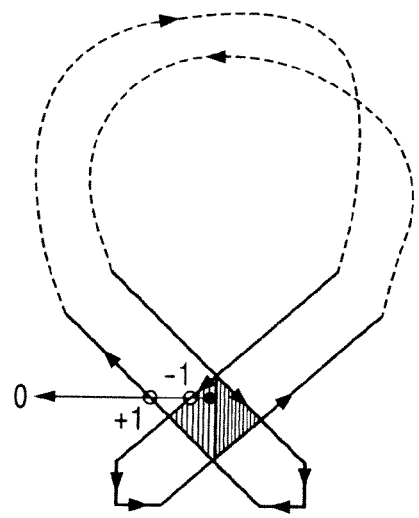
FIG. 29 is a view showing example processing of a self-intersection with a sweep line by utilization of a non-zero winding number rule.

A non-zero winding number rule is used as a rule for determining a fill area. The determination of a fill area determined according to the non-zero winding number rule shows that the self-intersection of the sweep line is not located within the fill area. Therefore, as shown in FIG. 29, a kinked intersection must exist in the outline. However, in the case of the above-described vector data group pertaining to the outline, an intersection is not induced by a kink in the outline. Therefore, the fill area is determined through use of the non-zero winding number rule, so that an overlap in the self-intersections of the sweep line can be rendered properly.

Fourth Rendering Unit 1124

The rendering data generated by the fourth rendering data generation unit 1123 are input to the fourth rendering unit 1124, where rendering operation is performed. The fourth rendering unit 1124 will now be described.

As in the case of the first modification of the first embodiment, the fourth rendering unit reads the triangle data or line segment data generated by the fourth rendering data generation unit 1123 and the rendering attribute data managed by the rendering attribute data management unit 1106, and performs rendering operation (step 1212).

Specifically, attributes of the fill area of the graphic object designated by the rendering attribute data, such as a color, opacity, and the like, are set on the triangle data, to thereby perform rendering.

Hardware specifically designed for rendering a triangle or a general-purpose graphics processing LSI may also be used for actually rendering triangles. Alternatively, rendering of triangles may also be performed in the manner of software by use of another means.

Rendering Result Output Section 1125

Next, the rendering result output section 1125 will be described. The rendering result output section outputs a rendering result obtained by any one of the first rendering unit 1116, the second rendering unit 1119, the third rendering unit 1122, and the fourth rendering unit 1124 (step 1213).

The rendering result obtained by the rendering unit corresponds to logical pixel data. Hence, the rendering result output section produces an output by means of converting a rendering result in accordance with the form of a destination where an output is to be delivered.

A rendering result may be output to a display device such as a CRT, an LCD, or the like; a printing device such as a printer; a recording medium such as a main storage device, an auxiliary storage device, a CD, a DVD, or the like; or another device or means. The above-described method is a mere mode of the embodiment, and the present invention is not limited to this method.

Advantage of the Second Embodiment

In the second embodiment, a graphic object (a graphic object to be swept) formed by means of sweeping an arbitrary polygon along an arbitrary continual line segment is subjected to the fastest rendering operation which is responsive to the operating status of the graphics-rendering apparatus. As a result, even when the apparatus is busy, a drop in the performance of sweep image rendering is minimized. When the apparatus is in an idle state, high-speed sweep image rendering can also be performed. This is especially effective for a case where the present invention is implemented in hardware whose resources are limited, as in a portable PC, a portable cellular phone, AV equipment having an interactive sweep image rendering function, or the like.

First Modification of the Second Embodiment

Figure 30:
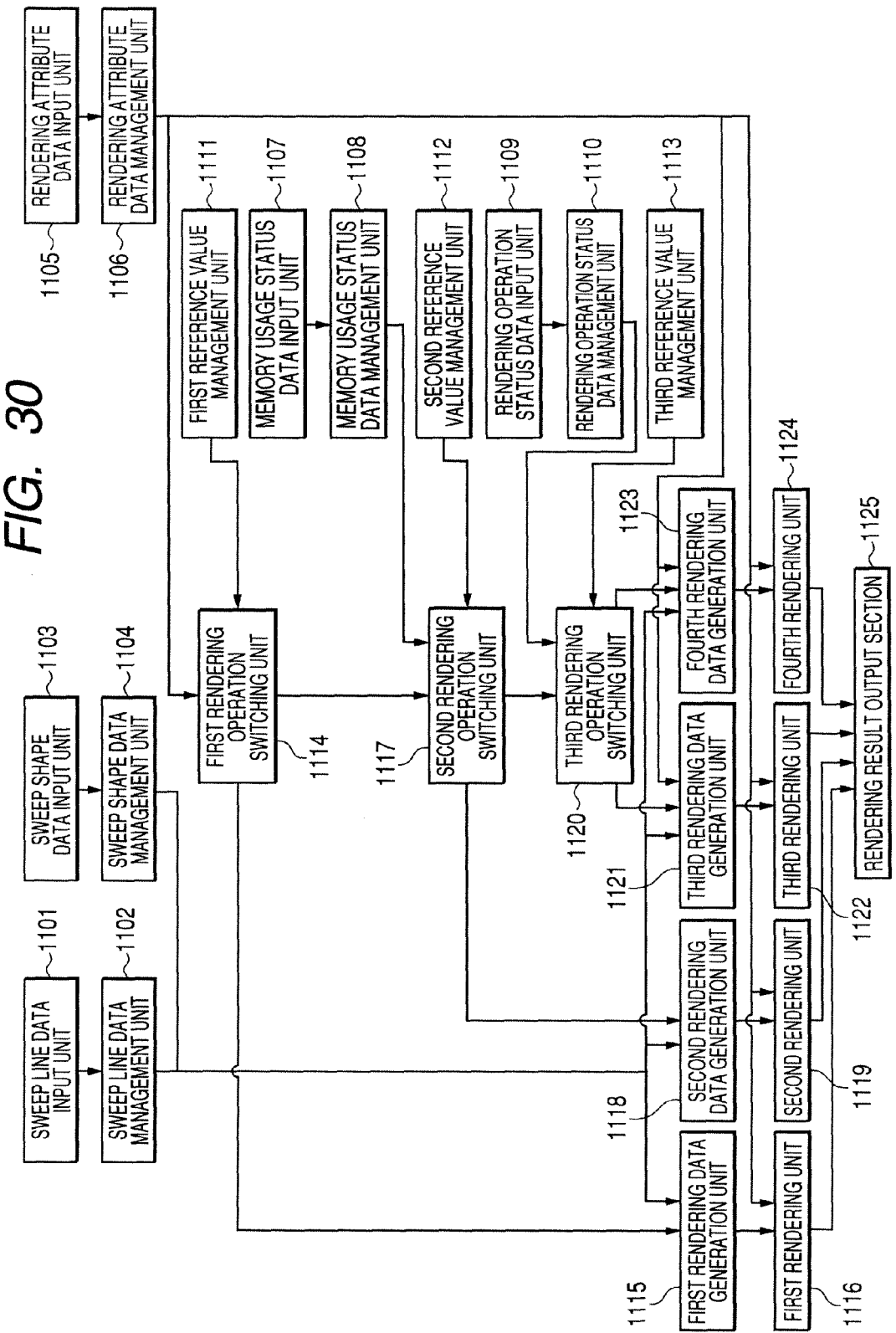
FIG. 30 is a view schematically showing an example configuration of a graphics-rendering apparatus according to a first modification of the second embodiment of the present invention.

FIG. 30 is an overall block diagram of a graphics-rendering apparatus according to a first modification of the second embodiment of the present invention.

In connection with the second embodiment, the graphics rendering apparatus of the first modification is configured to have a second reference value correction unit in place of the second reference value management unit and a third reference value correction unit in lieu of the third reference value management unit.

Second Reference Value Correction Unit

The second reference value correction unit will be described. The second reference value correction unit makes corrections to a reference value to be compared with the memory usage status data, through use of a value relevant to the determination of memory usage status data, such as the resolution of an output rendering.

Specifically, as described in connection with the second reference value management unit 1112, the size of a required depth buffer greatly changes according to the resolution of an output rendering. Therefore, corrections are made to the minimum required memory usage status data in accordance with the resolution of an output rendering and the accuracy of the depth buffer.

Thereby, even when the usage of memory of the apparatus varies in a plurality of modes or when the resolution of an output rendering is dynamically changed, the reference value can be dynamically changed according to a rendering status.

Third Reference Value Correction Unit

The third reference value correction unit will now be described. The third reference value correction unit makes corrections to a reference value to be compared with the rendering operation status data, through use of a value relevant to the determination of the status of rendering operation, such as the number of tasks utilizing the rendering unit.

Specifically, as described in connection with the third reference value management unit 1113, the reference value pertaining to the status of rendering operation changes according to the number of rendering tasks which perform rendering. Therefore, when an increment/decrement in the number of rendering tasks is stepwise, changes are made to the reference value of the rendering operation status data according to the stepwise change.

The reference value can be dynamically changed according to the processing status of the apparatus.

The second reference value correction unit and the third reference value correction unit dynamically correct a reference value according to the operating status of the apparatus. By means of correcting operation, switching of rendering operation can be controlled in a more detailed manner, whereby efficiency of processing is enhanced.

Example dynamic correction of a reference value has been described above. However, the present invention is not limited to this example. All of the methods which enable dynamic correction of a reference value can be used.

In connection with subsequent processing of the first modification of the second embodiment of the present invention, the description in the second embodiment stating that the reference value management unit, which determines the usage status of memory, reads a reference value is replaced, as required, with a description stating that the reference value management unit reads the reference value corrected by the reference value correction unit. Further, the description stating that the reference value management unit reads a reference value in order to determine the status of rendering operation is replaced with a description stating that the reference value management unit reads a reference value corrected by the reference value correction unit, as required. Operations other than the operation described above are the same as the operations in the second embodiment.

Advantage of the First Modification of the Second Embodiment

When compared with the second embodiment, the first modification enables high-speed rendering when the apparatus is in an idle state, by means of switching rendering operation according to the operating status of the apparatus, to thus minimize a decrease in the performance of rendering operation even when the apparatus is busy. This is particularly effective for a case where hardware resources are limited as in the case of a compact PC, a portable telephone, AV equipment having an interactive graphics-rendering feature, and the like, and where tasks for which a plurality of different types of processing operations are performed are run on a single piece of hardware.

Second Modification of the Second Embodiment

Figure 31:
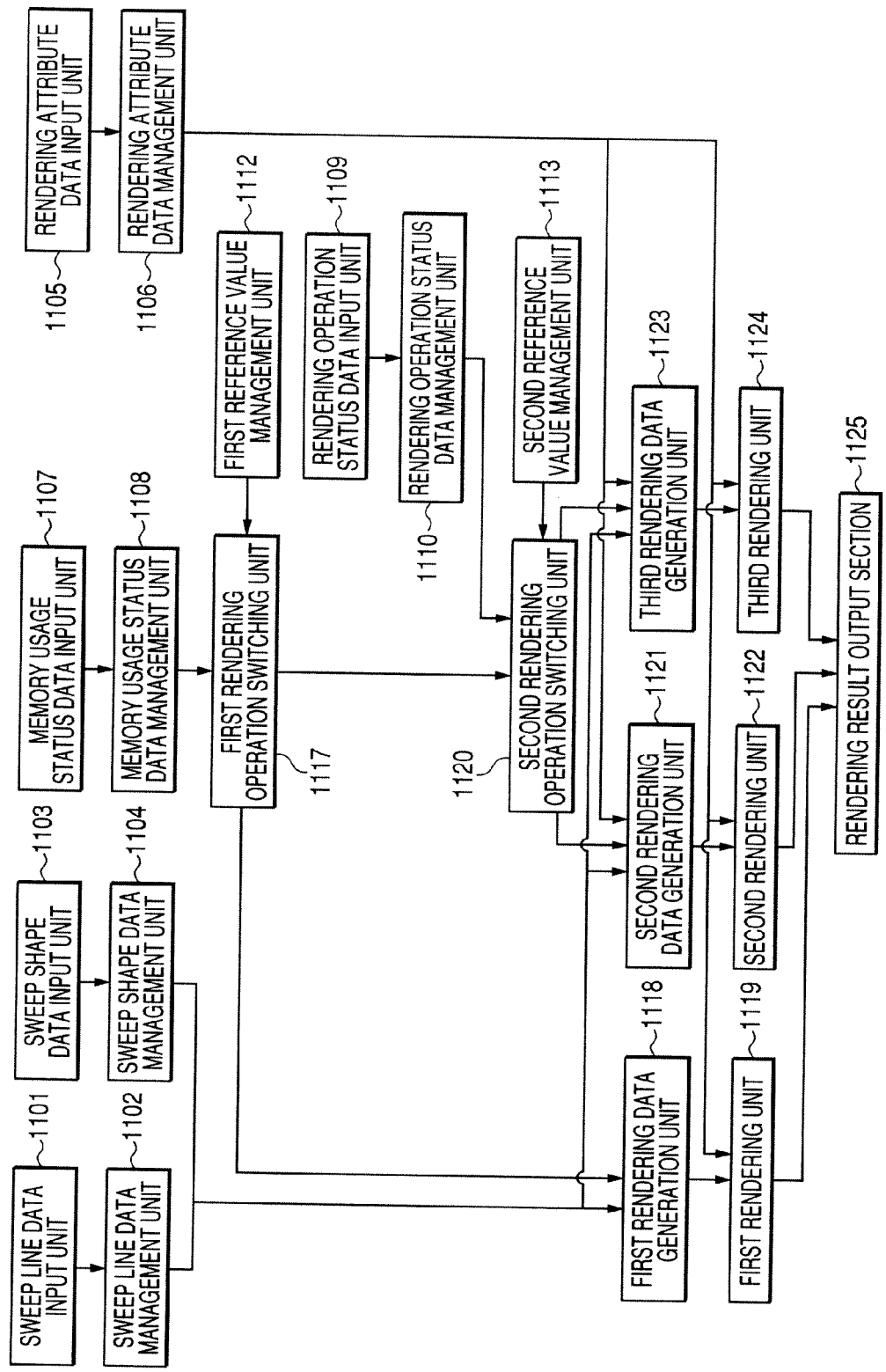
FIG. 31 is a view schematically showing an example configuration of a graphics-rendering apparatus according to a second modification of the second embodiment of the present invention.

FIG. 31 is an overall block diagram of a graphics-rendering apparatus according to a second modification of the second embodiment of the present invention.

The graphics-rendering apparatus of the second modification is identical with the graphics-rendering apparatus of the second embodiment, except that the first reference value management unit 1111, the first rendering operation switching unit 1114, the first rendering data generation unit 1115, and the first rendering unit 1116 are omitted from the graphics-rendering apparatus of the second embodiment.

Accordingly, the second reference value management unit of the second embodiment corresponds to a first reference value management unit of the second modification; the second rendering operation switching unit of the second embodiment corresponds to a first rendering operation switching unit of the second modification; the second rendering data generation unit of the second embodiment corresponds to a first rendering data generation unit of the second modification; the second rendering unit of the second embodiment corresponds to a first rendering unit of the second modification; the third reference value management unit of the second embodiment corresponds to the second reference value management unit of the present embodiment; the third rendering operation switching unit of the second embodiment corresponds to the second rendering operation switching unit of the present embodiment; the third rendering data generation unit of the second embodiment corresponds to a second rendering data generation unit of the second modification; and the third rendering unit of the second embodiment corresponds to a second rendering unit of the second modification.

The second modification is described in connection with the second embodiment. After data input processing, the second rendering operation switching unit 1117 is caused to operate, and processing is continued. Specifically, in the processing flow of the second embodiment shown in FIG. 15, after data have been input in step 1201, processing is caused to proceed to step 1205 from step 1201 by means of skipping step 1202. The graphics-rendering apparatus of the second modification operates in the same manner as does its counterpart of the second embodiment, except for the operations mentioned above.

Advantage of the Second Modification

In the modification, the graphics-rendering apparatus in which a color of a graphic object to be made opaque is limited to translucency, fastest rendering operation responsive to the operating status of the apparatus is performed. As a result, even when the apparatus is busy, a drop in the performance of rendering is minimized, and high-speed rendering operation can be performed when the apparatus is in an idle state. This is especially effective for a case where the present invention is implemented in hardware whose resources are limited, as in a portable PC, a portable cellular phone, AV equipment having an interactive sweep image rendering function, and the like.

Third Modification of the Second Embodiment

Figure 32:
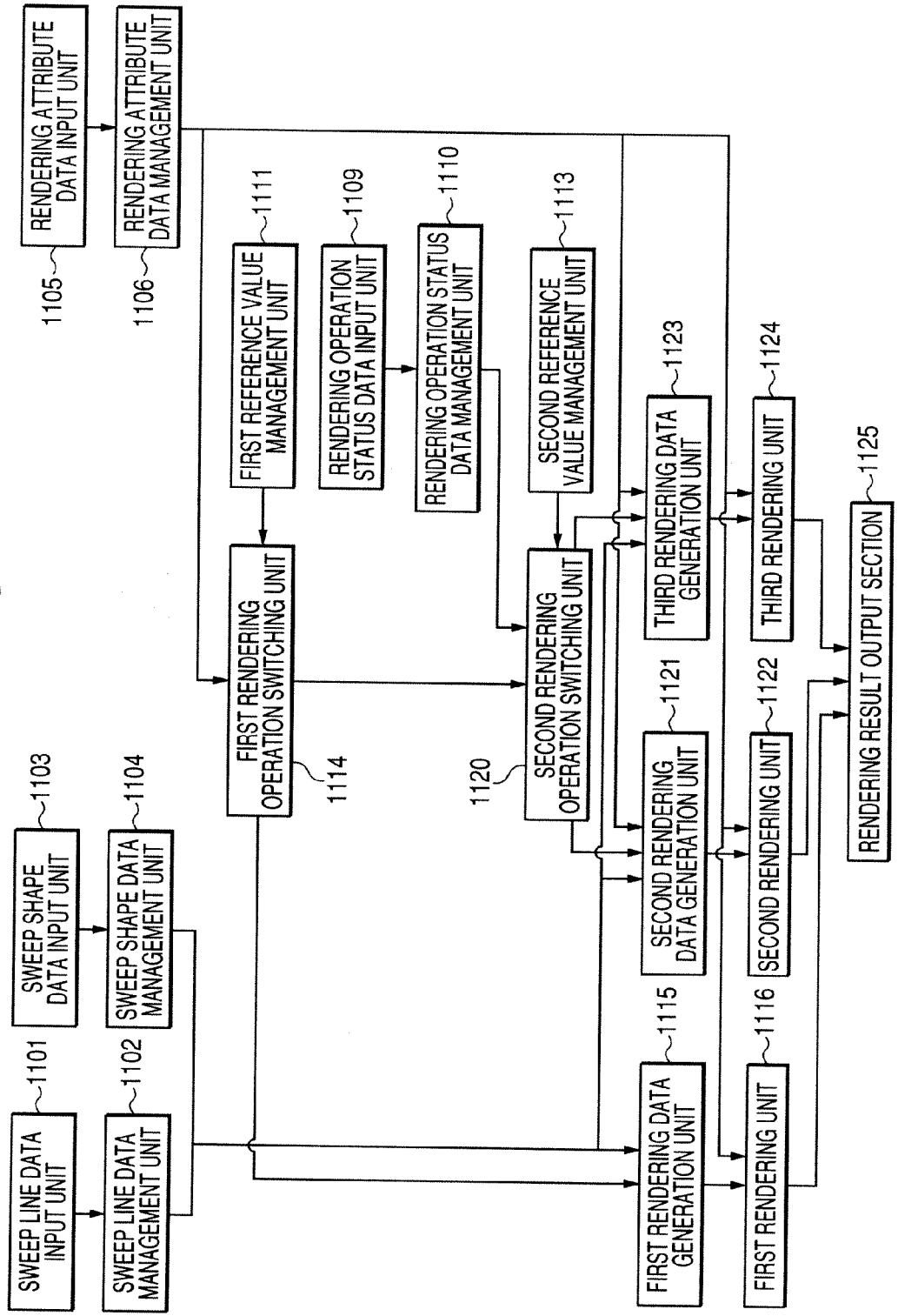
FIG. 32 is a view schematically showing an example configuration of a graphics-rendering apparatus according to a third modification of the second embodiment of the present invention.

FIG. 32 is an overall block diagram of a graphics-rendering apparatus according to a third modification of the second embodiment of the present invention.

The graphics-rendering apparatus of the third modification is identical with the graphics-rendering apparatus of the second embodiment, except that the second reference value management unit 1112, the memory usage status data input unit 1107, the memory usage status data management unit 1108, the second rendering operation switching unit 1117, the second rendering data generation unit 1118, and the second rendering unit 1119 are omitted from the graphics-rendering apparatus of the second embodiment.

Accordingly, the third reference value management unit of the second embodiment corresponds to a second reference value management unit of the third modification; the third rendering operation switching unit of the second embodiment corresponds to a second rendering operation switching unit of the third modification; the third rendering data generation unit of the second embodiment corresponds to a second rendering data generation unit of the third modification; the third rendering unit of the second embodiment corresponds to a second rendering unit of the third modification; the fourth rendering data generation unit of the second embodiment corresponds to a third rendering data generation unit of the third modification; and the fourth rendering unit of the second embodiment corresponds to a fourth rendering unit of the third modification.

The third modification is described in connection with the second embodiment. After the first rendering operation switching unit 1114 has determined that the opacity input as the rendering attribute exhibits translucency, processing proceeds to the third rendering operation switching unit 1120. Specifically, in the processing flow of the second embodiment shown in FIG. 15, when the opacity is determined in step 1202 to show that the fill area of the graphic object is translucent, processing is caused to proceed from step 1202 to step 1208 by means of skipping step 1205. The graphics-rendering apparatus of the third modification operates in the same manner as does its counterpart of the second embodiment, except for the operations mentioned above.

Advantage of the Third Modification

In the modification, the graphics rendering apparatus which cannot utilize a depth test performs the fastest rendering operation responsive to the operating status of the graphics-rendering apparatus. Even when the apparatus is busy, a decrease in graphics-rendering performance is minimized, and high-speed rendering can be performed when the apparatus is in an idle state.

This is particularly effective for a case where hardware resources are more limited than in the second embodiment and the present invention is performed on hardware not having a depth test function.

Fourth Modification of the Second Embodiment

Figure 33:
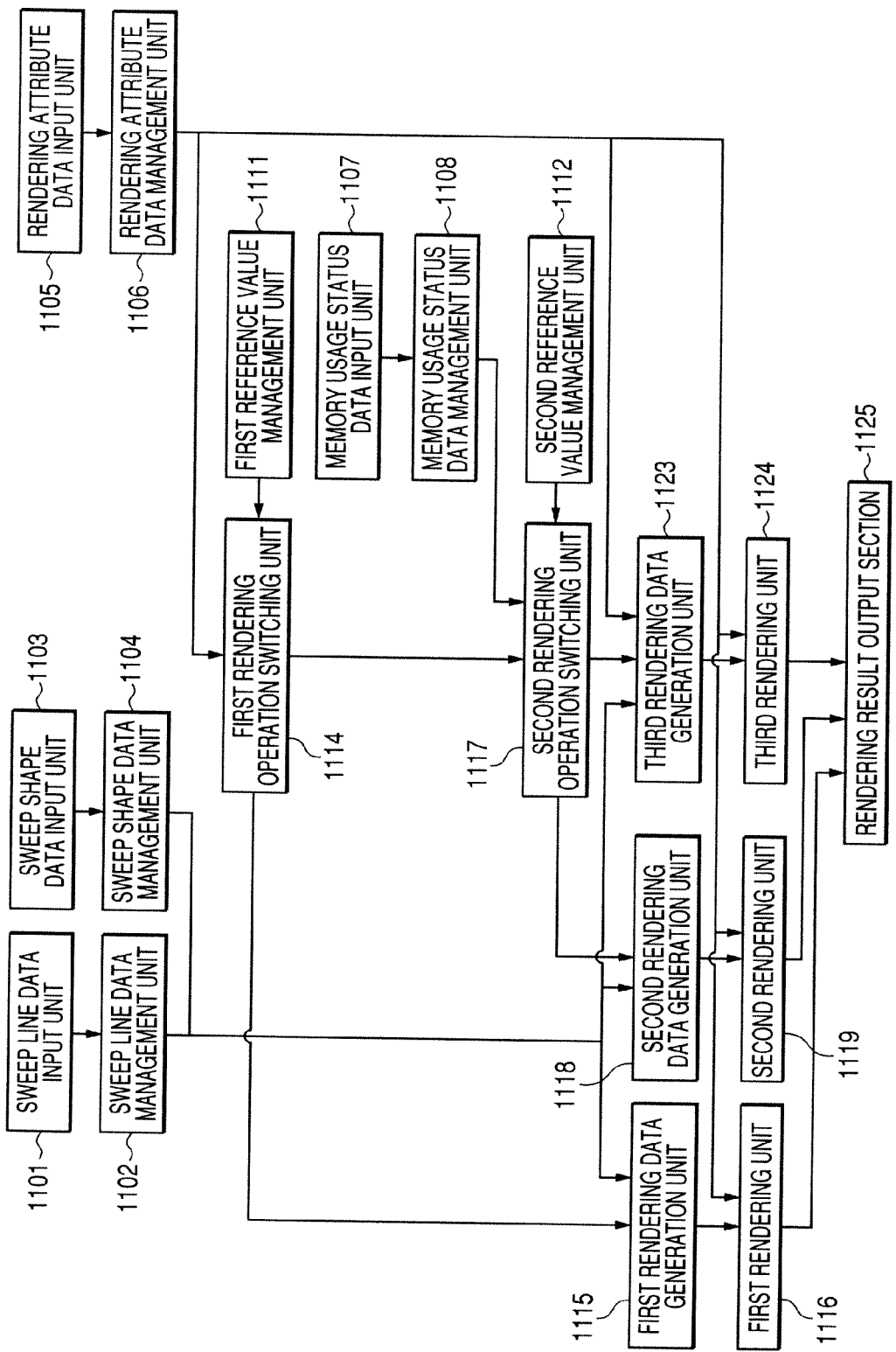
FIG. 33 is a view schematically showing an example configuration of a graphics-rendering apparatus according to a fourth modification of the second embodiment of the present invention.

FIG. 33 is an overall block diagram of a graphics-rendering apparatus according to a fourth modification of the second embodiment of the present invention.

The graphics-rendering apparatus of the fourth modification is identical with the graphics-rendering apparatus of the second embodiment, except that the third reference value management unit 1113, the rendering operation status data input unit 1109, the rendering operation status data management unit 1110, the third rendering operation switching unit 1120, the third rendering data generation unit 1121, and the third rendering unit 1122 are omitted from the graphics-rendering apparatus of the second embodiment.

Accordingly, the fourth rendering data generation unit of the second embodiment corresponds to the third rendering data generation unit of the present modification; and the fourth rendering unit of the second embodiment corresponds to the third rendering unit of the present modification.

The present modification is described in connection with the second embodiment. When the second rendering operation switching unit 1117 has determined that the depth buffer cannot be ensured, processing proceeds to the fourth rendering data generation unit 1123. Specifically, in the processing flow of the second embodiment shown in FIG. 15, when the depth buffer is determined to be unavailable in step 1205, processing proceeds from step 1205 to 1211 by means of skipping step 1208. The graphics-rendering apparatus of the fourth modification operates in the same manner as does its counterpart of the second embodiment, except for the operations mentioned above.

Advantage of the Fourth Modification

In the modification, the graphics rendering apparatus which cannot perform rendering operation utilizing an alpha value performs the fastest rendering operation responsive to the operating status of the graphics-rendering apparatus. Even when the apparatus is busy, a decrease in graphics-rendering performance is minimized, and high-speed rendering can be performed when the apparatus is in an idle state. This is particularly effective for a case where hardware resources are more limited than in the second embodiment and the present invention is performed on hardware not having a rendering function utilizing an alpha value.

Fifth Modification of the Second Embodiment

Figure 34:
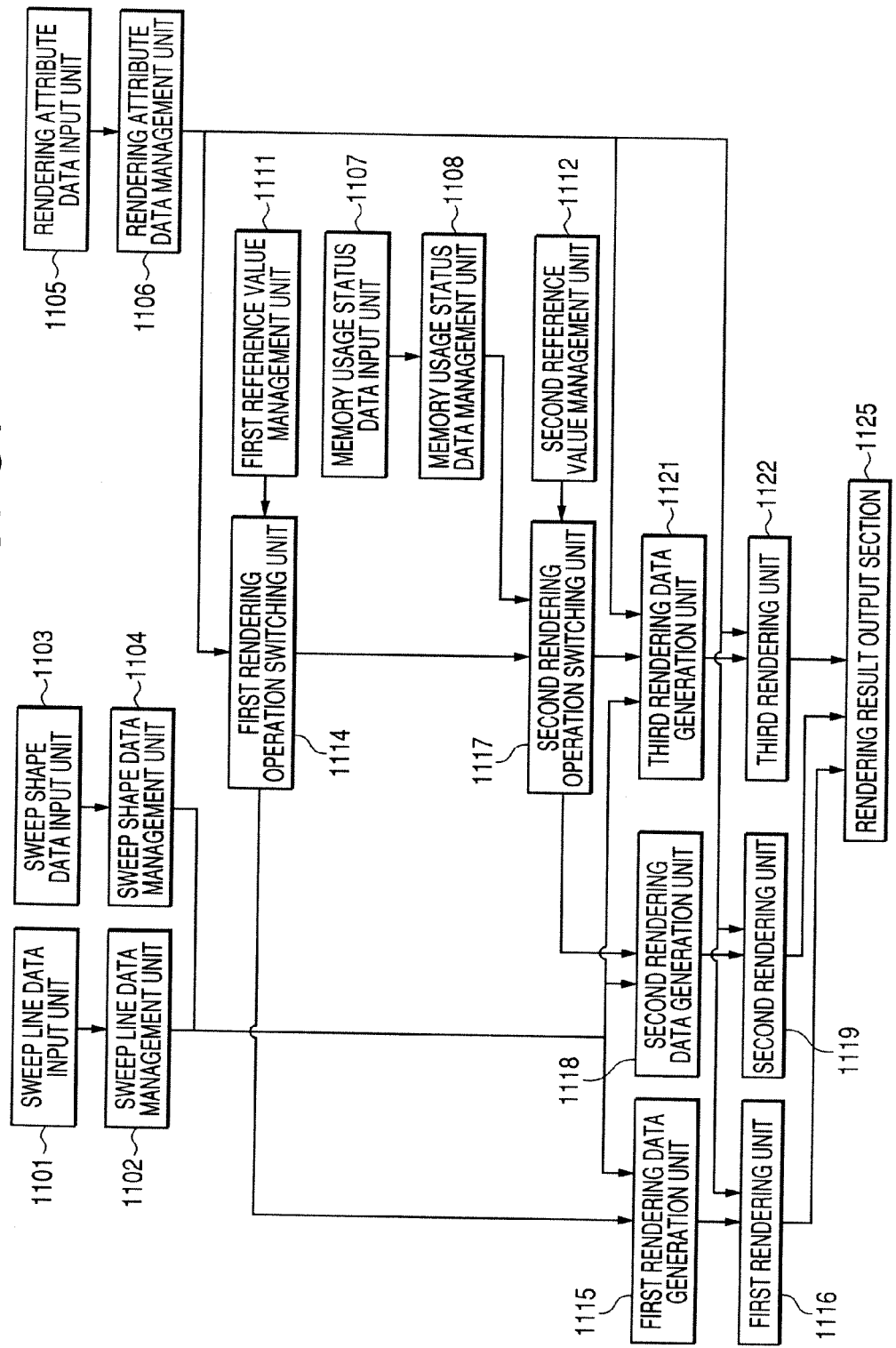
FIG. 34 is a view schematically showing an example configuration of a graphics-rendering apparatus according to a fifth modification of the second embodiment of the present invention.

FIG. 34 is an overall block diagram of a graphics-rendering apparatus according to a fifth modification of the second embodiment of the present invention.

The graphics-rendering apparatus of the fifth modification is identical with the graphics-rendering apparatus of the second embodiment, except that the third reference value management unit 1113, the rendering operation status data input unit 1109, the rendering operation status data management unit 1110, the third rendering operation switching unit 1120, the fourth rendering data generation unit 1123, and the fourth rendering unit 1124 are omitted from the graphics-rendering apparatus of the second embodiment.

The present modification is described in connection with the second embodiment. When the second rendering operation switching unit 1117 has determined that the depth buffer cannot be ensured, processing proceeds to the third rendering data generation unit 1121. Specifically, in the processing flow of the second embodiment shown in FIG. 15, when the depth buffer is determined to be unavailable in step 1205, processing proceeds from step 1205 to 1209 by means of skipping step 1208. The graphics-rendering apparatus of the fifth modification operates in the same manner as does its counterpart of the second embodiment, except for the operations mentioned above.

Advantage of the Fifth Modification

In the modification, the fastest rendering operation responsive to the operating status of the apparatus is executed. As a result, even when the apparatus is busy, a drop in the performance of rendering operation is minimized. When the apparatus is in an idle state, high-speed rendering operation can be performed. Rendering operation is sufficiently fast as compared with the second embodiment. When the rendering operation utilizing an alpha value can be implemented at all times, an overhead incurred by determination of the status of rendering operation can be diminished, and more efficient graphics-rendering operation can be performed.

Sixth Modification of the Second Embodiment

Figure 35:
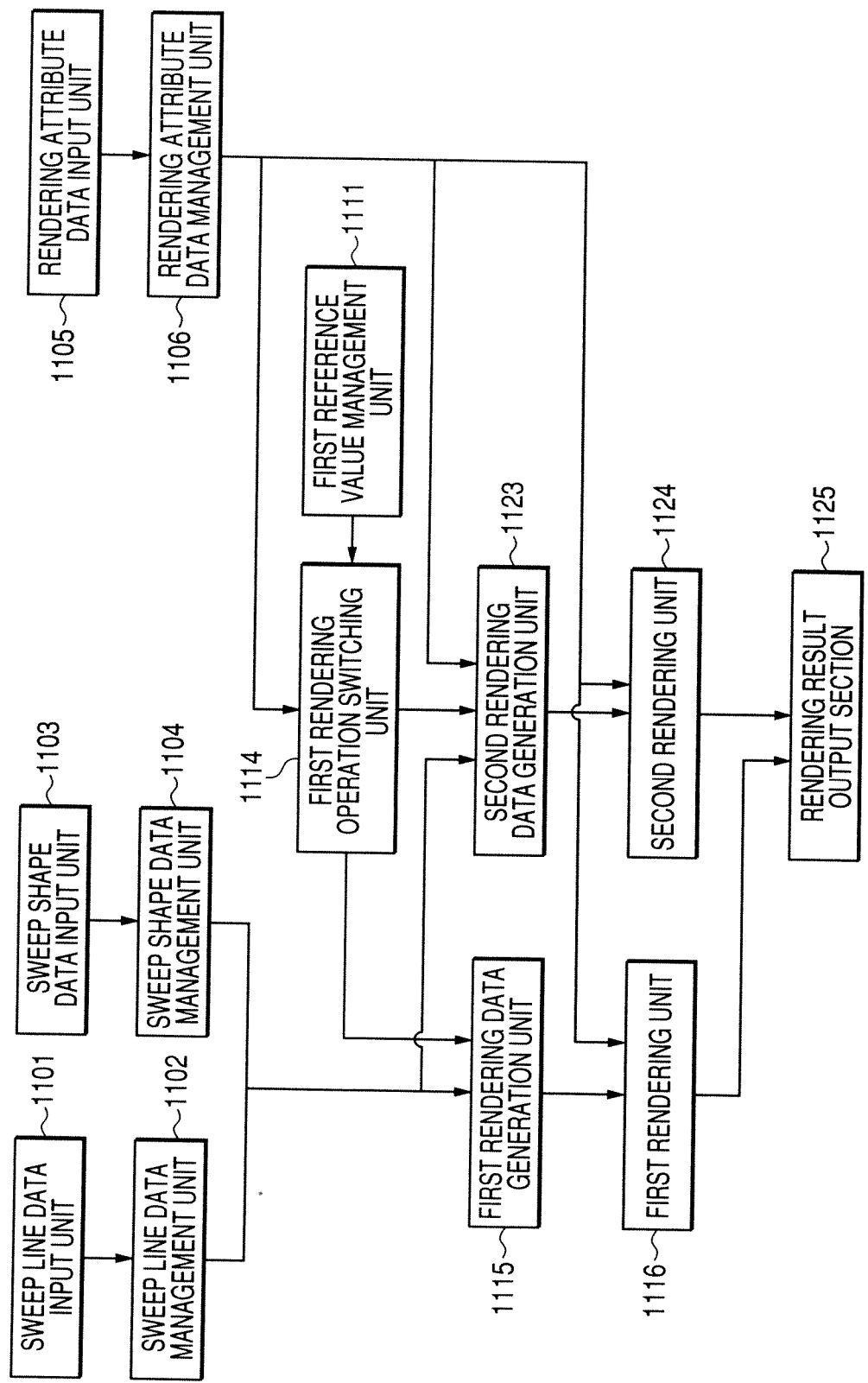
FIG. 35 is a view schematically showing an example configuration of a graphics-rendering apparatus according to a sixth modification of the second embodiment of the present invention.

FIG. 35 is an overall block diagram of a graphics-rendering apparatus according to a sixth modification of the second embodiment of the present invention.

The graphics-rendering apparatus of the sixth modification is identical with the graphics-rendering apparatus of the second embodiment, except that the second reference value management unit 1112, the memory usage status data input unit 1107, the memory usage status data management unit 1108, the second rendering operation switching unit 1117, the second rendering data generation unit 1118, the second rendering unit 1119, the third reference value management unit 1113, the rendering operation status data input unit 1109, the rendering operation status data management unit 1110, the third rendering operation switching unit 1120, the third rendering data generation unit 1121, and the third rendering unit 1122 are omitted from the graphics-rendering apparatus of the second embodiment.

Therefore, the first reference value management unit of the second embodiment corresponds to the reference value section of the present modification; the first rendering operation switching unit of the second embodiment corresponds to the rendering operation switching unit of the present modification; the fourth rendering data generation unit of the second embodiment corresponds to the second rendering data generation unit of the present modification; and the fourth rendering unit of the second embodiment corresponds to the second rendering unit of the present modification.

The sixth modification is described in connection with the second embodiment. When the first rendering operation switching unit 1114 has determined that the opacity input as the rendering attribute exhibits translucency, processing proceeds to the fourth rendering data generation unit 1123. Specifically, in the processing flow of the second embodiment shown in FIG. 15, when the rendering attribute is determined in step 1202 to exhibit translucency, processing is caused to proceed from step 1202 to step 1211 by means of skipping steps 1205 and 1208. The graphics-rendering apparatus of the sixth modification operates in the same manner as does its counterpart of the second embodiment, except for the operations mentioned above.

Advantage of the Sixth Modification

In the modification, the graphics rendering apparatus incapable of performing rendering operation utilizing a depth test and an alpha value performs the fastest rendering operation responsive to the operating status of the graphics-rendering apparatus. Even when the apparatus is busy, a decrease in graphics-rendering performance is minimized, and high-speed rendering can be performed when the apparatus is in an idle state. This is particularly effective for a case where hardware resources are more limited than in the second embodiment and the present invention is performed on hardware not having a rendering function utilizing a depth test and an alpha value.

Seventh Modification of the Second Embodiment

Figure 36:
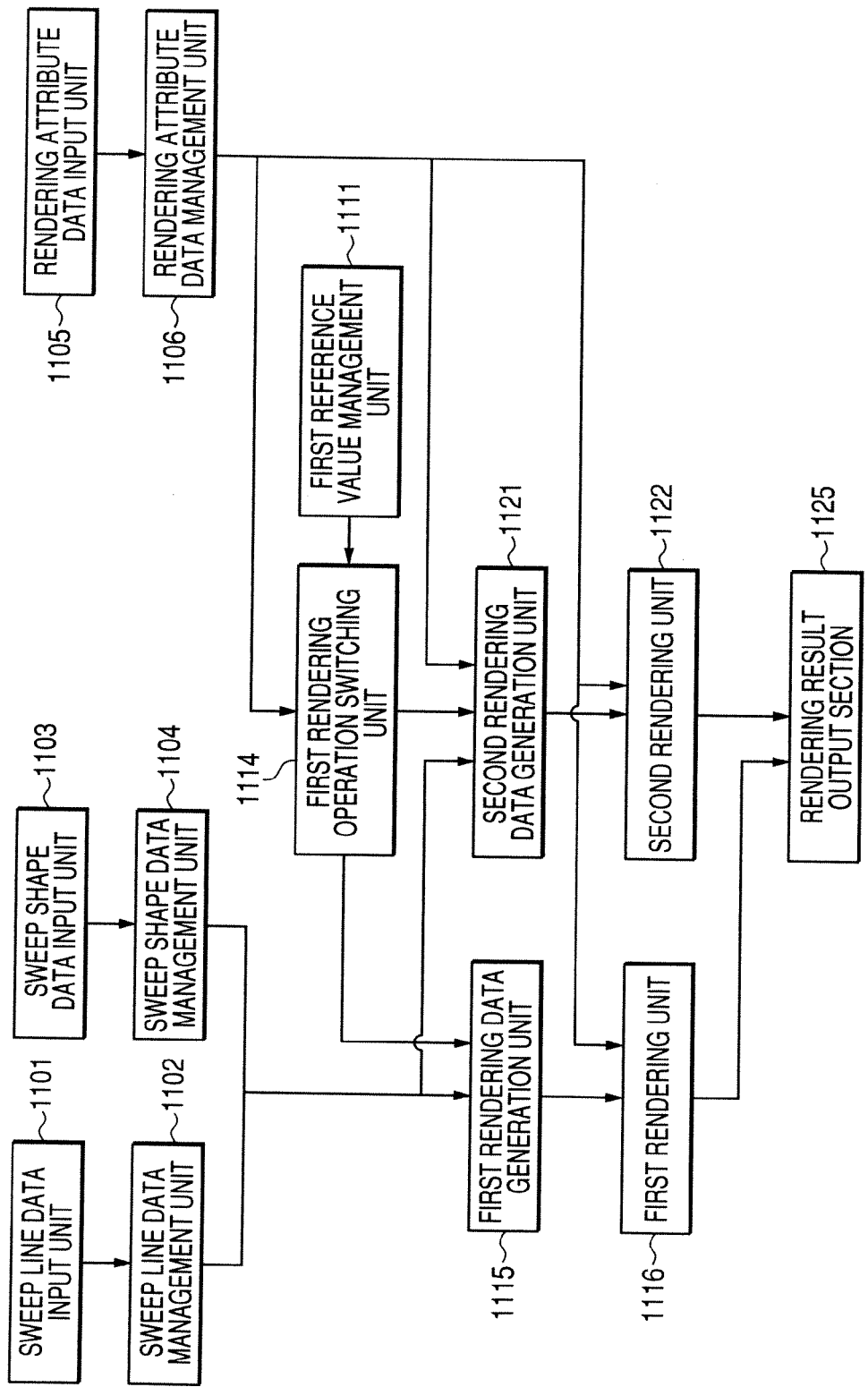
FIG. 36 is a view schematically showing an example configuration of a graphics-rendering apparatus according to a seventh modification of the second embodiment of the present invention.

FIG. 36 is an overall block diagram of a graphics-rendering apparatus according to a seventh modification of the second embodiment of the present invention.

The graphics-rendering apparatus of the seventh modification is identical with the graphics-rendering apparatus of the second embodiment, except that the second reference value management unit 1112, the memory usage status data input unit 1107, the memory usage status data management unit 1108, the second rendering operation switching unit 1117, the second rendering data generation unit 1118, the second rendering unit 1119, the third reference value management unit 1113, the rendering operation status data input unit 1109, the rendering operation status data management unit 1110, the third rendering operation switching unit 1120, the fourth rendering data generation unit 1123, and the fourth rendering unit 1124 are omitted from the graphics-rendering apparatus of the second embodiment.

Therefore, the first reference value management unit of the second embodiment corresponds to the reference value section of the present modification; the first rendering operation switching unit of the second embodiment corresponds to the rendering operation switching unit of the present modification; the third rendering data generation unit of the second embodiment corresponds to the second rendering data generation unit of the present modification; and the third rendering unit of the second embodiment corresponds to the second rendering unit of the present modification.

The seventh modification is described in connection with the second embodiment. When the second rendering operation switching unit 1114 has determined that the opacity input as the rendering attribute exhibits translucency, processing proceeds to the third rendering data generation unit 1121. Specifically, in the processing flow of the second embodiment shown in FIG. 15, when the rendering attribute is determined in step 1202 to exhibit translucency, processing is caused to proceed from step 1202 to step 1209 by means of skipping steps 1205 and 1208. The graphics-rendering apparatus of the seventh modification operates in the same manner as does its counterpart of the second embodiment, except for the operations mentioned above.

Advantage of the Seventh Modification

In the modification, the graphics rendering apparatus which cannot utilize a depth test performs the fastest rendering operation responsive to the operating status of the graphics-rendering apparatus. Even when the apparatus is busy, a decrease in the performance of rendering a graphic object to be swept is minimized, and a figured to be swept can be rendered at high speed the apparatus is in an idle state. This enables more efficient graphics rendering operation in a case where hardware resources are more limited than in the second embodiment and the present invention is performed on hardware which cannot utilize a depth test.

Eighth Modification of the Second Embodiment

Figure 37:
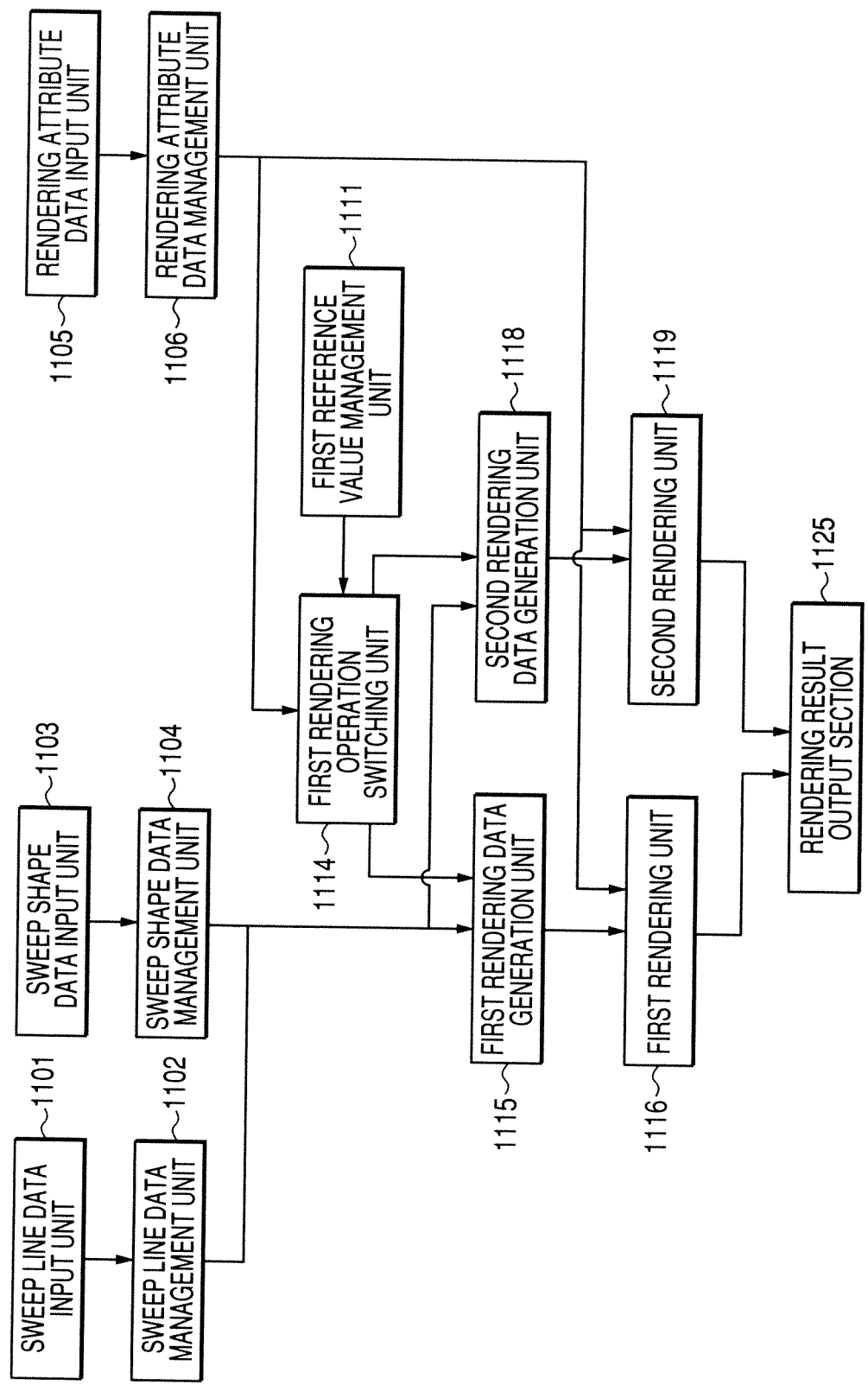
FIG. 37 is a view schematically showing an example configuration of a graphics-rendering apparatus according to an eighth modification of the second embodiment of the present invention.

FIG. 37 is an overall block diagram of a graphics-rendering apparatus according to an eighth modification of the second embodiment of the present invention.

The graphics-rendering apparatus of the eighth modification is identical with the graphics-rendering apparatus of the second embodiment, except that the second reference value management unit 1112, the memory usage status data input unit 1107, the memory usage status data management unit 1108, the second rendering operation switching unit 1117, the third reference value management unit 1113, the rendering operation status data input unit 1109, the rendering operation status data management unit 1110, the third rendering operation switching unit 1120, the third rendering data generation unit 1121, the third rendering unit 1122, the fourth rendering data generation unit 1123, and the fourth rendering unit 1124 are omitted from the graphics-rendering apparatus of the second embodiment.

Therefore, the first reference value management unit of the second embodiment corresponds to the reference value section of the present modification; and the first rendering operation switching unit of the second embodiment corresponds to the rendering operation switching unit of the present modification.

The eighth modification is described in connection with the second embodiment. When the first rendering operation switching unit 1114 has determined that the opacity input as the rendering attribute exhibits translucency, processing proceeds to the second rendering data generation unit 1118. Specifically, in the processing flow of the second embodiment shown in FIG. 15, when the rendering attribute is determined in step 1202 to exhibit translucency, processing is caused to proceed from step 1202 to step 1206 by means of skipping step 1205. The graphics-rendering apparatus of the eighth modification operates in the same manner as does its counterpart of the second embodiment, except for the operations mentioned above.

Advantage of the Eighth Modification

In the modification, the graphics rendering apparatus which can inevitably utilize a depth test performs the fastest rendering operation responsive to the status of an input. Even when the apparatus is busy, a decrease in graphics-rendering performance is minimized, and high-speed graphics rendering can be performed when the apparatus is in an idle state. This enables more efficient graphics rendering operation in a case where hardware resources are rich and the present invention is performed on hardware which inevitably enables utilization of a depth test.

Ninth Modification of the Second Embodiment

Figure 38:
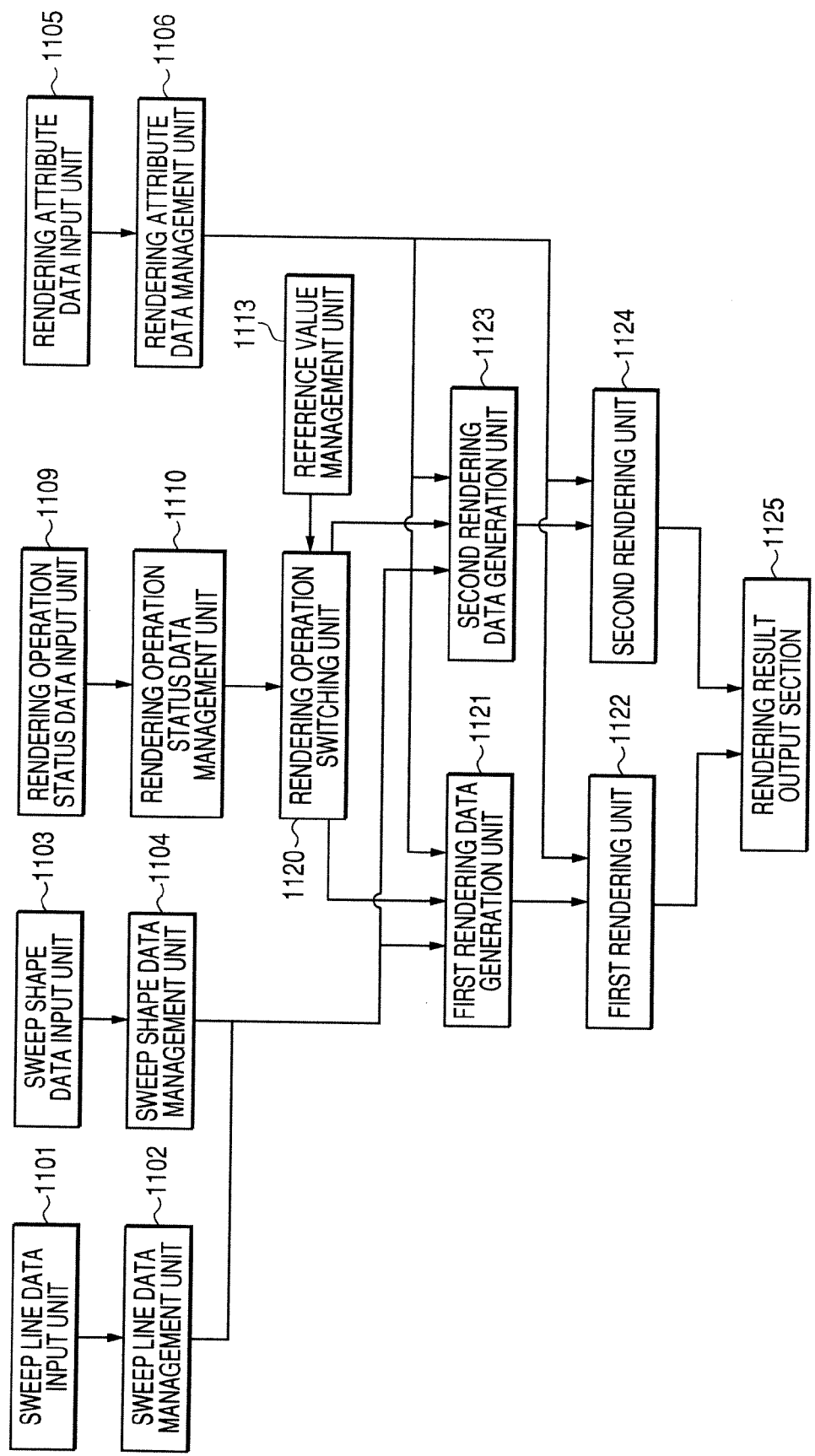
FIG. 38 is a view schematically showing an example configuration of a graphics-rendering apparatus according to a ninth modification of the second embodiment of the present invention.

FIG. 38 is an overall block diagram of a graphics-rendering apparatus according to a ninth modification of the second embodiment of the present invention.

The graphics-rendering apparatus of the ninth modification is identical with the graphics-rendering apparatus of the second embodiment, except that the first reference value management unit 1111, the first rendering operation switching unit 1114, the first rendering data generation unit 1115, the first rendering unit 1116, the second reference value management unit 1112, the memory usage status data input unit 1107, the memory usage status data management unit 1108, the second rendering operation switching unit 1117, the second rendering data generation unit 1118, and the second rendering unit 1119 are omitted from the graphics-rendering apparatus of the second embodiment.

Therefore, the third reference value management unit of the second embodiment corresponds to the reference value section of the present modification; the third rendering operation switching unit of the second embodiment corresponds to the rendering operation switching unit of the present modification; the third rendering data generation unit of the second embodiment corresponds to the first rendering data generation unit of the present modification; the third rendering unit of the second embodiment corresponds to the first rendering unit of the present modification; the fourth rendering data generation unit of the second embodiment corresponds to the second rendering data generation unit of the present modification; and the fourth rendering unit of the second embodiment corresponds to the second rendering unit of the present modification.

The ninth modification is described in connection with the second embodiment. After data input processing has been performed, the third rendering operation switching unit 1120 is caused to operate, and processing proceeds. Specifically, in the processing flow of the second embodiment shown in FIG. 15, after data have been input in step 1201, processing proceeds from step 1201 to 1208 by means of skipping steps 1202 and 1205. The graphics-rendering apparatus of the ninth modification operates in the same manner as does its counterpart of the second embodiment, except for the operations mentioned above.

Advantage of the Ninth Modification

In the modification, when the graphics-rendering apparatus in which a color of a graphic object to be filled in is limited to translucency, the fastest rendering operation responsive to the operating status of the apparatus is performed. As a result, even when the apparatus is busy, a drop in the performance of rendering is minimized, and high-speed rendering operation can be performed when the apparatus is in an idle state. This is especially effective for a case where the present invention is implemented in hardware whose resources are limited, as in a portable PC, a portable cellular phone, AV equipment having an interactive graphics rendering function, and the like.

The embodiments and the modifications thereof can be implemented in combination, as required.

Processing pertaining to the embodiments of the present invention is realized as a program which can be executed by a computer, and the program can also be embodied as a computer-readable storage medium.

The storage medium of the present invention employs any storage format such as a magnetic disk, a floppy® disk, a hard disk drive, an optical disk (a CD-ROM, a CD-R, a DVD, and the like), a magneto-optical disk (an MO and the like), semiconductor memory, and the like, so long as the storage medium can store a program and can be read by a computer or a built-in system.

An OS (Operating System) which operates on a computer in accordance with a command from a program installed in a computer or a built-in system from a storage medium; or MW (middle ware) such as database management software, a network and the like, may perform portions of processing operations of the present embodiments.

The storage medium of the present invention is not limited to the medium that is independent of a computer or a built-in system, but includes storage mediums into which a program transmitted over a LAN, the Internet, and the like and downloaded is stored or temporarily stored.

The number of storage mediums is not limited to one. Even when processing pertaining to the present embodiment is executed by a plurality of mediums, the storage mediums fall within the scope of the storage medium of the present invention, and the medium may employ any configuration.

The computer or the built-in system of the present invention is for performing various processing operations of the present embodiments in accordance with a program stored in the storage medium; and may be of any configuration, such as an apparatus formed from any one of a personal computer, a microcomputer, and the like, or a system into which a plurality of pieces of apparatus are connected by way of a network, and the like.

The computer of the present invention is not limited to a personal computer, but also includes a computing device, a microcomputer, and the like, which are built into information equipment. Equipment and devices, which enable implementation of the present invention by means of a program, are generically called a computer.

The present invention is not limited to the embodiments, and is susceptible to various forms in an embodiment stage within the scope of the invention. Further, the above embodiments encompass inventions in various stages. Various inventions can be extracted by means of appropriate combinations of the plurality of constituent elements. For instance, even when some constituent elements have been deleted from all of the constituent elements described in the embodiments, (at least one of) the problems described in connection with the problem to be solved by the present invention can be solved. When (at least one of) the advantages described in connection with the advantages of the invention are yielded, the configuration from which the constituent elements have been deleted can be extracted as the present invention.

As described in detail with reference to the examples of the embodiments and the modifications, according to the usage status of resources and a graphic feature level, a graphics-rendering method is selected, to thus adjust graphics-rendering performance. In relation to a graphics-rendering apparatus which is associated with variations in resources when performing rendering operation, graphics processing performance can be controlled, which is of considerable practical usefulness.

What is claimed is:

1. A graphics-rendering apparatus comprising:
a vector data group input unit for inputting a vector data group representing an outline of a polygon;
a vector data group management unit that manages a vector data group that represents the outline of the polygon, the vector data group being input through the vector data group input unit;
a rendering attribute data input unit for inputting rendering attribute data representing attributes of a fill area of the polygon;
a rendering attribute data management unit that manages the rendering attribute data input through the rendering attribute data input unit;
a memory usage status data input unit that acquires a usage status of memory;
a memory usage status data management unit that manages the memory usage status data acquired by the memory usage status data input unit;
a first threshold value management unit that manages a memory usage status threshold value to be compared with the memory usage status data;
a second threshold value management unit that manages a self-intersection threshold value pertaining to self-intersections with an outline of a graphic object and which is to be compared with the number of self-intersections;
a first rendering operation switching unit that compares the memory usage status threshold value managed by the first threshold value management unit with the memory usage status data managed by the memory usage status data management unit, thereby switching rendering operation;
a first rendering data generation unit that is controlled by the first rendering operation switching unit, and that reads a vector data group managed by the vector data group management unit, and generates rendering data used for effecting rendering operation utilizing a fill-in enable/disable determination function for filling in the fill area of the polygon;
a first rendering unit that reads the rendering data generated by the first rendering data generation unit and the rendering attribute data managed by the rendering attribute data management unit, to thus set the fill-in enable/disable determination function and perform rendering operation utilizing the fill-in enable/disable determination function;
a self-intersection computing unit that is controlled by the first rendering operation switching unit, and that reads the vector data group managed by the vector data group management unit, thereby computing self-intersections with the outline of a graphic object;
a self-intersection management unit that manages information pertaining to self-intersections within the outline of the graphic object computed by the self-intersection computing unit;
a second rendering operation switching unit that compares the number of self-intersections within the outline of the graphic object managed by the self-intersection management unit with the self-intersection threshold value managed by the second threshold value management unit, to thus switch rendering operation;
a second rendering data generation unit that is controlled by the second rendering operation switching unit, and that reads the vector data group managed by the vector data group management unit and the rendering attribute data managed by the rendering attribute data management unit, determines the fill area of the polygon, and generates a triangle data group by means of processing for dividing the fill area into an aggregate of triangles;
a second rendering unit that reads the triangle data group generated by the second rendering data generation unit and the rendering attribute data managed by the rendering attribute data management unit, to thus perform rendering operation;
a third rendering data generation unit that is controlled by the second rendering operation switching unit, and that reads the vector data group managed by the vector data group management unit and the rendering attribute data managed by the rendering attribute data management unit, and determines the fill area of the polygon by dividing an area including the polygon into line segments in the direction of a scan line and determining whether the line segments belong to the fill area so as to generate a line segment data group as an aggregate of the line segments determined to belong to the fill area; and
a third rendering unit that reads the line segment data group generated by the third rendering data generation unit and the rendering attribute data managed by the rendering attribute data management unit, to thus perform rendering operation, wherein
the first rendering operation switching unit switches operation to the first rendering data generation unit and the first rendering unit in response to determining a buffer can be ensured based on the comparison between the memory usage status threshold value and the memory usage status data,
the first rendering operation switching unit switches operation to the self-intersection computing unit, which triggers operation of the second rendering operation switching unit, in response to determining the buffer cannot be ensured,
the second rendering operation switching unit switches operation to the second rendering data generation unit and the second rendering unit in response to determining the number of self-intersections is less than the self-intersection threshold value, and
the second rendering operation switching unit switches operation to the third rendering data generation unit and the third rendering unit in response to determining the number of self-intersections is not less than the self-intersection threshold value.

2. The graphics-rendering apparatus according to claim 1, wherein the first threshold value management unit further performs a correction to a memory usage status threshold value to be compared with memory usage status data, and
wherein the second threshold value management unit further performs a correction to the self-intersection threshold value which pertains to self-intersection with an outline of a graphic object and is to be compared with the number of self-intersections.

3. A graphics-rendering apparatus comprising:
a vector data group input unit for inputting a vector data group representing the outline of a polygon;
a vector data group management unit that manages a vector data group that represents the outline of the polygon and has been input through the vector data group input unit;
a rendering attribute data input unit for inputting rendering attribute data representing attributes of a fill area of a polygon;
a rendering attribute data management unit that manages the rendering attribute data input through the rendering attribute data input unit;
a threshold value management unit that manages a self-intersection threshold value pertaining to intersections with the outline of a graphic object and to be compared with the number of self-intersections;
a self-intersection computing unit that reads a vector data group managed by the vector data group management unit, and computes self-intersections with the outline of the graphic object;
a self-intersection management unit that manages information pertaining to self-intersections with the outline of a graphic object computed by the self-intersection computing unit;
a rendering operation switching unit that compares the self-intersections with the outline of the graphic object managed by the self-intersection management unit with the self-intersection threshold value managed by the second threshold value management unit, to thus switch rendering operation;
a first rendering data generation unit that is controlled by the rendering operation switching unit, and which reads a vector data group managed by the vector data group management unit and the rendering attribute data managed by the rendering attribute data management unit, and that determines a fill area of the polygon, and generates a group of sets of triangle data by means of processing for dividing the polygon into an aggregation of triangles;
a first rendering unit that reads a group of sets of triangle data generated by the first rendering data generation unit and the rendering attribute data managed by the rendering attribute data management unit, to thus perform rendering operation;
a second rendering data generation unit that is controlled by the rendering operation switching unit, and which reads the vector data group managed by the vector data group management unit and the rendering attribute data managed by the rendering attribute data management unit, and that determines the fill area of the polygon by dividing an area including the polygon into line segments in the direction of a scan line and determining whether the line segments belong to the fill area so as to generate a line segment data group as an aggregate of the line segments determined to belong to the fill area; and
a second rendering unit that reads a group of sets of line segment data generated by the second rendering data generation unit and the rendering attribute data managed by the rendering attribute data management unit, to thus perform rendering operation, wherein
the rendering operation switching unit switches operation to the first rendering data generation unit and the first rendering unit in response to determining the number of self-intersections is less than the self-intersection threshold value, and
the rendering operation switching unit switches operation to the second rendering data generation unit and the second rendering unit in response to determining the number of self-intersections is not less than the self-intersection threshold value.

4. A graphics-rendering apparatus comprising:
a vector data group input unit for inputting a vector data group representing an outline of a polygon;
a vector data group management unit that manages a vector data group that represents the outline of the polygon and being input through the vector data group input unit;
a rendering attribute data input unit for inputting rendering attribute data representing attributes of a fill area of a polygon;
a rendering attribute data management unit that manages the rendering attribute data input through the rendering attribute data input unit;

a memory usage status data input unit that acquires the usage status of memory;

a memory usage status data management unit that manages the memory usage status data acquired by the memory usage status data input unit;

a threshold value management unit that manages a memory usage status threshold value to be compared with the memory usage status data;

a rendering operation switching unit that compares the memory usage status threshold value managed by the threshold value management unit with the memory usage status data managed by the memory usage status data management unit, thereby switching rendering operation;

a first rendering data generation unit that is controlled by the rendering operation switching unit, and that reads a vector data group managed by the vector data group management unit, and generates rendering data used for effecting rendering operation utilizing a fill-in enable/disable determination function for filling in the fill area of the polygon;

a first rendering unit that reads the rendering data generated by the first rendering data generation unit and the rendering attribute data managed by the rendering attribute data management unit, to thus set the fill-in enable/disable determination function and perform rendering operation utilizing the fill-in enable/disable determination function;

a second rendering data generation unit that is controlled by the rendering operation switching unit, and that reads the vector data group managed by the vector data group management unit and the rendering attribute data managed by the rendering attribute data management unit, determines the fill area of the polygon by dividing an area including the polygon into line segments in the direction of a scan line and determining whether the line segments belong to the fill area so as to generate a line segment data group as an aggregate of the line segments determined to belong to the fill area; and a second rendering unit that reads the line segment data group generated by the second rendering data generation unit and the rendering attribute data managed by the rendering attribute data management unit, to thus perform rendering operation, wherein the rendering operation switching unit switches operation to the first rendering data generation unit and the first rendering unit in response to determining a buffer can be ensured based on the comparison between the memory usage status threshold value and the memory usage status data, and the rendering operation switching unit switches operation to the second rendering data generation unit and the second rendering unit in response to determining the buffer cannot be ensured.

5. A graphics-rendering apparatus comprising:

a vector data group input unit for inputting a vector data group representing an outline of a polygon;

a vector data group management unit that manages a vector data group that represents the outline of the polygon and has been input through the vector data group input unit;

a rendering attribute data input unit for inputting rendering attribute data representing attributes of a fill area of a polygon;

a rendering attribute data management unit that manages the rendering attribute data input through the rendering attribute data input unit;

a memory usage status data input unit that acquires the usage status of memory;

a memory usage status data management unit that manages the memory usage status data acquired by the memory usage status data input unit;

a threshold value management unit that manages a memory usage status threshold value to be compared with the memory usage status data;

a rendering operation switching unit that compares the memory usage status threshold value managed by the threshold value management unit with the memory usage status data managed by the memory usage status data management unit, thereby switching rendering operation;

a first rendering data generation unit that is controlled by the rendering operation switching unit, and that reads a vector data group managed by the vector data group management unit, and generates rendering data used for effecting rendering operation utilizing a fill-in enable/disable determination function for filling in the fill area of the polygon;

a first rendering unit that reads the rendering data generated by the first rendering data generation unit and the rendering attribute data managed by the rendering attribute data management unit, to thus set the fill-in enable/disable determination function and perform rendering operation utilizing the fill-in enable/disable determination function;

a second rendering data generation unit that is controlled by the rendering operation switching unit, and that reads the vector data group managed by the vector data group management unit and the rendering attribute data managed by the rendering attribute data management unit, determines the fill area of the polygon, and generates a triangle data group by means of processing for dividing the fill area into an aggregate of triangles; and a second rendering unit that reads the triangle data group managed by the second rendering data generation unit and the rendering attribute data managed by the rendering attribute data management unit, to thus perform rendering operation, wherein the rendering operation switching unit switches operation to the first rendering data generation unit and the first rendering unit in response to determining a buffer can be ensured based on the comparison between the memory usage status threshold value and the memory usage status data, and the rendering operation switching unit switches operation to the second rendering data generation unit and the second rendering unit in response to determining the buffer cannot be ensured.

* * * * *